(12) United States Patent
Ohmura et al.

(10) Patent No.: US 7,545,958 B2
(45) Date of Patent: Jun. 9, 2009

(54) ADVICE SYSTEM FOR PROVIDING ADVICE ON PHOTOGRAPHING METHOD OR ON IMAGE EDITING

(75) Inventors: Akira Ohmura, Shibuya-ku (JP); Hiroyuki Akiya, Arakawa-ku (JP)

(73) Assignee: Nikon Corporation, Tokyo (JP)

( * ) Notice: Subject to any disclaimer, the term of this patent is extended or adjusted under 35 U.S.C. 154(b) by 901 days.

(21) Appl. No.: 10/481,624

(22) PCT Filed: Jun. 20, 2002

(86) PCT No.: PCT/JP02/06154

§ 371 (c)(1),
(2), (4) Date: Dec. 19, 2003

(87) PCT Pub. No.: WO03/001794

PCT Pub. Date: Jan. 3, 2003

(65) Prior Publication Data

US 2004/0208475 A1    Oct. 21, 2004

(30) Foreign Application Priority Data

| Jun. 20, 2001 | (JP) | ............................. 2001-186204 |
| Jun. 20, 2001 | (JP) | ............................. 2001-186205 |
| Jun. 20, 2001 | (JP) | ............................. 2001-186206 |
| Jun. 20, 2001 | (JP) | ............................. 2001-186207 |
| Jun. 20, 2001 | (JP) | ............................. 2001-186208 |
| Jun. 20, 2001 | (JP) | ............................. 2001-186209 |

(51) Int. Cl.
*G06K 9/00* (2006.01)

(52) U.S. Cl. ...................................... 382/112; 382/254

(58) Field of Classification Search ................. 382/100, 382/112, 162, 163, 164, 165, 260–266, 166, 382/167, 254, 255, 274–276
See application file for complete search history.

(56) References Cited

U.S. PATENT DOCUMENTS

| 4,978,986 | A | * | 12/1990 | Hatch ......................... 396/544 |
| 6,301,440 | B1 | | 10/2001 | Bolle et al. |
| 6,526,234 | B1 | * | 2/2003 | Malloy Desormeaux .... 396/374 |
| 6,778,684 | B1 | * | 8/2004 | Bollman ..................... 382/112 |
| 6,999,117 | B2 | * | 2/2006 | Yamazaki ................ 348/222.1 |

(Continued)

FOREIGN PATENT DOCUMENTS

AU    719329    4/1999

(Continued)

OTHER PUBLICATIONS

"E Commerce Site Kochiku Package No Sokojikara" *Network Computing*, vol. 12, No. 9, Sep. 1, 2000.

*Primary Examiner*—Anand Bhatnagar
(74) *Attorney, Agent, or Firm*—Oliff & Berridge, PLC

(57) ABSTRACT

A system for providing advice on photographing is constructed under the circumstance where a user side personal computer 1 and a server side personal computer 2 are connected via a network 3. Photographed image data are transferred to the server side personal computer 2 from the user side personal computer 1. The server side personal computer 2 analyzes the received image data. The server side personal computer 2 prepares an advice related to a photographing method based on the results of analysis and transfers it to the user side personal computer 1.

14 Claims, 42 Drawing Sheets

U.S. PATENT DOCUMENTS

| | | | |
|---|---|---|---|
| 7,023,468 B2 * | 4/2006 | Chikahisa et al. | 348/144 |
| 7,181,017 B1 * | 2/2007 | Nagel et al. | 380/282 |
| 7,317,485 B1 * | 1/2008 | Miyake et al. | 348/333.02 |
| 2001/0019587 A1 * | 9/2001 | Hashimoto et al. | 375/240.19 |
| 2003/0061073 A1 * | 3/2003 | Seow et al. | 705/3 |

FOREIGN PATENT DOCUMENTS

| | | |
|---|---|---|
| EP | 0 889 636 A2 | 1/1999 |
| EP | 0 977 146 A2 | 2/2000 |
| JP | A 5-233637 | 9/1993 |
| JP | A-6-337467 | 12/1994 |
| JP | A 7-36729 | 2/1995 |
| JP | A 9-149814 | 6/1997 |
| JP | A 10-243274 | 9/1998 |
| JP | A 11-234560 | 8/1999 |
| JP | A 2000-155700 | 6/2000 |
| JP | A 2000-209434 | 7/2000 |
| JP | A 2000-299809 | 10/2000 |
| JP | A 2000-333045 | 11/2000 |
| JP | A 2001-16469 | 1/2001 |
| JP | A 2001-36927 | 2/2001 |
| JP | A 2001-43451 | 2/2001 |
| JP | A 2001-51593 | 2/2001 |
| JP | A 2001-77843 | 3/2001 |
| JP | A 2001-128213 | 5/2001 |
| JP | A-2002-10135 | 1/2002 |
| WO | WO 00/57327 | 9/2000 |

* cited by examiner

EXPLANATION : DAYTIME SYNCHRO PHOTOGRAPHING

THE TERM "DAYTIME SYNCHRO PHOTOGRAPHING" MEANS···  ~357

O K  ~358

PHOTOGRAPHING ADVICE : A STROBE WITH GUIDE NUMBER EQUAL TO OR HIGHER THAN 20 IS REQUIRED FOR THE PHOTOGRAPHIC SCENE.

~359

INTRODUCE PRODUCT ~360

SHOP ONLINE ~361

WE RECOMMEND OUR STROBE ○○

A FAILURE MAY HAVE OCCURRED
IN YOUR CAMERA.

FOR THIS REASON, OUR ADVICE
MAY NOT BE ACCURATE.

YOUR CAMERA HAS BEEN BOOKED FOR REPAIR.
PLEASE BRING YOUR CAMERA ○○○ TO A
DEALER OR THE SERVICE CENTER.

PLEASE REFER TO THE NUMBER BELOW.

REPAIR BOOKING NUMBER □□-□□□□

343

O K

ADVICE SYSTEM FOR PROVIDING ADVICE ON PHOTOGRAPHING METHOD OR ON IMAGE EDITING

TECHNICAL FIELD

First through third inventions each relate to an advice system through which advice on a photographing method or on image editing is provided.

A fourth invention relates to a camera that sets photographing conditions for the camera based upon advice provided by a third party with regard to a photographic image having been transmitted.

A fifth invention relates to a system in which a camera abnormality is diagnosed based upon a photographic image having been transmitted.

A sixth invention relates to a product recommending system through which a camera-related product determined to be needed by a user based upon a photographic image having been transmitted is introduced to the user.

BACKGROUND ART (1) First Through Third Inventions:

There are Internet sites that accept photographic images photographed by submitters, have a site operator-appointed specific reviewer evaluate a given photographic image and post the image data and a review.

There are also Internet sites that allow a submitter to post an illustration drawn by the submitter on an electronic bulletin board and then post on the electronic bulletin board a review of the illustration by an unspecified third party reviewer who has visited the bulletin board.

However, the client requesting a review may have to wait for some time before the review by the reviewer is posted. In addition, the reviewer cannot handle a great number of review requests at once.

Furthermore, when an unspecified third party is entrusted with a review, the client information necessary to conduct the evaluation needs to be made available to the public, giving rise to a risk of privacy infringement.

(2) Fourth Invention:

Photographic setting data are stored in a camera so as to allow the user to obtain desired image data for various photographic scenes.

However, the camera cannot hold therein an unlimited volume of photographic setting data, and thus, photographic setting data only for typical photographic scenes are stored in memory. In addition, photographic setting data reflecting the specific camera accessories owned by the particular user, the user preferences and the like cannot be stored.

(3) Fifth Invention:

A camera user can have an abnormality having occurred in his camera diagnosed and have the camera repaired at a service center or the like operated by the camera manufacturer. In addition, if the cause of a camera abnormality is in the software, the user may download the latest version of the software through the Internet or the like to solve the problem.

In the former situation, the user needs to go to the service center or the like for the camera abnormality diagnosis. In the latter case, he needs to connect with the Internet to download the software. Furthermore, the user may not notice the camera abnormality and thus may not take ether of the measures described above while he keeps performing photographing operations that do not yield optimal image data.

(4) Sixth Invention:

If a camera user cannot photograph desirable images with the camera he owns, he checks the product specifications in a product catalog or the like and purchases a camera accessory, conforming to the specifications which will allow him to take good photographs.

However, if the user does not have a great deal of knowledge of photography, he will not even have an idea of the type of camera accessory he needs to take better pictures. In addition, even when he knows the type of camera accessory he should obtain, he may not be able to ascertain the specific product that he should look for by checking the product specifications in the product catalog.

DISCLOSURE OF THE INVENTION

The first through third inventions each provide an advice system through which advice on a photographing method or on image editing is offered.

The fourth invention provides a camera that sets photographing conditions for the camera based upon advice provided by a third party with regard to a photographic image having been transmitted.

The fifth invention provides a system in which a camera abnormality is diagnosed based upon a photographic image having been transmitted.

The sixth invention provides a product recommending system through which a camera-related product determined to be needed by a user based upon a photographic image having been transmitted is introduced to the user.

(1) Photographing Advice System

The photographing advice system according to the first invention comprises an analyzing means that analyzes image data of an image photographed by a user, an advising means that prepares advice on a photographing method based upon analysis results obtained at the analyzing means and a providing means that provides the advice prepared by the advising means to the user. The advising means is capable of providing the user with optimized image data.

The analyzing means analyzes the image data to determine a photographing method through which optimal image data can be obtained. Then, the advising means provides advice on a photographing method appropriate to the camera used by the user. The advice provided by the providing means at this time may be prepared by taking into consideration a specific camera accessories owned by the user.

The analyzing means may be constituted so as to execute image processing to optimize the image data and, through analysis, determine an optimal photographing method based upon the image processing which has been executed for optimization.

The photographing advice system according to the first invention may further comprise an obtaining means that obtains information related to the image data so as to allow the advising means to prepare the advice based upon the analysis results obtained at the analyzing means and the related information. The related information used by the advising means may be photographing environment data attached to the image data, user information collected at the time of user registration or information provided by the user which is collected at the time of contracting the advice service.

If the photographing advice system according to the first invention includes a server computer that receives image data transmitted from a user terminal operated by a user who transmits image data of an image photographed by the user, the advising means and the providing means may be located in the server computer. The analyzing means in such a photographing advice system can analyze the photographing method through any of various procedures. For instance, the optimal photographing method may be determined through analysis based upon image processing executed by the server computer to optimize the image data. Alternatively, the optimal photographing method may be determined based upon the image processing which has been executed by the user himself to optimize the image data. As a further alternative, the optimal photographing method may be determined through analysis based upon image processing which has been executed by a third party at a third party terminal capable of communicating with the server computer to optimize the image data. The server computer includes a database in which data that correlate the image processing executed on the image data with a specific piece of advice are stored.

When the photographing advice system according to the first invention is configured on a system having the user terminal and the server computer connected with each other via a network so as to allow them to communicate through the network, the user terminal can receive the advice information from the providing means via the network. The server computer includes a memory in which image data are accumulated.

The advising means according to the first invention may be also capable of preparing advisory comments that explain the photographing method. It is desirable that the photographing advice system having such an advising means enable the user to view through a single operation a glossary that is prepared in advance of any predetermined term included in the advisory comments prepared by the advising means. The advertising means may prepare advice that explains a camera setting method.

The photographing advice system according to the first invention may alternatively comprise an obtaining means that obtains user information, an advice preparing means that prepares advice related to photographing based upon the user information obtained by the obtaining means and a providing means that provides the prepared advice to the user. The user information obtained in the system may be information related to the camera used by the user or information related to camera accessories used by the user.

The method for providing photographing advice according to the first invention comprises steps for receiving image data of an image photographed with a camera which are transmitted from a terminal operated by a user, at a server computer connected with the user terminal via a network, preparing advice based upon the received image data and transmitting the prepared advice to the user terminal. In this method for providing photographing advice, the server computer prepares the advice by executing image processing on the image data to optimize the image data and determining through analysis an optimal photographing method based upon the image processing which has been executed for the optimization.

According to the first invention, advice on a photographing method that is suited to specific image data can be provided with ease. In addition, advice on a photographing method best suited to the user can be provided.

(2) Image Editing Advice System

The second invention provides an image editing advice system through which advice related to an image editing method instead of the advice on a photographing method described above is prepared. The advising means in the image editing advice system is capable of providing the user with the optimized image data.

The analyzing means determines through analysis an image editing method through which optimal image data may be obtained based upon the image data. In addition, the advising means advises the user of an image editing method suited to the image editing software program used by the user.

The analyzing means is capable of executing image processing on the image data to optimize the image data and determining through analysis an optimal image editing method based upon the image processing which has been executed for the optimization.

The image editing advice system according to the second invention may further comprise an obtaining means that obtains related information related to the image data so as to allow the advising means to prepare the advice based upon the analysis results obtained at the analyzing means and the related information. In this image editing advice system, the related information used by the advising means is photographing environment data attached to the image data, user information collected at the time of user registration or information provided by the user which is collected at the time of contracting the advice service.

The advice may be prepared in correspondence to the particulars of the terminal operated by the user, e.g., by taking into consideration the peripheral devices installed at the terminal operated by the user.

The image editing advice system according to the second invention may be configured as a system having a server computer that receives image data transmitted from the user terminal operated by the user who transmits the image data. The advising means and the providing means may be installed at the server computer in such a case.

The analyzing means is capable of determining through analysis the optimal image editing method based upon image processing which has been executed by the server computer on the image data to optimize the image data. Or, the optimal image editing method may be determined through analysis based upon image optimization processing which has been executed by the user himself on the image data. Alternatively, the optimal image editing method may be determined through analysis based upon image optimization processing which has been executed by a third party on the image data from the third party's terminal capable of communicating with the server computer. The server computer includes a database that holds therein data which correlate the image processing executed on the image data with specific advice.

When the image editing advice system according to the second invention is configured on a system having the user terminal and the server computer connected with each other so as to allow them to communicate through a network, the user terminal can receive the advice information from the providing means via the network. The server computer includes a memory in which image data are accumulated.

The advising means may prepare an advisory comment which explains the image editing method. It is desirable to constitute the system so as to enable the user to view a glossary prepared in advance of any predetermined term included in the advisory comments in a single operation. The advising means may prepare advice that explains how to operate the image editing software program.

The image editing advice system according to the second invention may alternatively comprise an obtaining means that obtains user information, an advice preparing means that prepares advice related to image editing based upon the user information obtained at the obtaining means and a providing means that provides the prepared advice to the user. The user information obtained in this image editing advice system is information related to the image editing software program used by the user or information related to a peripheral device installed at the terminal operated by the user.

The method for providing image editing advice according to the second invention comprises steps for receiving image data transmitted from a user terminal, analyzing the received image data, converting the image data transmitted from the user terminal to image data compatible with a printer owned by the user based upon the analysis results and transmitting the image data resulting from the conversion to the user terminal. Alternately, the received image data are converted to image data compatible with a monitor owned by the user and the image data resulting from the conversion are transmitted to the user terminal. Instead of transmitting the image data to the user, advice with regard to the received image data may be prepared based upon the results of the analysis executed on the received image data and the advice thus prepared may be transmitted to the user terminal. Such advice can be prepared by executing image processing on the image data to optimize the image data and determining through analysis an optimal image editing method based upon the image processing which has been executed for the optimization.

According to the second invention, advice on image editing suited to specific image data can be provided. In addition, advice on image editing optimal for the user can be provided.

(3) Advice System

An advice system according to the third invention comprises a first means for reception that receives image data of an image photographed by a user which originate from a user terminal, a second means for reception that receives advice information related to the image data, which originates from an adviser terminal, a means for confirmation that confirms that the advice information has been received and a means for notification that notifies the user that the advising operation has been completed once the means for confirmation confirms that the advice information has been received.

The advice information provided in this advice system is information that offers advice on a photographing method to be adopted in a camera or information that offers advice on an image editing method to be adopted in conjunction with an image editing software program.

An advice system according to the third invention comprises a first means for reception that receives image data of an image photographed by a user, which originate from a user terminal, a second means for reception that receives advice information related to the image data, which originates from an adviser terminal, a means for management that manages point information on points held by the user and points held by the adviser and a means for transfer that transfers user-held points equivalent to payment for the advice information from the user to the adviser. The number of points to be taken in payment for receiving the advice information can be specified by the adviser.

In this advice system, the image data received from the user terminal and the advice information received from the adviser terminal are displayed in relation to each other on an electronic bulletin board.

Such an advice system may be configured on a system environment in which the user terminal and the adviser terminal are connected via a network so as to enable the user terminal and the adviser terminal to communicate with each other via the network.

An advice system through which an adviser offers advice on image data submitted by a user according to the third invention comprises a specified position providing means that prepares a screen in which the adviser specifies an advice target area in the image data, an advice entering means that prepares a screen in which the adviser enters advisory comments with regard to the target area and a layout means that lays out the target area, the advisory comments and the image data so as to display them in relation to one another.

The layout means may indicate the range of the target area with a line. In this case, it is desirable that the layout means superimpose the range of the target area on the image data.

The advice system may further comprise a downloading means that enables download of the image data together with the advice information having been laid out by the layout means.

A method for providing advice according to the third invention comprises steps for receiving image data of images photographed by the user which originate from a user terminal, receiving advice information on the image data, which originates from an adviser terminal, confirming that the advice information has been received and notifying the user that the advising operation has been completed once the reception of the advice information is confirmed.

Another method for providing advice according to the third invention comprises steps for receiving image data of an image photographed by a user, which originate from a user terminal, receiving advice information on the image data, which originates from an adviser terminal, managing point information indicating points held by the user and points held by the adviser and transferring user-held points equivalent to payment for the advice information from the user to the adviser.

Yet another method for providing advice according to the third invention comprises steps for transmitting to an adviser terminal a screen prepared to enable an adviser to specify an advice target area in image data, transmitting to the adviser terminal a screen prepared to enable the adviser to enter advisory comments with regard to the target area and transmitting to a user terminal a screen prepared to display the target area having been specified and the advisory comments having been entered in relation to each other together with the image data.

According to the third invention, the following advantages are achieved.

1. The user having requested the advice is immediately notified once the advising operation by a third party is completed.
2. Use of the advice system is stimulated through the points exchanged between the user and the adviser.
3. The advice can be understood by the user having requested the advice quickly since the advice target area corresponding to the advisory comments can be ascertained at a glance. In addition, the adviser does not need to design an advice layout for each piece of advice.
4. The user having requested the advice can review the advice whenever necessary.

(4) Camera Capable of Adjusting Photographic Settings in Conformance to Advice

A camera capable of communicating with a server computer according to the fourth invention comprises a transferring means that transfers image data obtained through a photographing operation to the server computer, a receiving means that receives advice information prepared based upon the image data, which originates from the server computer, and a setting means that adjusts photographic settings based upon the advice information.

Another camera capable of communicating with a server computer according to the fourth invention comprises a transferring means that transfers image data obtained through a photographing operation to the server computer, a receiving means that receives advice information prepared based upon the image data, which originates from the server computer and a display means that displays the advice information.

It is desirable that the transferring means in ether of the cameras be structured so as to automatically transfer the image data to the server computer after the photographing operation. The advice information may be prepared based upon information related to the user owning the camera which is stored in the server computer and the image data.

Such a camera may further include a photographing control means that executes a preliminary photographing operation prior to a main photographing operation so as to allow the transferring means to transfer image data obtained through the preliminary photographing operation to the server computer.

It is desirable that the data volume of the image data transferred to the server computer by the transferring means be reduced compared to the data volume of image data stored in the photographic image saving memory mounted in the camera.

It is desirable that the image data transferred by the transferring means be accumulated in a memory at the server computer.

Another camera capable of communicating with a server computer according to the fourth invention comprises a transferring means that transfers image data obtained through a photographing operation to the server computer, a receiving means that receives error information related to an abnormality in the camera ascertained at the server computer based upon the image data and a display means that displays the error information.

According to the fourth invention, the optimal photographic settings can be selected for various photographic scenes. In addition, the user can be advised of the optimal photographing method to adopt in correspondence to the individual photographic scenes. Since the results of the diagnosis executed based upon the transferred image are displayed, the user can recognize an abnormality having occurred in the camera.

(5) Camera Abnormality Diagnosis System

The camera abnormality diagnosis system according to the fifth invention includes a server computer having a receiving means that receives image data transmitted from a user terminal operated by a camera user and a diagnosing means that executes a diagnosis to determine whether not an abnormality has occurred in the camera with which the image data have been obtained through a photographing operation. The user terminal and the server computer can be connected with each other via a network. The server computer includes a memory in which the image data transmitted from the user terminal are accumulated.

The diagnosing means executes the diagnosis based upon the image data and information related to the image data. If the results of the abnormality diagnosis executed by the diagnosing means indicate that an abnormality has occurred due to a problem in software installed in the camera, a software download should be enabled. If the results of the abnormality diagnosis executed by the diagnosing means indicate that a mechanical abnormality has occurred in the camera, the user should be advised that a repair is recommended.

When an abnormality is detected by the diagnosing means, the user may be simply advised of the location of the abnormality, instead. It is desirable that when an abnormality is detected by the diagnosing means, the cost required to eliminate the abnormality be calculated and the user be informed of the cost.

It is desirable that when an abnormality is detected by the diagnosing means, a repair service center and the development personnel in charge of developing the camera be notified of the abnormality.

If a photographing means is provided at the user terminal and image data of an image photographed with the photographing means are transmitted to the server computer, an abnormality diagnosis is executed for any abnormality having occurred in the photographing means.

The method for diagnosing an abnormality occurring in a camera according to the fifth invention comprises steps for receiving image data transmitted from a user terminal and executing a diagnosis to determine whether or not an abnormality has occurred in the camera used to obtain the image data through a photographing operation.

According to the fifth invention, the user can be advised that an abnormality has occurred in his camera without having to take his camera into a repair center or the like. In addition, it is ensured that the user does not keep taking pictures with the camera without noticing the abnormality.

(6) Product Recommending System

A product recommending system according to the sixth invention comprises an analyzing means that analyzes image data of an image photographed by a user, a selecting means that selects a camera-related product needed by the user based upon the analysis results obtained by the analyzing means and an introducing means that introduces the camera-related product selected by the selecting means to the user.

The selecting means may select the camera-related product in the following manner. It selects camera-associated products with which optimal image data can be obtained based upon the image data. Then, it selects a camera-related product appropriate for the camera used by the user. If the analyzing means executes image processing on the image data to optimize the image data, the optimal camera-related product can be selected based upon the image processing which has been executed for the optimization. Alternatively, the selecting means may select a camera-related product corresponding to the camera used to obtain the image data through the photographing operation. In such a case, the selecting means may select a camera-related product by taking into consideration camera accessories owned by the user.

The product recommending system according to the sixth invention may include a server computer that receives the image data transmitted from a user terminal from which the image data of the image photographed by the user are transmitted. In this case, the selecting means is installed at the server computer.

In the system configuration which includes the server computer, the selecting means may select a product as described below. Namely, it may select a camera-related product based upon image processing which has been executed by the server computer on the image data to optimize the image data. Alternatively, it may select a camera-related product based upon image processing which has been executed by the user himself on the image data to optimize the image data.

If a system configuration that allows a third person to execute image processing on the image data from a third party's terminal capable of communicating with the server computer is adopted, a camera-related product may be selected based upon the image processing which has been instructed by the third party. The server computer includes a database in which data that correlate the image processing executed on the image data with specific camera-related products are held.

In a system configuration in which the server computer and the user terminal are connected via a network so-as to communicate with each other via the network, the user terminal receives camera-related product information from the introducing means via the network. The server computer includes a memory in which image data are accumulated.

The product recommending system according to the sixth invention further comprises an obtaining means that obtains related information related to the image data so as to enable the selecting means to select the camera-related product based upon the analysis results obtained at the analyzing means and the related information. The related information obtained in this product recommending system is photographing environment data added onto the image data or user information collected at the time of user registration.

Another product recommending system according to the sixth invention comprises an obtaining means that obtains user information, a selecting means that selects a camera-related product needed by the user based upon the user information obtained by the obtaining means and an introducing means that introduces the camera-related product selected by the selecting means to the user. The user information obtained in this product recommending system is information related to the camera operated by the user or information related to camera accessories used by the user.

The method for recommending a product according to the sixth invention comprises steps for analyzing image data of an image photographed by a user, selecting a camera-related product needed by the user based upon the analysis results and introducing the selected camera-related product to the user. The camera-related product recommended in such a product recommending method may be a camera-related product needed to obtain an optimal image or an accessory that can be mounted at the camera body on which the image data were obtained through a photographing operation. Or, it may be another camera different from the camera used by the user.

According to the sixth invention, a camera-related product needed by the user to perform correct photographing operations can be recommended.

BRIEF DESCRIPTION OF THE DRAWINGS

FIG. 4 presents a flowchart of the control executed by the server-side computer 2 in response to a log-in;

FIG. 23 presents an example of a page that may be brought up to indicate that accurate advice cannot be provided;

FIG. 27 presents an example of a page that maybe brought up to indicate the repair booking number and to provide instruction as to how to get the camera repaired;

BEST MODE FOR CARRYING OUT THE INVENTION

The following is an explanation of the embodiments of the present invention, given in reference to the drawings.

First Embodiment

Figure 1:
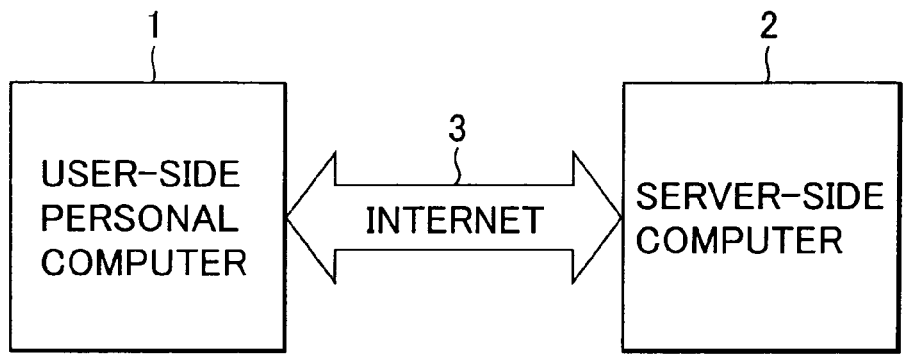
FIG. 1 illustrates the system configuration adopted in the first embodiment of the present invention.

FIG. 1 illustrates the system configuration adopted in the first embodiment of the present invention.

As shown in FIG. 1, the system achieved in the first embodiment comprises a user-side personal computer 1, a server-side computer 2 and the Internet 3 that connects the user-side personal computer 1 and the server-side computer 2 so as to allow them to communicate with each other. While devices such as modems or an Internet provider are needed to achieve a communication-enabled environment via the Internet 3, they do not bear direct relevance to the present invention and, for this reason, their explanation is omitted. In addition, while the system shown in FIG. 1 is achieved by using the Internet 3, similar systems may be achieved by sing networks such as a LAN (local area network) or an extranet.

The user-side personal computer 1, which is installed at the user's home or the like, is a terminal operated by the user. The user-side personal computer 1 is used to transmit various types of information including image data photographed by the user to the server-side computer 2. In addition, the user-side personal computer 1 is used when receiving information transmitted from the server-side computer 2.

Figure 2:
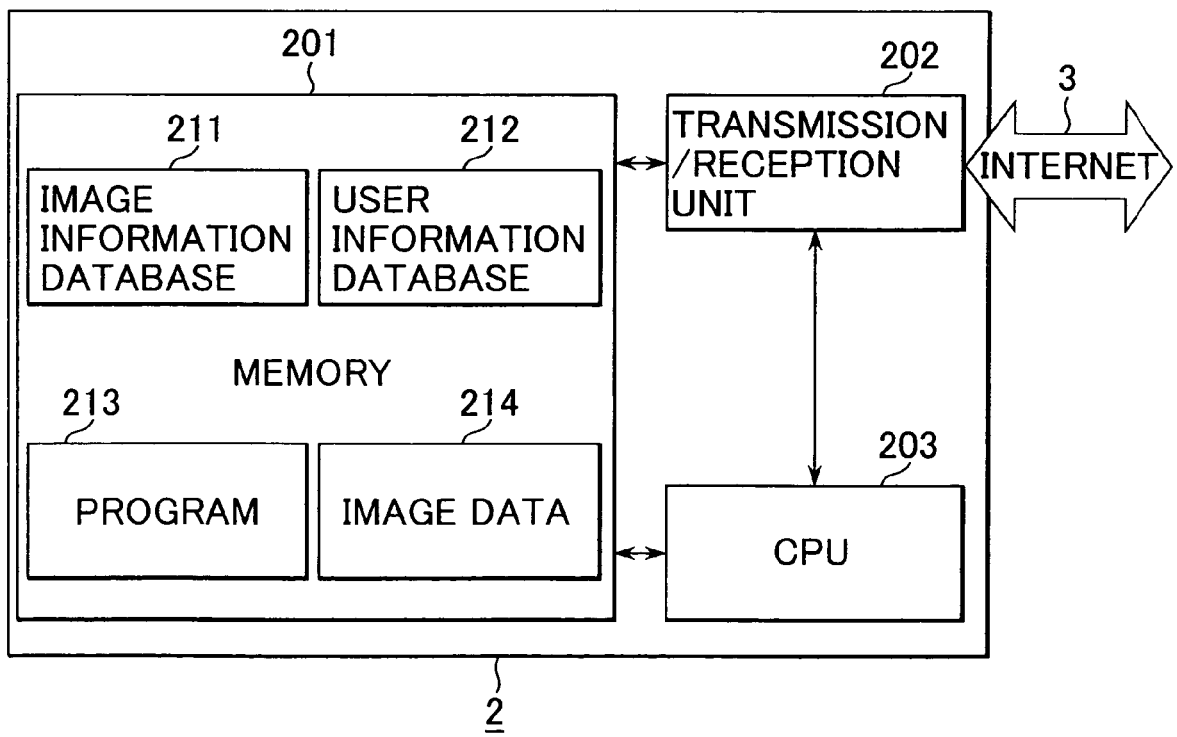
FIG. 2 is a functional block diagram of the components in the server-side computer 2.

The server-side computer 2 receives various types of information such as image data transmitted from the user-side personal computer 1. The server-side computer 2 includes a memory 201 capable of storing therein huge volumes of information, as shown in FIG. 2. FIG. 2 is a functional block diagram of the components in the server-side computer 2.

As shown in FIG. 2, the server-side computer 2 includes internal components, such as the memory 201, a transmission/reception unit 202 and a CPU 203.

The memory 201 includes an image information database area 211, a user information database area 212, a program area 213 and an image data area 214. It is to be noted that while FIG. 2 shows the memory 201 having memory areas independent of one another to facilitate the explanation, there is no physical partitions in the memory 201 in reality.

Information related to images, information related to photographing operations, information related to cameras and the like are stored in the image information database area 211. Data regarding registered users are stored in the user information database area 212. Various programs used to execute the processing to be detailed later, such as an image processing program used to execute image processing on image data, are stored in the program area 213. Image data uploaded by registered users are stored in the image data area 214.

The transmission/reception unit 202 is a circuit used to exchange signals with an external apparatus. The transmission/reception unit 202 is capable of receiving signals transmitted from the user-side personal computer 1 and the like and transmitting signals to the user-side personal computer 1 and the like. The CPU 203 is a processor that executes various types of control, as explained below.

The following is an explanation of the control executed for the user-side personal computer 1 and the server-side computer 2.

(Log-In Control)

Figure 3:
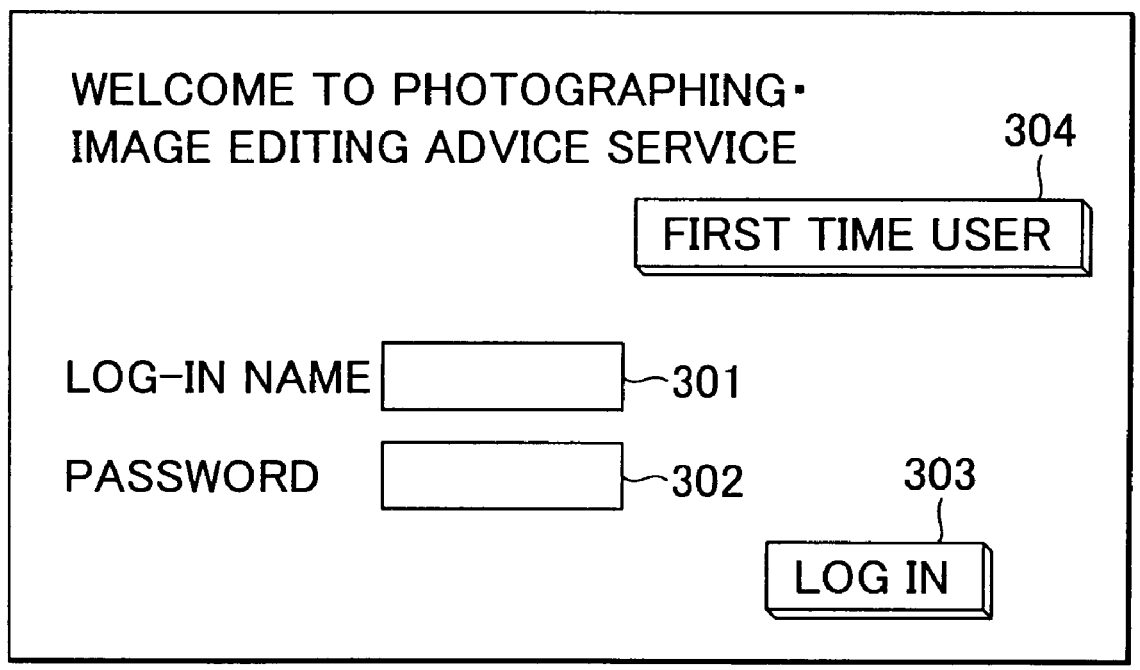
FIG. 3 presents an example of a page that may be used by the user to log into the advice service.

As a connection is established between the user-side personal computer 1 and the server-side computer 2 via the Internet 3, the page shown in FIG. 3 is brought up on display at the monitor of the user-side personal computer 1. FIG. 3 presents an example of a page that may be brought to allow the user to log into the advice service.

The user needs to perform a log-in operation in order to use the advice service provided by the server-side computer 2. In order to login to the service, the user needs to complete a user registration in advance.

As a "first time user" button 304 in FIG. 3 is clicked, the server-side computer 2 transmits a user registration page (not shown). The user registers himself with the advice service by entering information on the model name of the camera he uses, the camera accessories he owns, the model name of the personal computer monitor he uses, the gamma value setting of his monitor, the model name of the printer he uses, the name of the image processing software program and the like.

Once the information is entered, a log-in name and a password the user will need to log into the advice service are issued.

The user enters the log-in name and the password issued at the time of user registration into empty fields 301 and 302 to the right of "log-in name" and "password" in FIG. 3, and then he clicks a "log-in" button 303 to log into the advice service. The following is an explanation of the control executed in response to the log-in.

Figure 4:
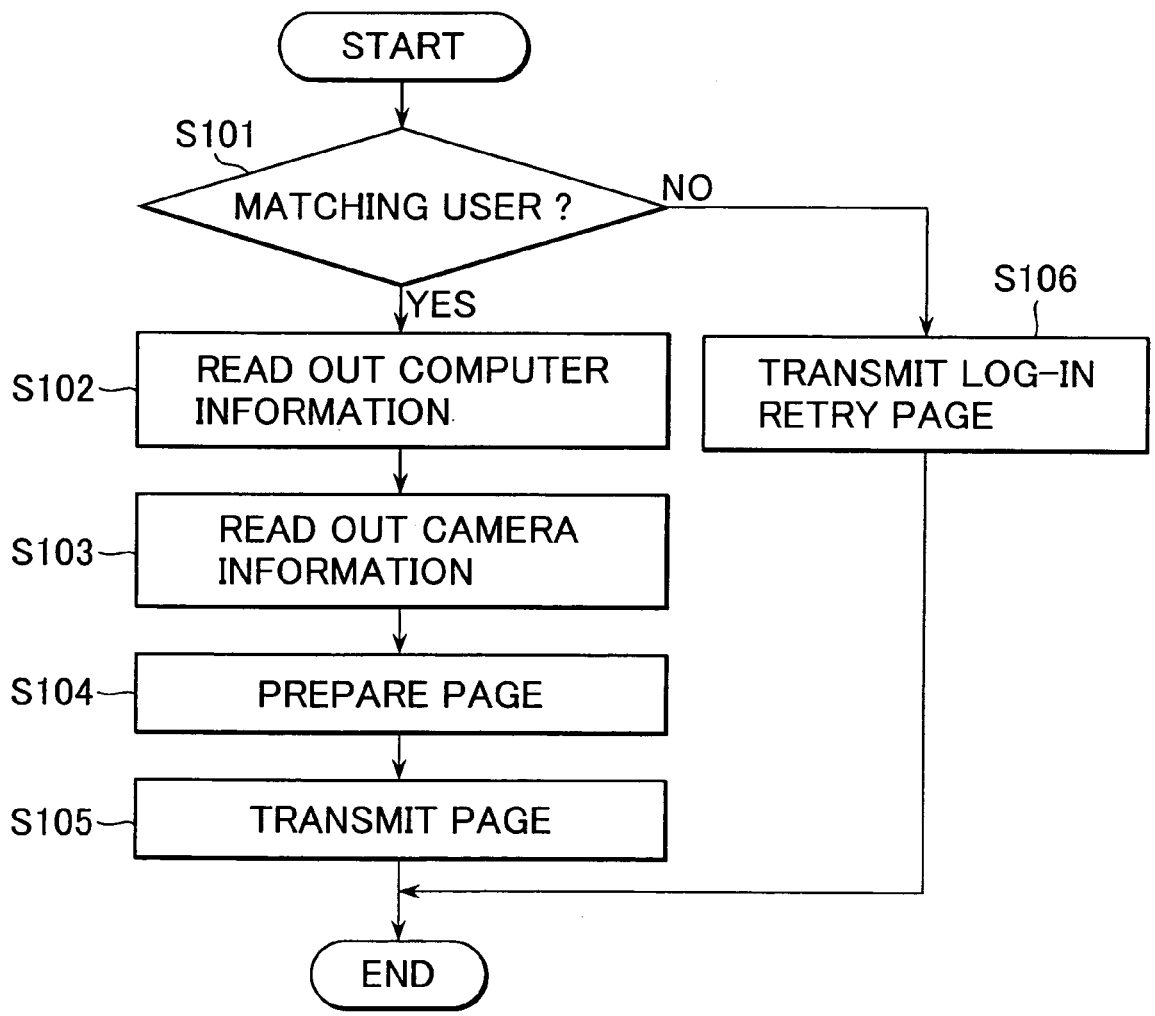

FIG. 4 presents a flowchart of the control executed by the server-side computer 2 in response to the log-in. This flow starts as the server-side computer 2 receives the information indicating the log-in name and password transmitted from the user-side personal computer 1.

In step S101, a search is performed to ascertain whether or not the data in the user information database area 212 include data on a registered user matching the log-in name and password having been received. The operation proceeds to step S102 if there is a matching registered user, whereas the operation proceeds to step S106 if a matching registered user cannot be found to transmit the page shown in FIG. 3 again to allow the user to retry the log-in operation.

In step S102, information related to the computer operated by the registered user, which is stored in memory in correspondence to the registered user, is read out from the user information database area 212. In step S103, information related to the digital camera used by the registered user, which is stored in memory in correspondence to the registered user, is read out from the user information database area 212. In the user information database area 212, information collected following the log-in is accumulated in addition to the information collected at the user registration.

The information related to the computer includes information indicating the model name of the monitor used by the registered user, monitor gamma information, information indicating the model name of the printer and information indicating the name of the image processing software program used by the registered user. The information related to the digital camera includes information indicating specific accessories that the registered user owns in addition to the camera, information indicating the extent of experience as a photographer, information indicating preferred photographing techniques (e.g., the user does not like using the strobe) and information indicating favorite photographic scenes. The information on the accessories owned by the user, the information indicating the extent of his experience as a photographer, the information indicating the user's preferred photographing techniques and the information indicating the user's favorite photographic scenes are used to prepare photographing advice, whereas the information indicating the monitor model name, the monitor gamma information, the information indicating the printer model name and the information indicating the name of the image processing software program operated by the user are used to prepare image editing advice.

Figure 5:
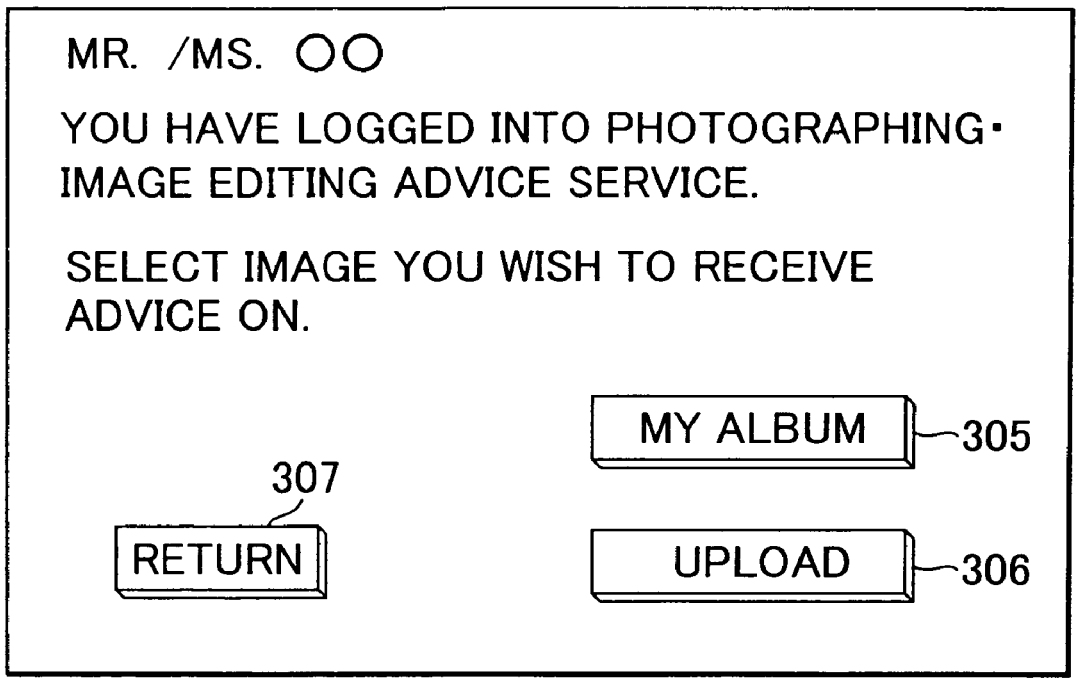
FIG. 5 presents an example of a page that may be brought up on display after the user logs into the advice service.

In step S104, a page intended for the registered user is prepared as shown in FIG. 5. In step S105, the page prepared for the registered user is transmitted to the user-side personal computer 1. The page informs the user that the log-in has been successful and subsequently, the advice service becomes available to the user.

In addition, the user information obtained as described above can be used for online shopping, for a printout service, for customer support and the like, as well as for the advice service.

(Image Data Selection, Information Collection Control)

The following is an explanation of the operation performed by the user to select the image data on which he wishes to request advice and the control processing executed to collect information needed to execute the advising operation. Both the user operation performed on the user-side personal computer 1 and the control implemented by the server-side computer 2 in response to the user operation are explained.

As the user becomes connected to the advice service site via the Internet 3 and the log-in processing described above is completed, the server-side computer 2 transmits a page such as that shown in FIG. 5 to the user-side personal computer 1 so that the page is displayed at the monitor of the user-side personal computer 1.

FIG. 5 presents an example of a page that may be brought up on display when the user has logged into the advice service. The page shown in FIG. 5 indicates to the user that the log-in has been successful and also prompts the user to select the image data on which he wishes to request advice. As the user clicks a "my album" button 305 in FIG. 5, the server-side computer 2 transmits a page shown in FIG. 6 that will allow the user to select image data having already been uploaded into the memory 201 at the server-side computer 2.

Figure 7:
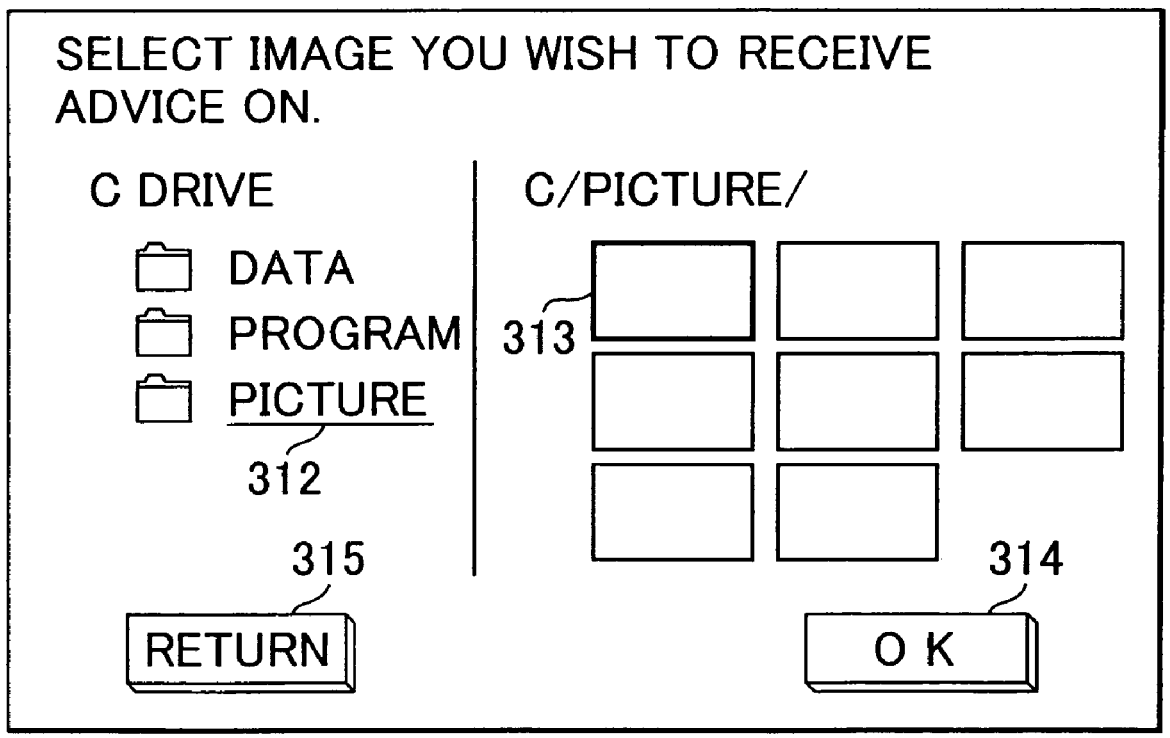
FIG. 7 presents an example of a page that may be brought up on display to allow the user to select specific image data stored in the memory in the user-side personal computer 1 or in a peripheral device memory connected to the user-side personal computer 1.

If, on the other hand, the user clicks an "upload" button 306 in FIG. 5, the server-side computer 2 transmits a page shown in FIG. 7 that will allow the user to select image data saved in the memory in the user-side personal computer 1 or in a peripheral device connected to the user-side personal computer 1. If the user clicks a "return" button 307, the server-side computer 2 logs out of the advice service to return to the log-in page shown in FIG. 3 to enable another user to log into the service.

Figure 6:
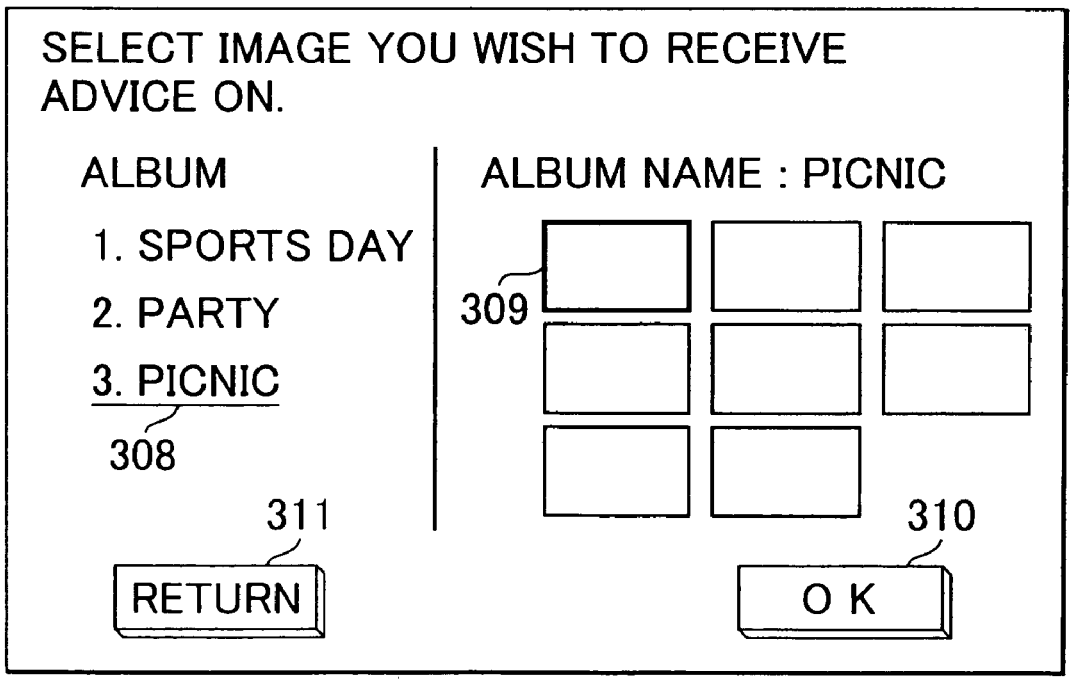
FIG. 6 presents an example of a page that may be brought up on display to allow the user to select image data owned by the user having logged into the advice service, which are stored in the image data area 214 of the memory 201 in the server-side computer 2.

FIG. 6 presents an example of a page that may be brought up to allow the user to select image data belonging to the user having logged into the service, which are stored in the image data area 214 in the memory 201 at the server-side computer 2. Image data having been uploaded by the user in the past are sorted and stored in units of individual albums.

Album names 308 under "album" on the left side of the page, i.e., "sports day", "party", "picnic" and the like, are the album names assigned by the user when the image data were registered in the image data area 214 in the memory 201 at the server-side computer 2. As the user clicks one of the album names 308, the server-side computer 2 displays thumbnail images 309 of the image data registered in the album on the right side of the page.

The user selects a specific set of image data by clicking the corresponding thumbnail image 309. In FIG. 6, the first set of image data in the album "picnic" has been selected. Once specific image data are selected, an "OK" button 310 enters an active state. As the user selects specific image data and clicks the "OK" button 310, the server-side computer 2 transmits the page shown in FIG. 8. If, on the other hand, user clicks a "return" button 311, the display returns to the page shown in FIG. 5.

FIG. 7 presents an example of a page that may be brought up to allow the user to select image data stored in the memory inside the user-side personal computer 1 or the memory of a peripheral device connected to the user-side personal computer 1. The structure of the internal memory of the user-side personal computer is presented on the left side of the page in a tree display for each folder.

The user clicks one of five folder names 312 to display thumbnail images 313 of the image data in the corresponding folder on the right side of the page. A specific set of image data is then selected as when selecting a specific set of image data in the album in FIG. 6. As the user selects specific image data and clicks an "OK" button 314, the server-side computer 2 transmits the page shown in FIG. 8. If, on the other hand, the user clicks a "return" button 315, the display returns to the page shown in FIG. 5.

Figure 8:
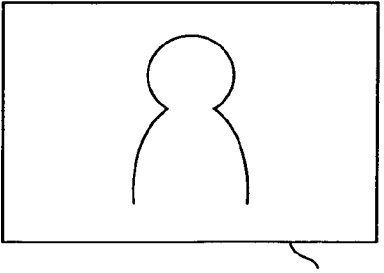
FIG. 8 presents an example of a page that may be brought up on display to prompt the user to enter information related to the image data.

FIG. 8 presents an example of a page that may be brought up on display to prompt the user to enter information with regard to the image data. The page shown in FIG. 8 is used to prompt the user to enter information needed to improve the accuracy of the advice, which is to be used in addition to the information attached to the image data and the information already stored in the memory in the server-side computer 2 through the user registration or the like. The server-side computer 2 presents the user with questions asking for information to be entered by the user and prompts the user to enter answers to the questions into user entry fields 316.

On the right side of the page, a reduced image 317 of the selected image data is displayed. The display of the reduced image 317 helps the user answer the questions with ease.

Figure 9:
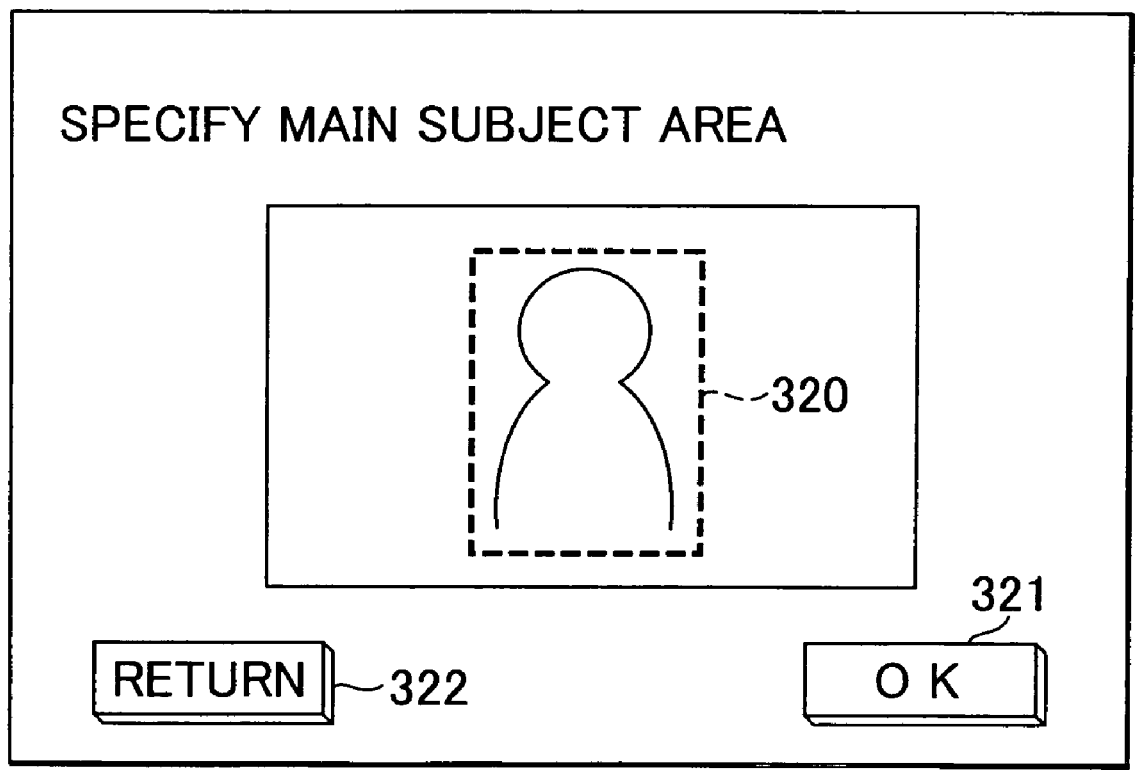
FIG. 9 presents an example of a page that may be brought up on display to prompt the user to select a main subject area within the image.

After the user enters the answers to the questions and clicks an "OK" button 318, the server-side computer 2 transmits the page shown in FIG. 9. If, on the other hand, the user clicks a "return" button 319, the display returns to the page shown in FIG. 6 or 7 to allow the user to select different image data.

FIG. 9 presents an example of a page that may be brought up on display to enable the user to select an area of the image, which corresponds to the main subject. The range enclosed by the dotted line in FIG. 9 constitutes a main subject area 320.

The main subject area 320 is selected as the user performs a click-and-drag operation in the image with a mouse or the like. While a rectangular area is selected through the click-and-drag operation within the image in the example presented in FIG. 9, a circular area may be selected instead. By ensuring that the main subject area 320 is selected as precisely as possible, the accuracy of the advice can be improved.

Figure 12:
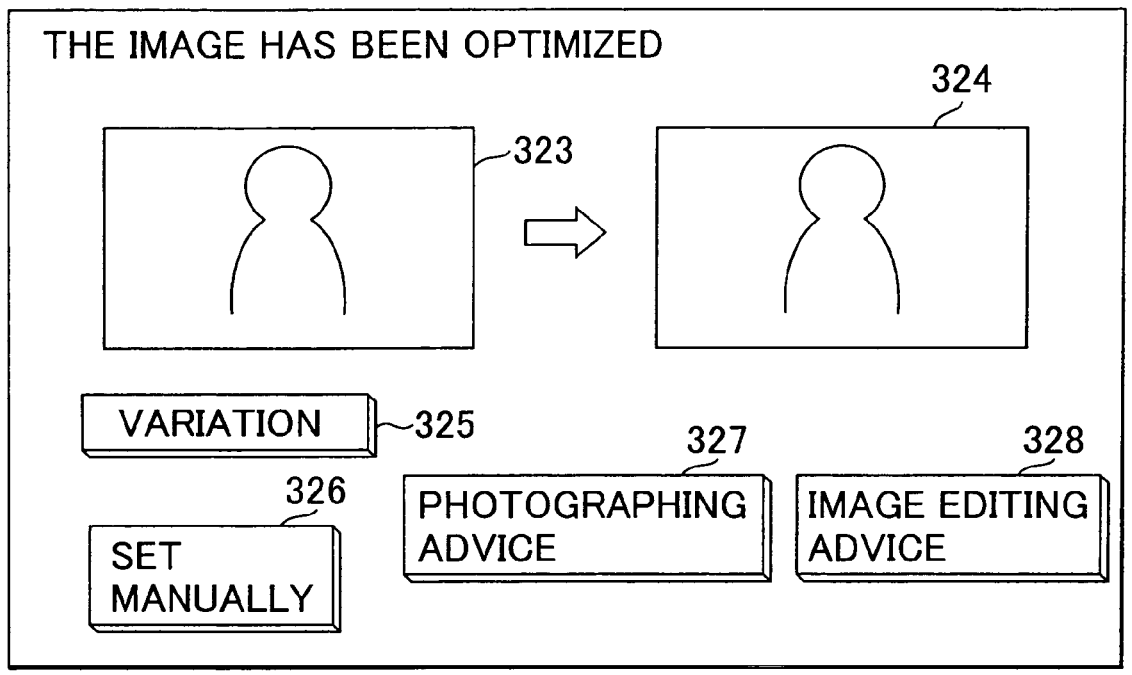
FIG. 12 presents an example of a page that may be brought up to display an image optimized through image processing by executing an image analysis on the image data selected by the user based upon the obtained information.

As the user selects the area and clicks an "OK" button 321, the server-side computer 2 ends the information collecting operation for collecting the information with regard to the image data and transmits the page shown in FIG. 12. If, on the other hand, the user clicks a "return" button 322, the display returns to the page shown in FIG. 8. The control sequence for the image data selection and the information collection thus ends.

As described above, the server-side computer 2 sequentially transmits a plurality of pages to the user-side personal computer 1 to collect information in a dialogue format by adopting a procedure which can be intuitively followed with ease even by a first time user of the advice service. Since the user is asked to enter the answers to only a few questions per page, the user is more likely to be able to enter the information in full for the page.

(Advising Control)

Once the full information with regard to the image data is collected, the server-side computer 2 starts advice processing.

Figure 10:
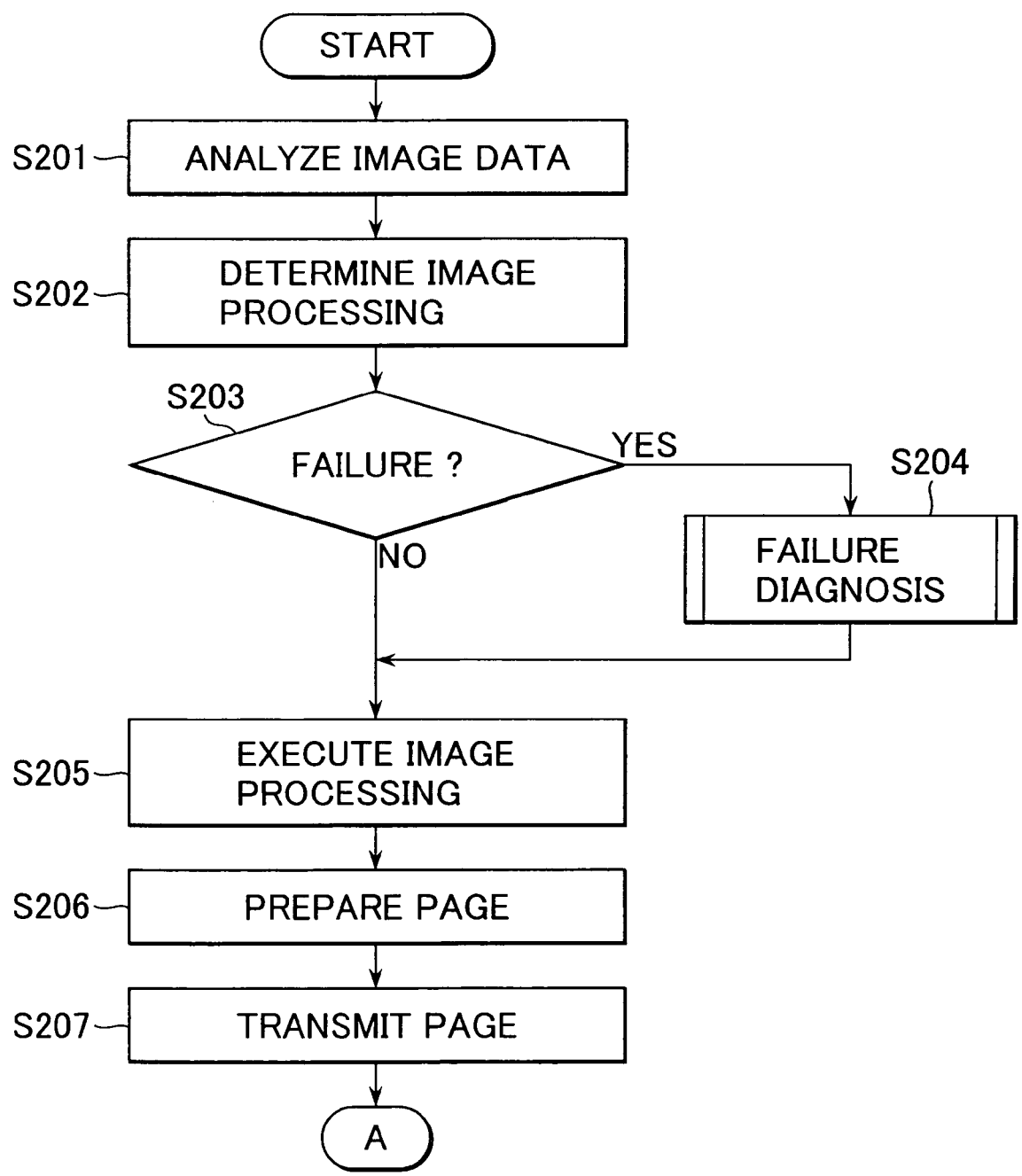
FIG. 10 presents a flowchart of the advice processing.
Figure 11:
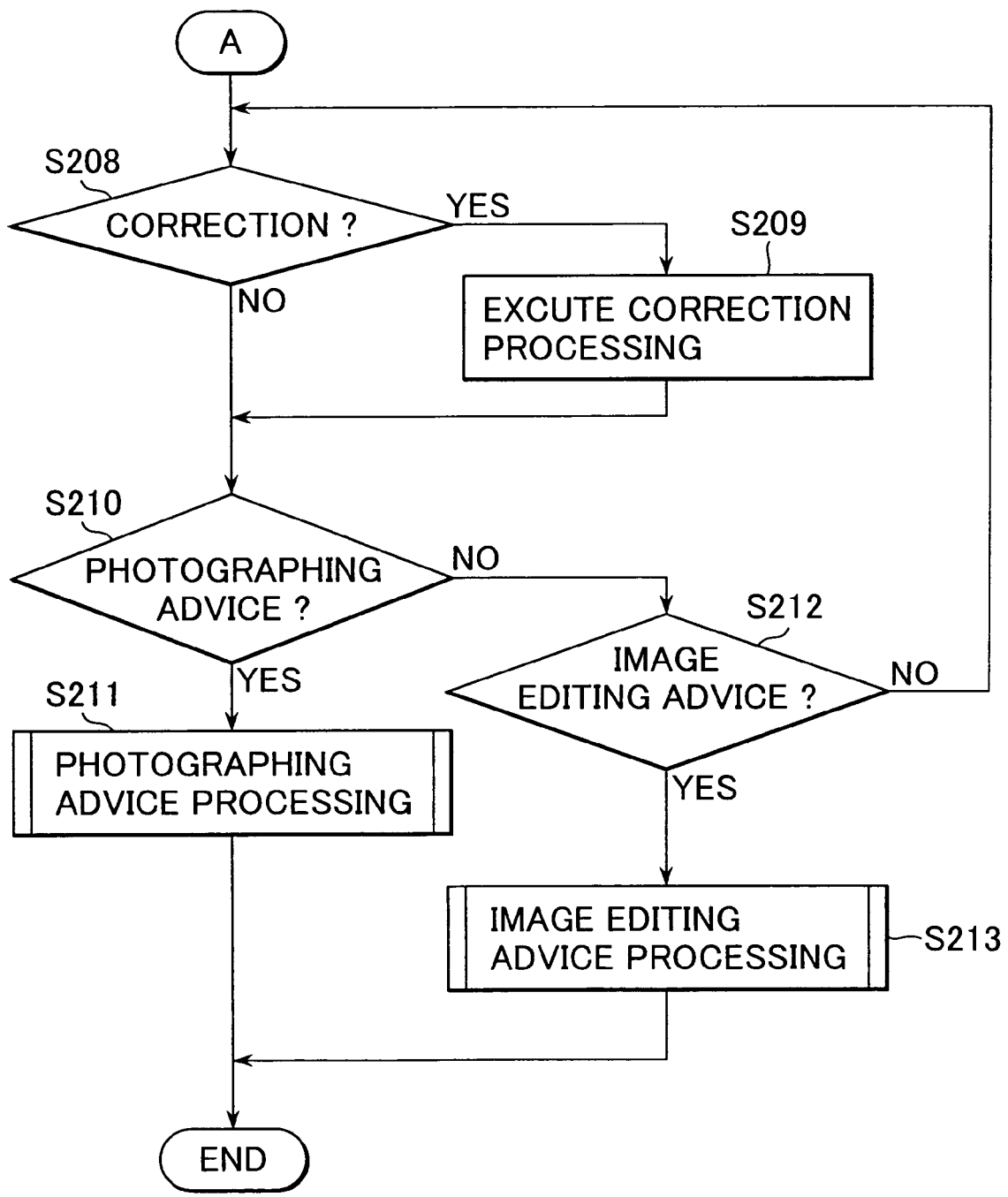
FIG. 11 presents a flowchart of the advice processing.

The following is an explanation of the advice processing executed based upon the collected information given in specific terms. FIGS. 10 and 11 present a flowchart of the advice processing. This flow starts upon receiving a signal indicating that the "OK" button 321 has been clicked in the page shown in FIG. 9.

In step S201, the image data selected by the user are analyzed. In step S202, image processing that will achieve an optimal image is determined based upon the analysis results and the collected information. In step S203, a decision is made as to whether or not there is any likelihood of a failure having occurred in the digital camera with which the image data were photographed based upon the analysis results and the collected information. For instance, it may be decided that a failure may have occurred in the digital camera if there is no trace of a strobe light emission in the image data although the information indicates that the distance to the subject was short and the strobe was engaged. If there is a likelihood of failure having occurred, the operation proceeds to step S204 to execute the failure diagnosis control to be detailed later. If, on the other hand, there is no likelihood of a failure having occurred, the operation proceeds to step S205.

In step S205, the image processing is executed on the image data. Through the image processing executed in this step, the brightness, the color balance and the like are adjusted so as to achieve an optimal image from the image data selected by the user. The server-side computer 2 executes the image processing to achieve image data optimization based upon the results of the analysis of the image data and the collected information. The following is an explanation of the image processing executed by the server-side computer 2 based upon the results of the analysis executed on the image data and the collected information.

An explanation is given on an example in which image data have been obtained through a backlit photographing operation.

The server-side computer 2 judges the photographing environment based upon the image data of an image with a dark central area and a bright peripheral area and the collected information indicating that a person was photographed, that the main subject area is at the center and that no strobe light was emitted. Since the image of the main subject at the center alone is dark, the server-side computer 2 is able to judge that the image was photographed in a backlit photographing environment.

Next, the server-side computer 2 executes the optimal processing for raising the brightness of the main subject photographed as a dark image due to the backlit photographing operation. There may be options with regard to the image processing that may be executed to raise the brightness of the main subject, e.g., image processing for uniformly brightening the overall image and image processing for brightening the main subject area alone. If there are such options, the server-side computer 2 makes a further decision as to which option will lead to the best possible image. For instance, if the background behind the main subject was photographed at a correct brightness level, the server-side computer 2 selects the image processing for brightening the main subject area alone.

As described above, the server-side computer 2 is enabled to execute the image processing to achieve image optimization based upon the results of the analysis executed on the image data and the collected information.

In step S206, a page that contains the image resulting from the image processing, such as that shown in FIG. 12, is prepared. FIG. 12 presents an example of a page that may be brought up to display the image optimized through the image processing after analyzing the image data selected by the user based upon the collected information. In the page shown in FIG. 12, an image 323 of the image data selected by the user is displayed on the left side of the page and an image 324 resulting from the image processing is displayed on the right side. In addition, the page includes a "variation" button 325, a "correct manually" button 326, a "photographing advice" button 327 and an "image editing advice" button 328.

In step S207, the page prepared as described above is transmitted to the user-side personal computer 1. In step S208, a detection is executed to determine whether or not the "correct manually" button 326 or the "variation" button 325 has been pressed. The operation proceeds to step S209 if ether button is detected to have been pressed, whereas the operation proceeds to step S210 if nether button has been pressed. In step S209, manual correction processing or variation processing is executed. If it is detected that the "correct manually" button 326 or the "variation" 325 has been clicked, the page shown in FIG. 13 or 14 is transmitted to the user-side personal computer 1.

Figure 13:
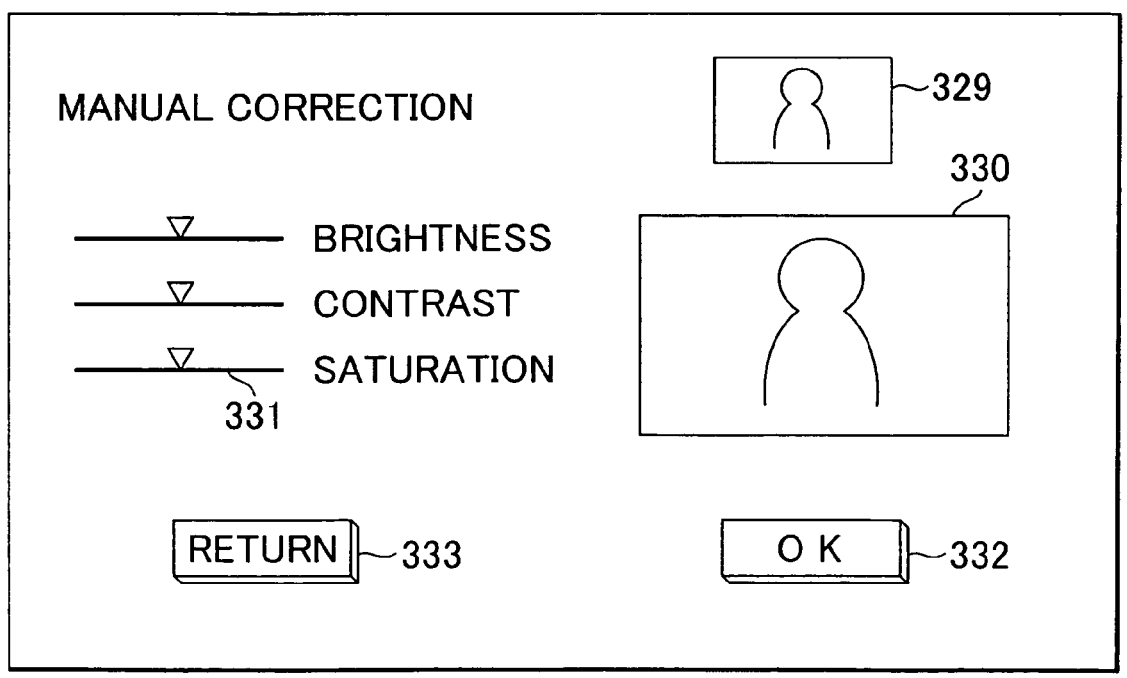
FIG. 13 presents an example of a page that may be brought up on display to allow the user to further modify the image resulting from the image processing which has been executed by the server-side computer 2 to better suit the user preference.
Figure 14:
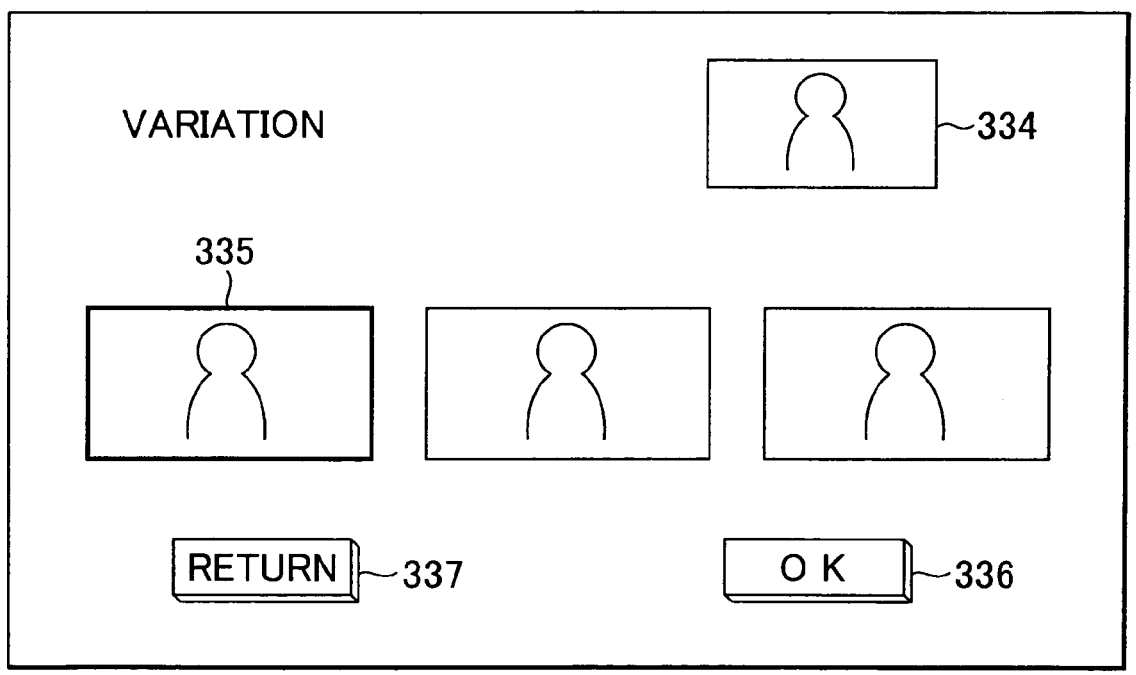
FIG. 14 presents an example of a page that may be brought up on display to allow the user to further modify the image resulting from the image processing which has been executed by the server-side computer 2 to better suit the user preference.

FIGS. 13 and 14 each present an example of a page that may be brought up on display to allow the user to achieve an image more to his taste through a further operation executed on the image resulting from the image processing executed by the server-side computer 2. If the user clicks the "correct manually" button 326 in the page shown in FIG. 12, the server-side computer 2 transmits the page shown in FIG. 13. In the page shown in FIG. 13, the image 329 selected by the user is displayed on the upper right side and the image 330 having undergone the image processing executed by the server-side computer 2 is displayed on the lower right side.

In addition, sliders 331 for adjusting the "brightness", the "contrast" and the "saturation" are displayed to the left of the image 330 having undergone the image processing in the page shown in FIG. 13. The user manually correct the image 330 by dragging the sliders 331 to the left or the right. As the user clicks an "OK" button 332, the server-side computer 2 retransmits the page shown in FIG. 12 which now reflects the manual correction executed by the user. If, on the other hand, the user clicks a "return" button 333, the server-side computer 2 retransmits the page shown in FIG. 12 which does not reflect any manual correction executed by the user.

If the user clicks the "variation" button 325 in the page shown in FIG. 12, the server-side computer 2 transmits the page shown in FIG. 14.

In the page shown in FIG. 14, the image 334 selected by the user is displayed on the upper right side and a plurality of images 335 resulting from different types of image processing executed by the server-side computer 2 are displayed all at once under the image 334. The plurality of images 335 displayed in this page result from different types of image processing each corresponding to one of various photographic settings that may be selected in the camera. For instance, they may include an image having undergone image processing for adjusting the brightness of the entire image and an image having undergone image processing for separately adjusting the brightness of the main subject and the brightness of the background, which correspond to different photographic settings (photographing conditions) that can be selected in the camera.

The photographic setting corresponding to the image processing for adjusting the brightness of the entire image is equivalent to the exposure correction. The photographic setting corresponding to the image processing for individually adjusting the brightness of the main subject and the brightness of the background is equivalent to a photographing condition under which an electronic flash unit is utilized. As the user clicks one of the plurality of images 335, the image having been clicked becomes selected. Then, as the user clicks an "OK" button 336 in the page shown in FIG. 14, the server-side computer 2 transmits the page shown in FIG. 12. At this time, an image identical to the image selected in the page in FIG. 14 is displayed as the image 324 in the page shown in FIG. 12. In addition, the image processing that the selected image has undergone is used as the image optimization processing.

On the other hand, if the user clicks a "return" button 337, the server-side computer 2 retransmits the page shown in FIG. 12 without reflecting any choice that may have been made for one of the images.

Information on the manual correction processing or the variation processing executed as described above is the accumulated in the user information database area 212 in the memory 201 of the server-side computer to be used when preparing the next advice as user image preference information. For instance, if the user manually executes a correction to raise the brightness of the image, an image that is brighter than normal is created through the image optimization processing executed by the server-side computer 2 when preparing subsequent advice.

In step S210, a detection is executed to determine whether or not a signal indicating that the user has clicked the "photographing advice" button 327 in the page shown in FIG. 12 has been received. If such a signal has been received, the operation proceeds to step S211, whereas if no such signal has been received, the operation proceeds to step S212. In step S211, photographing advice processing is executed. The photographing advice control is to be described in detail later. In step S212, a detection is executed to determine whether or not a signal indicating that the user clicked the "image editing advice" button 328 has been received. The operation proceeds to step S213 if such a signal has been received, whereas the operation returns to step S208 if no such signal has been received. In step S213, image editing advice processing is executed. The image editing advising control is to be described in detail later.

(Photographing Advice Control)

The following is an explanation of the photographing advice control executed in step S211 in FIG. 11. Through the photographing advice control, an analysis is executed to determine the photographing method that should have been used by the user to obtain an image identical to the image optimized by the server-side computer 2 and advice is prepared accordingly.

The following explanation focuses on an example in which the server-side computer 2 has executed image processing for raising the brightness level of the main subject alone in the image optimization processing.

The brightness level of the main subject may be raised through photographic settings ether by correcting the exposure or by using auxiliary light such as light emitted from a strobe. Since the brightness level of the main subject alone is raised through the image optimization processing, the server-side computer 2 advises that the photographing operation be performed by using auxiliary light which allows the main subject alone to be brightened rather than correcting the exposure which will uniformly brighten the entire image.

However, if there is information indicating that the distance to the main subject is significant, that the camera is not equipped with an internal strobe, that the user does not own a strobe as a camera accessory or that the user does not like using a strobe, the server-side computer 2 advises that the exposure be corrected so as to raise the brightness level of the main subject without using a strobe.

In addition, if the user is relatively inexperienced as a photographer and the camera includes a backlight correction button that can be easily set or the like, the server-side computer 2 should advise that the backlight correction button be used.

The server-side computer 2 prepares the optimal advice for the user based upon the information having been obtained, as described above.

As an alternative, the server-side computer 2 may prepare several different pieces of advice to allow the user to choose the advice he would like to use.

In order to enable the advice as described above, a table in which the image optimization processing automatically executed on image data is stored in memory in relation to specific photographic settings is contained in the image information database 211 in the memory 201 at the server-side computer 2.

For instance, the image processing for raising the brightness level of only part of the image such as the main subject is stored in memory in relation to a photographic setting, i.e., strobe light emission, in the image information database area 211. In addition, the image processing for raising the brightness level of the entire image is stored in memory in relation to photographic settings, i.e., exposure correction and spot photometering. Furthermore, each type of image processing is stored in memory also in relation to the information obtained with regard to the camera and accessories used by a particular user, the user preferences and the like. As a result, a photographic setting which matches the camera and the accessories used by the user and also matches the user's personal preferences can be selected.

The image information database area 211 also contains a table in which a given photographic setting is stored in memory in relation to corresponding advice data.

The server-side computer 2 prepares the optimal advice by using these data stored in memory at the image information database area 211.

The following is an explanation of the photographing advice control, given in specific details. FIG. 5 presents a flowchart of the processing executed in step S211.

In step S301, the information on the image processing executed in step S205 and step S209 in FIG. 10 for image optimization is read out. In step S302, the photographing condition which is set currently is converted to the photographing condition corresponding to the image optimization processing by using the data stored in memory at the image information database area 211 as described above.

In step S303, a detection is executed to determine whether or not the photographic setting which will allow the user to obtain an image identical to the image resulting from the image processing can be selected at the camera used by the user or with the accessories owned by the user. If the photographic setting can be selected, the operation proceeds to step S304, whereas if the photographic setting cannot be selected, the operation proceeds to step S305.

Figure 16:
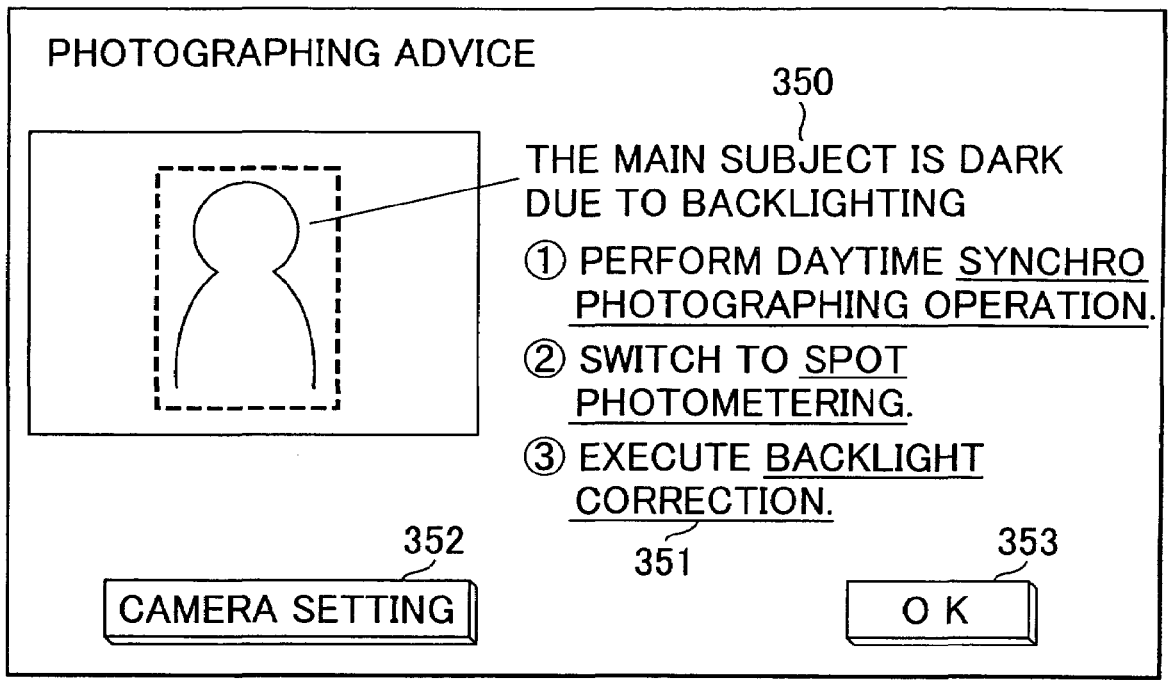
FIG. 16 presents an example of an advice page.
Figure 17:
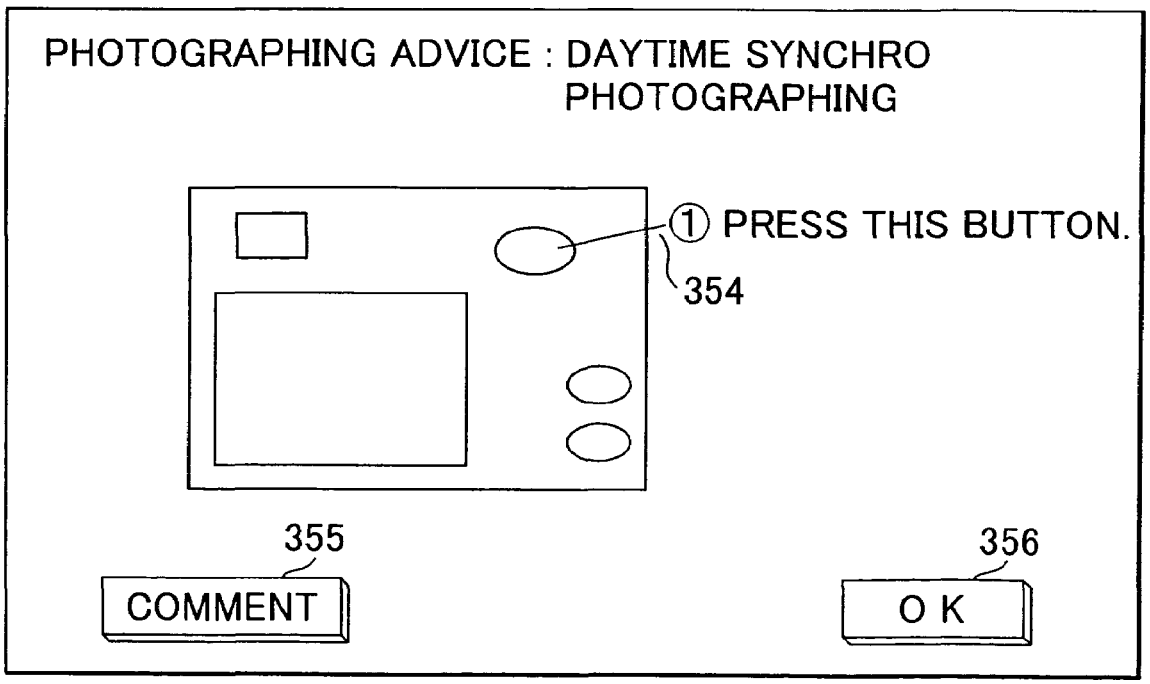
FIG. 17 presents an example of an advice page.
Figures 18, 19:
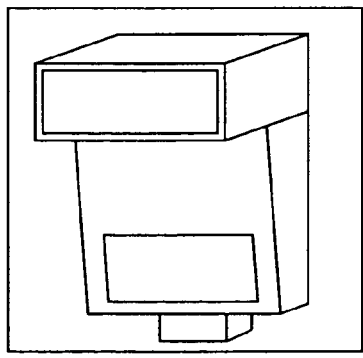
FIG. 18 presents an example of an advice page.
FIG. 19 presents an example of an advice page in which an alternative means is suggested.

In step S304, prepared is an advice page describing the operating method or the like through which the specific photographic setting can be selected at the user's camera or the accessories owned by the user so as to obtain image data of an image similar to the optimized image. FIGS. 16, 17 and 18 present an example of an advice page.

Advisory comments are entered in a comments field 350 in FIG. 16. In the example presented in FIG. 16, photographing options for achieving a desirable image are described. The terms "daytime synchro photographing", "spot photometering" and "backlight correction" in the comments entered in the comments field 350 are each underlined with a reference link line 351. The reference link line 351 indicates that the display can jump to a page explaining the corresponding term by clicking the term. FIG. 18 presents an example of the glossary page.

An explanation of the term which has been clicked is entered in an explanation field 357 in the page shown in FIG. 18. The display returns to the page shown in FIG. 16 as the user clicks an "OK" button 358. The advice ends when an "OK" button 353 in the page in FIG. 16 is clicked. A "camera setting" button 352 is clicked when the user wants to find out how the user's camera should be operated to select the photographic setting that will yield a desirable image. As the user clicks the "camera setting" button 352, the page shown in FIG. 17 is brought up on display. In a setting description field 354, an explanation of the operation that should be performed is provided together with an image of the user's camera. The display returns to the page shown in FIG. 16 when the user clicks a "comments" button 355. In addition, if the user clicks an "OK" button 356, the advice ends.

Figure 15:
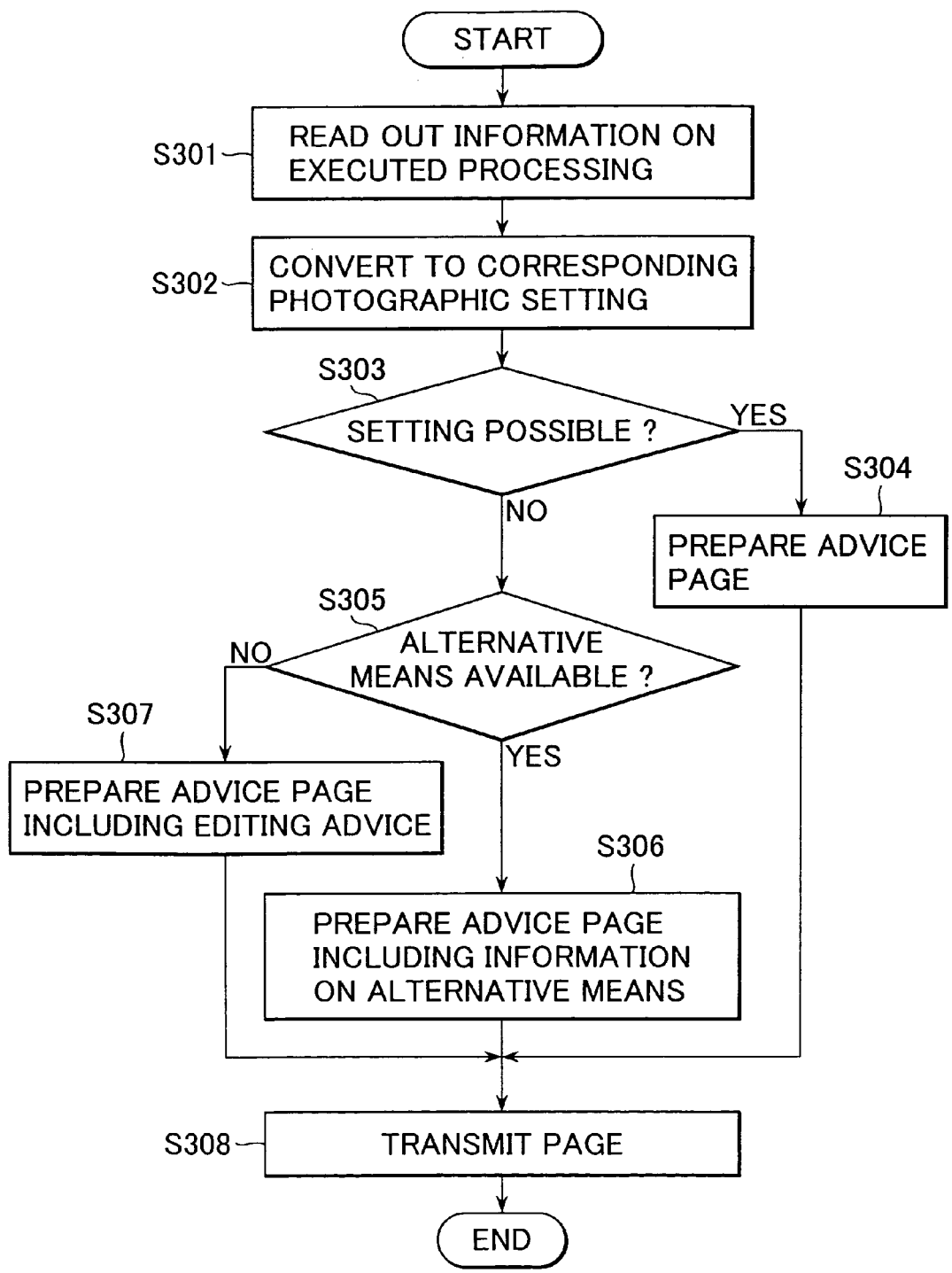
FIG. 15 presents a flowchart of the processing executed in step S211.

In step S305 in FIG. 15, a search is conducted to determine whether or not the photographic setting which will allow the user to obtain image data of an image similar to the optimized image can be selected by using an alternative means such as an accessory that the user does not own. For instance, if an image similar to the image resulting from the optimization processing can be obtained simply by adjusting the photographing condition as long as an external strobe is used, it is decided that there is an effective alternative means. A new camera body purchased to replace the current camera body may also be regarded as an alternative means. The operation proceeds to step S306 if there is an alternative means, whereas the operation proceeds to step S307 if there is no alternative means. In step S306, an advice page suggesting the use of the alternative means is prepared.

FIG. 19 presents an example of an advice page suggesting the use of the alternative means. An image 359 of the alternative means recommended to the user is displayed in the page shown in FIG. 19. The image data of the alternative means displayed as the image 359 are stored in the memory 201 at the server-side computer 2.

A "introduce product" button 360 is clicked to jump to a page carrying specifications and the like of the alternative means displayed as the image 359. A "shop online" button 361 is clicked to jump to an online shop page in which the user can purchase the alternative means. As the specific alternative means is recommended to the user in this manner, the user does not need to look for the appropriate alternative means on his own time. In addition, the user can purchase the alternative means by simply going to the online shop page without having to perform a complicated operation. The advice ends when an "OK" button 362 in the page shown in FIG. 19 is clicked.

Next, in step S307 in FIG. 15 to which the operation proceeds after deciding that an ideal image cannot be obtained simply by selecting a specific photographic setting, an advice page that includes photographing advice and image editing advice to be detailed later is prepared. In step S308, the advice page having been prepared is transmitted to the user-side personal computer 1.

(Image Editing Advice Control)

The image editing advising control is control processing executed to provide the user with advice on how the image should be edited.

The advice is naturally provided to indicate a specific operation of the software used by the user. If the software has a backlight correction function, the user may be advised to employ the backlight correction function alone. This advice should also include the exact sequential order in which the processing should be executed, which is crucial in image processing.

Figure 20:
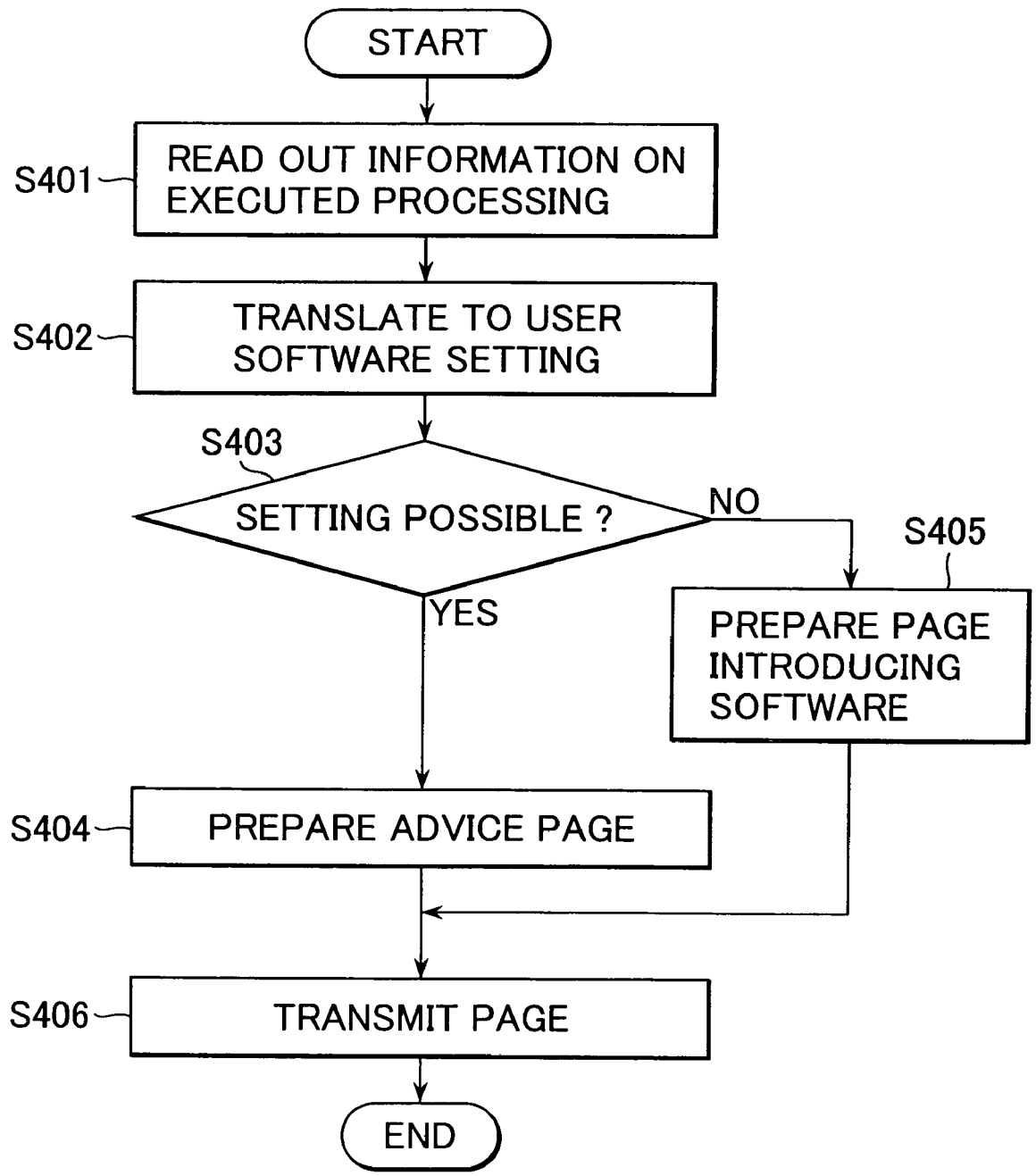
FIG. 20 it presents a flowchart of the processing executed in step S212 in FIG. 11.

The following is an explanation of the image editing advice control, given in specific details. FIG. 20 presents a flowchart of the processing executed in step S213 in FIG. 11.

In step S401, information indicating the image processing executed in step S205 and step S209 in FIG. 10 to optimize the image is read out. In step S402, the image processing is converted to an edit setting (editing condition) for the image editing software program used by the user which will achieve image data modification equivalent to the modification of the image data achieved through the image processing. Data indicating edit settings corresponding to various types of image processing are stored in the image information database 211, as in the case of photographic settings.

In step S403, a detection is executed to determine whether or not the edit setting can be selected in the user's image editing software program. The operation proceeds to step S404 if the edit setting can be selected, whereas the operation proceeds to step S405 if the edit setting cannot be selected. In step S404, an advice page describing how the user's image editing software should be operated to obtain an image equivalent to the optimized image.

Figure 21:
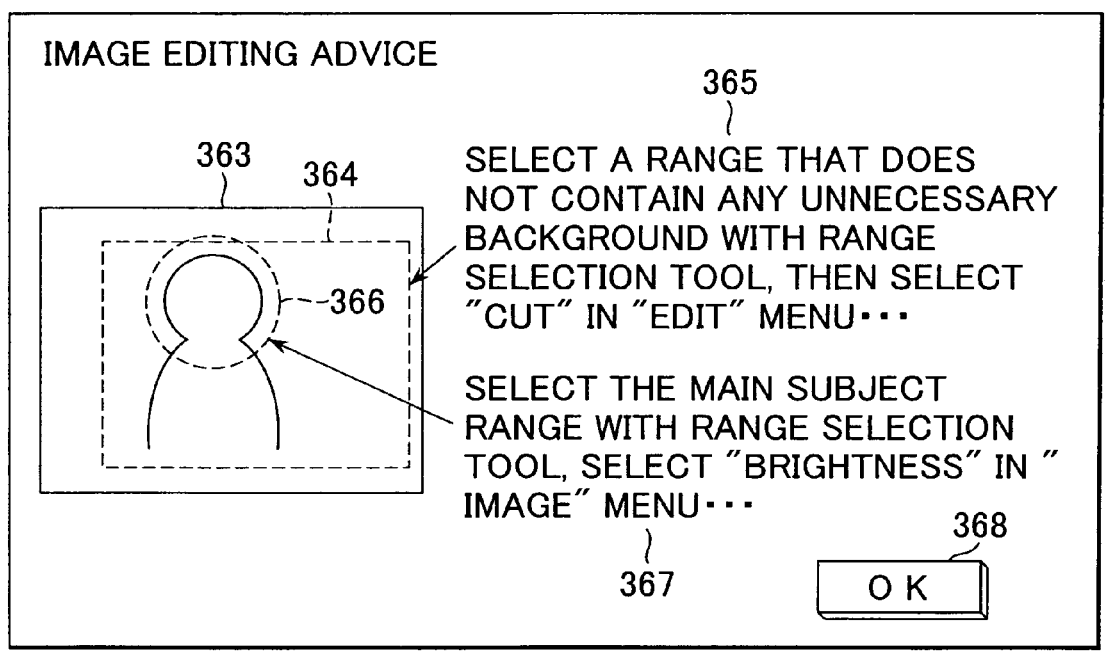
FIG. 21 presents an example of an image editing advice page.

FIG. 21 presents an example of an image editing advice page. In an image display area 363 in the page shown in FIG. 21, the image on which the advice is offered is displayed. Lines 364 and 366 each indicate a point at which the image should be edited. Advisory comments on how the image editing software program should be operated and the like are displayed as comments 365 and 367. In the page shown in FIG. 21, the correspondence between the line 364 and the comment 365 is indicated by the arrow so as to prompt the user to edit the image over the area indicated by the line 364 by following the advisory comments provided as the comments 365 to obtain an optimal image. In addition, the advice ends if an "OK" button 368 is clicked.

In step S405 in FIG. 20 to which the operation proceeds if the edit setting cannot be selected in the user's image editing software program, a page introducing an image editing software program in which the desired edit setting can be selected is prepared. In step S406, the advice page thus prepared is transmitted to the user-side personal computer 1.

(Failure Diagnosis Control)

Next, the failure diagnosis control executed in step S204 in FIG. 10 is explained. As explained earlier, if there is a marked mismatch between the information collected to prepare the advice and the results of the analysis executed on the image data, a failure may have occurred in the camera used for the photographing operation.

The failure diagnosis control is executed to conduct an even more detailed failure diagnosis and provide the results of the failure diagnosis to the user. In addition, if the cause of the failure is in the software, an update to the newest software version is enabled, whereas if the cause of the failure is mechanical, the user is advised to take the camera in for repairs and an estimate of the repair costs is output.

Figure 22:
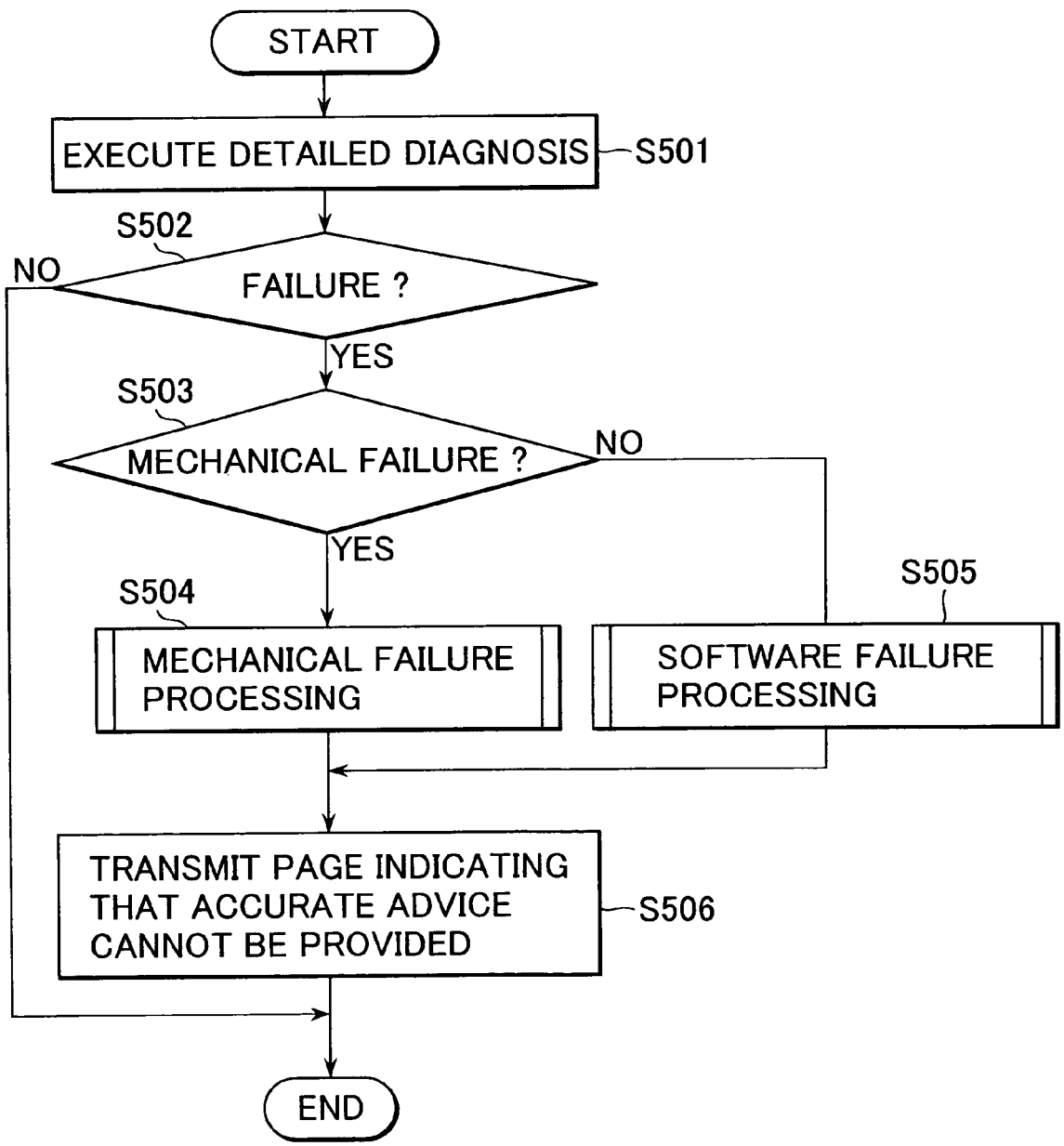
FIG. 22 presents a flowchart of the control implemented to execute a failure diagnosis.

The following is a detailed explanation of the failure diagnosis control. FIG. 22 presents a flowchart of the control implemented when executing the failure diagnosis. This flow starts as it is decided in step S203 in FIG. 10 based upon the information obtained to prepare the advice and the results of the image data analysis that a failure may have occurred in the camera.

In step S501, further data are added to the data used to prepare the advice to investigate in further detail whether or not a failure has occurred. The additional data includes information indicating the failure statuses among other digital cameras of the same model, information indicating the digital camera production lot, information indicating the version of the software program in the digital camera, information indicating the digital camera purchase date, information indicating the number of times light has been emitted by the strobe to date, information indicating the number of times the shutter has been opened/closed to date and the like. By executing the failure diagnosis based upon even more diverse data, a more accurate diagnosis is enabled.

It is to be noted that some of the additional data listed as data used in the failure diagnosis in the embodiment may be the data used to execute the advice processing. In other words, some of the data used in the advice processing may also be used when executing the failure diagnosis.

In step S502, a decision is made as to whether or not an abnormality has manifested based upon the results of the diagnosis executed in conformance to a detailed diagnosis program. The operation proceeds to step S503 if the diagnosis results indicate that an abnormality has occurred, whereas this processing flow ends if the diagnosis results indicate that the camera is operating normally to allow the operation to return to the advice flow.

In step S503, a decision is made at as to whether or not the abnormality is due to a mechanical problem. If the abnormality has resulted from a mechanical problem, the operation proceeds to step S504, whereas if the abnormality is due to a software problem instead of a mechanical problem, the operation proceeds to step S505.

In step S504, processing is executed to rectify the failure caused by the mechanical problem. In step S505, processing is executed to rectify the failure caused by the software problem. The two different types of processing are to be described in detail later in reference to FIGS. 24 and 28.

In step S506, a page stating that accurate advice cannot be provided due to a possible failure, such as that shown in FIG. 23, is transmitted, and then the operation returns to the advice flow as an "OK" button 338 is clicked.

(Mechanical Failure Control)

Figure 24:
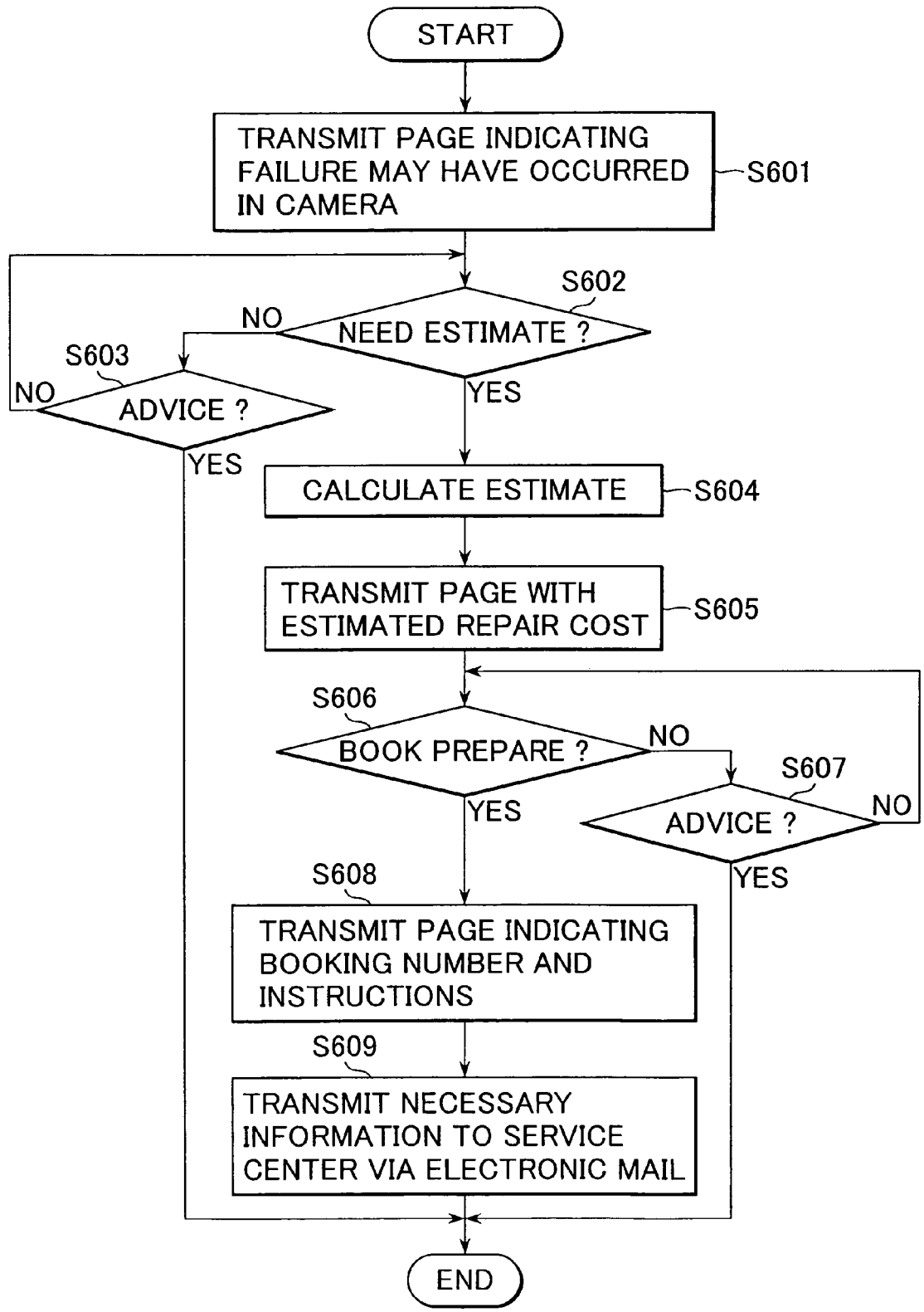
FIG. 24 presents a flowchart of the control executed in step S504 in FIG. 22.

The following is an explanation of the processing executed to rectify a failure caused by a mechanical problem. FIG. 24 presents a flowchart of the control executed in step S504 in FIG. 22.

Figure 25:
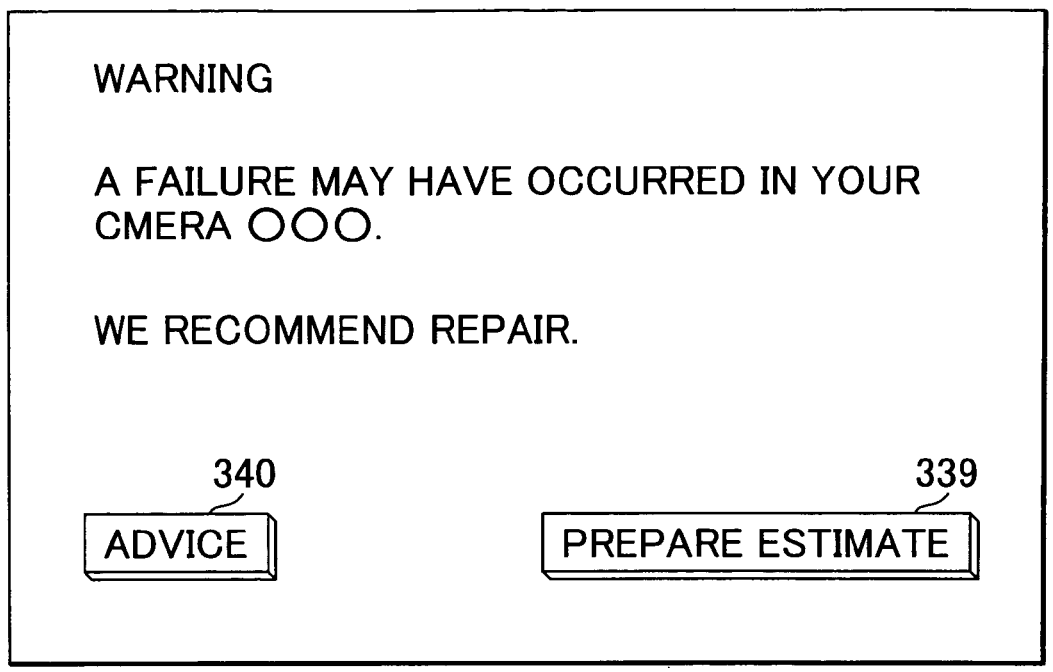
FIG. 25 presents an example of a page that maybe brought to indicate that a failure may have occurred in the camera with which the image data were photographed.

In step S601, a page such as that shown in FIG. 25 indicating that there may be a failure in the camera with which the image data were photographed is transmitted. The page includes a "prepare estimate" button 339 to be operated to output an estimate of the cost of the repair. The page also includes an "advice" button 340 which is clicked to allow the advice service to continue. In step S602, a detection is executed to determine whether or not a signal indicating the "prepare estimate" button 339 has been clicked has been received. The operation proceeds to step S604 if a signal indicating that the "prepare estimate" button 339 has been clicked has been received, whereas the operation proceeds to step S603 if no signal indicating that the "prepare estimate" button 339 has been clicked has been received.

In step S603, a detection is executed to determine whether or not a signal indicating that the "advice" button 340 has been clicked has been received. The flow of this processing ends if a signal indicating that the "advice" button 340 has been clicked has been received, whereas the operation returns to step S602 if no such signal has been received.

Figure 26:
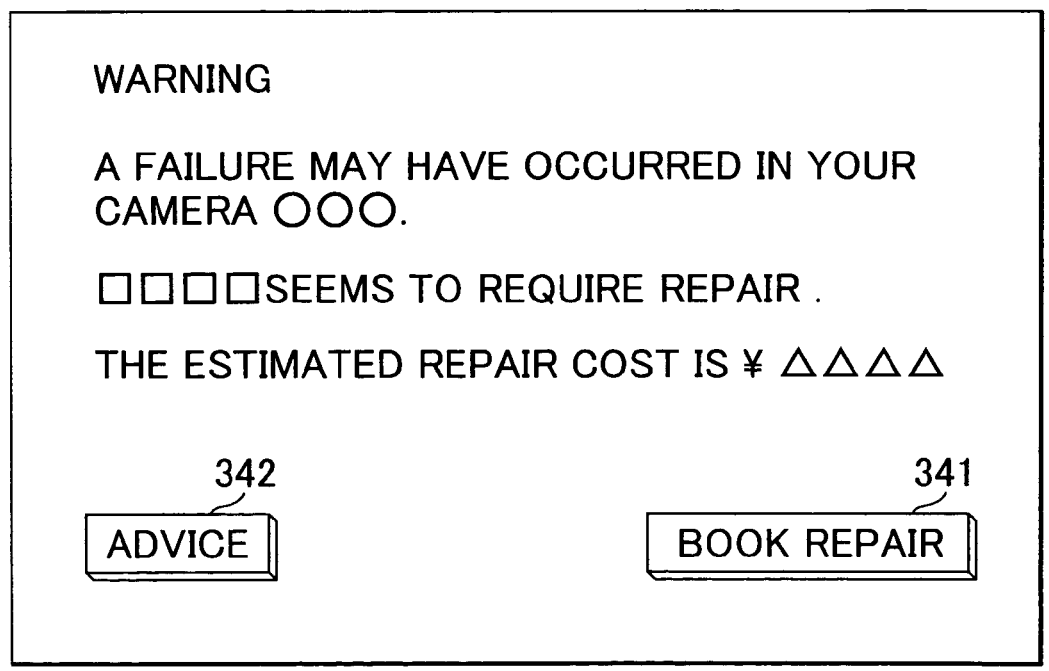
FIG. 26 presents an example of a page that maybe brought up to indicate the repair cost.

In step S604, a repair fee is calculated by referencing a fee table based upon the results of the failure diagnosis. In step S605, a page indicating the repair cost, such as that shown in FIG. 26, is transmitted. This page includes a "book repair" button 341 to be clicked to actually make a repair service appointment. The page also includes an "advice" button 342 which is clicked to allow the advice service to continue. In step S606, a detection is executed to determine whether or not a signal indicating that the "book repair" button 341 has been clicked has been received. The operation proceeds to step S608 if a signal indicating that the "book repair" button 341 has been clicked has been received, whereas the operation proceeds to step S607 if no such signal has been received. In step S607, a detection is executed to determine whether or not a signal indicating that the "advice" button 342 has been clicked has been received. The flow of this processing ends if a signal indicating that the "advice" button 342 has been clicked has been received, whereas the operation returns to step S606 if no such signal has been received.

In step S608, a page indicating the repair booking number and explaining how to receive the repair service, such as that shown in FIG. 27, is transmitted. In step S609, information indicating the model name of the camera to undergo the repair service, the repair booking number, the failure condition and the like is transmitted via electronic mail to the service center which is to provide the repair service. In addition, similar information may be transmitted via electronic mail to the personnel in charge of the camera development as well.

(Software Failure Control)

Figure 28:
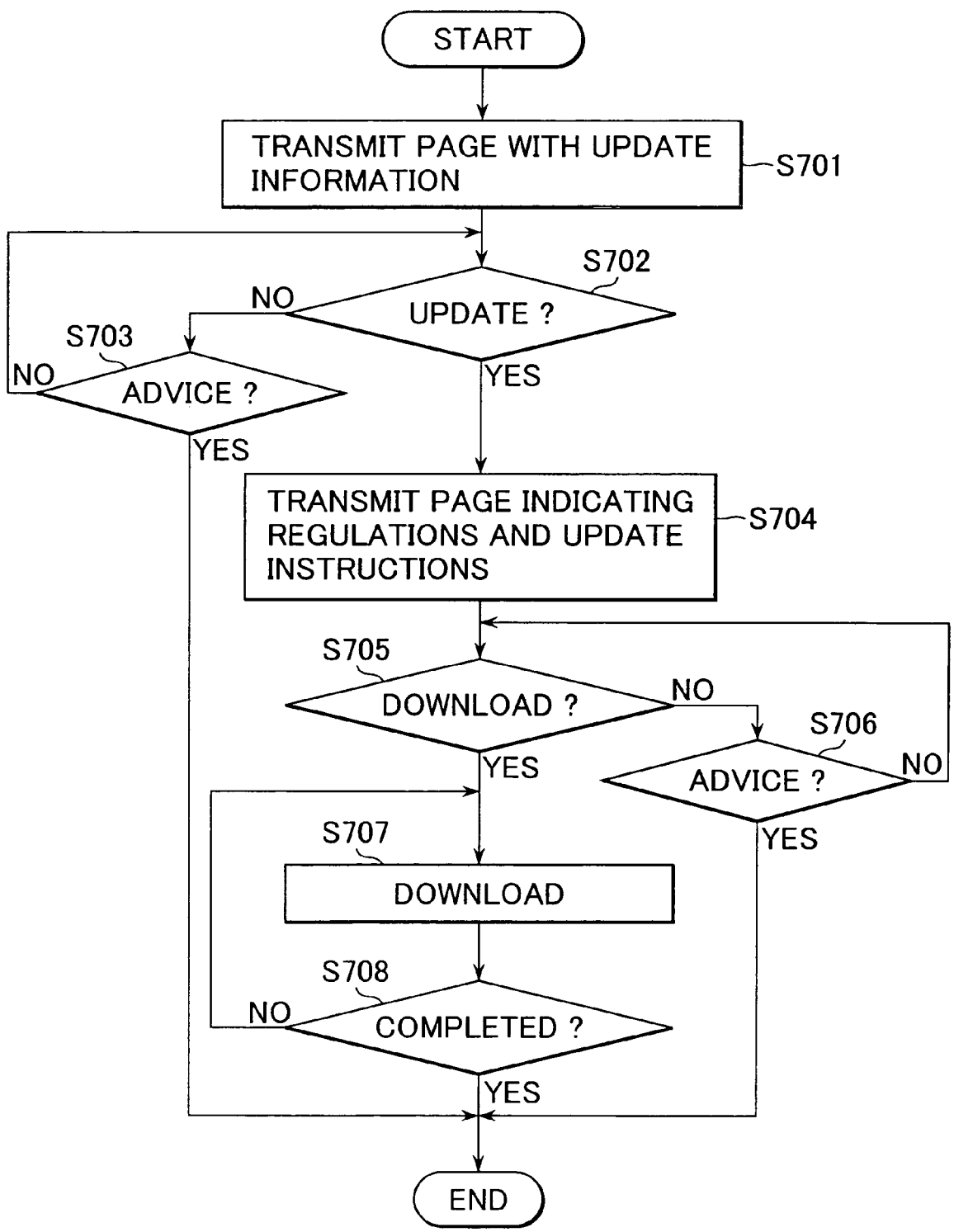
FIG. 28 presents a flowchart of the control executed in step S505 in FIG. 22.

The following is an explanation of the processing executed to rectify a failure caused by a software problem. FIG. 28 presents a flowchart of the control executed in step S505 in FIG. 22.

Figure 29:
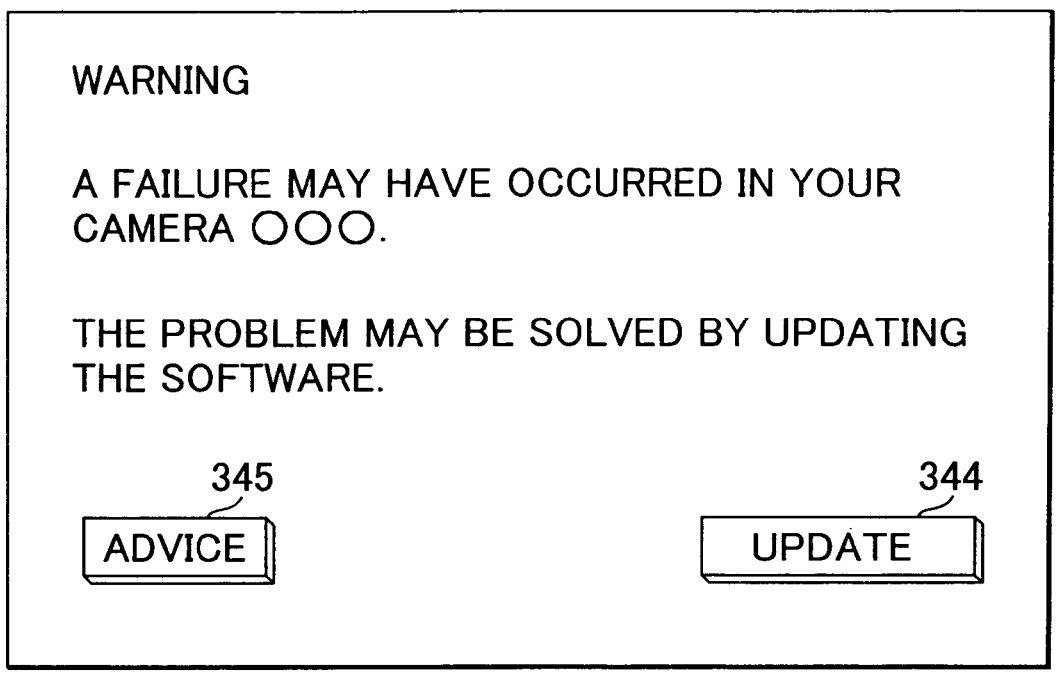
FIG. 29 presents an example of a page that may be brought to indicate that a failure may have occurred in the camera with which the image data were photographed.

In step S701, a page indicating that a failure may have occurred in the camera and that the failure can be rectified by updating the software, such as that shown in FIG. 29, is transmitted. This page includes an "update" button 344 to be clicked to move to a page for downloading the software update version and an "advice" button 345 to be clicked to return to the advice service.

In step S702, a detection is executed to determine whether or not a signal indicating that the "update" button 344 has been clicked has been received. The operation proceeds to step S704 if a signal indicating that the "update" button 344 has been clicked has been received, whereas the operation proceeds to step S703 if no such signal has been received. In step S703, a detection is executed to determine whether or not a signal indicating that the "advice" button 345 has been clicked has been received. The flow of this processing ends if a signal indicating that the "advice" button 345 has been clicked has been received, whereas the operation returns to step S702 if no such signal has been received.

Figure 30:
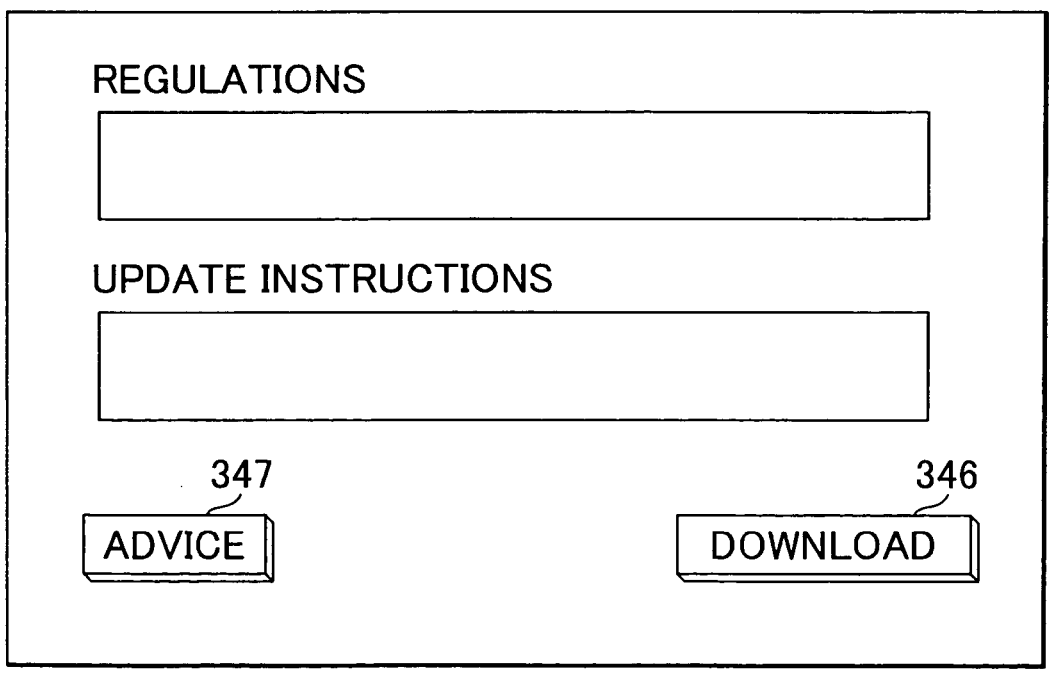
FIG. 30 presents an example of a page to provide information on the regulations and the method regarding downloading a software update.

In step S704, a page indicating the updated software downloading regulations and the downloading method, such as that shown in FIG. 30, is transmitted. The page includes a "download" button 346 to be clicked to start a download operation and an "advice" button 347 to be clicked to return to the advice service. Instep S705, a detection is executed to determine whether or not a signal indicating that the "download" button 346 has been clicked has been received. The operation proceeds to step S707 if a signal indicating that the "download" button 346 has been clicked has been received, whereas the operation proceeds to step S706 if no such signal has been received.

In step S706, a detection is executed to determine whether or not a signal indicating that the "advice" button 347 has been clicked has been received. The flow of this processing ends if a signal indicating that the "advice" button 347 has been clicked has been received, whereas the operation returns to step S705 if no such signal has been received.

In step S707, the software program is transmitted for the download. In step S708, a detection is executed to determine whether or not the download operation has been completed, and if the download operation has been completed, the flow of this processing ends, whereas if the download operation has not been completed, the download operation continues.

As described above, the software program can be updated not simply because the software program has become outdated but because the diagnosis results indicate that a failure has manifested in the camera due to a software problem and, as a result, redundant download operations are not performed. In addition, the exact point at which the abnormality has manifested in the software program can be pinpointed through the diagnosis.

The software program is updated if a failure attributable to a software problem has occurred in the camera in the embodiment. While there are problems that cannot be solved by updating the software and thus, the software may be updated after making a decision as to whether or not the problem can be solved through an update, other potential problems can be prevented by updating the software program to the latest version under normal circumstances. The software update is also effective since even the latest version of the software program already installed in the camera may be defective.

As described above, the failure diagnosis is executed by using the information having been collected to be used for the advice service in the first embodiment. Since the system achieved in the embodiment does not require the user to perform any extra operation to have the failure diagnosis executed apart from the operation the user needs to perform in order to receive the advice service, the failure diagnosis is executed for the user without placing any extra onus on the user.

It goes without saying that a failure diagnosis service offering a failure diagnosis alone may be set up as a separate service from the advice service. Alternatively, the failure diagnosis may be executed as a tie-in with a service other than the advice service.

In addition to the automatic diagnosis, a further failure diagnosis may be conducted by the service personnel based upon a warning mail containing the image data, which is transmitted thereto, when the initial diagnosis results indicate that a failure may have occurred.

Through the advice service achieved in the first embodiment explained above, the user can receive both photographing advice and image editing advice separately from each other. In addition, advice is offered to the user by combining the photographing advice and the image editing advice since there are limits for obtaining an optimized image to the photographic settings that can be selected for photographing operations and corrections that can be achieved by editing images.

In the first embodiment, the user selects ether the photographing advice service or the image editing advice service after entering the user information. Instead, the system may ask the user to indicate whether he wishes to receive photographing advice or image editing advice before he enters the user information and prompt the user to enter different types of information depending upon his choice.

These advice services may be sold as software services available in software run on personal computers or the like instead of as online services offered via the Internet.

Second Embodiment

In the first embodiment, the user selects image data and enters the necessary information over a plurality of pages. The second embodiment, on the other hand, is characterized in that the user can perform various tasks almost in a single page.

It is to be noted that since the system configuration and the advising control and the like adopted in the second embodiment are identical to those in the first embodiment, their explanation is omitted.

Figure 31:
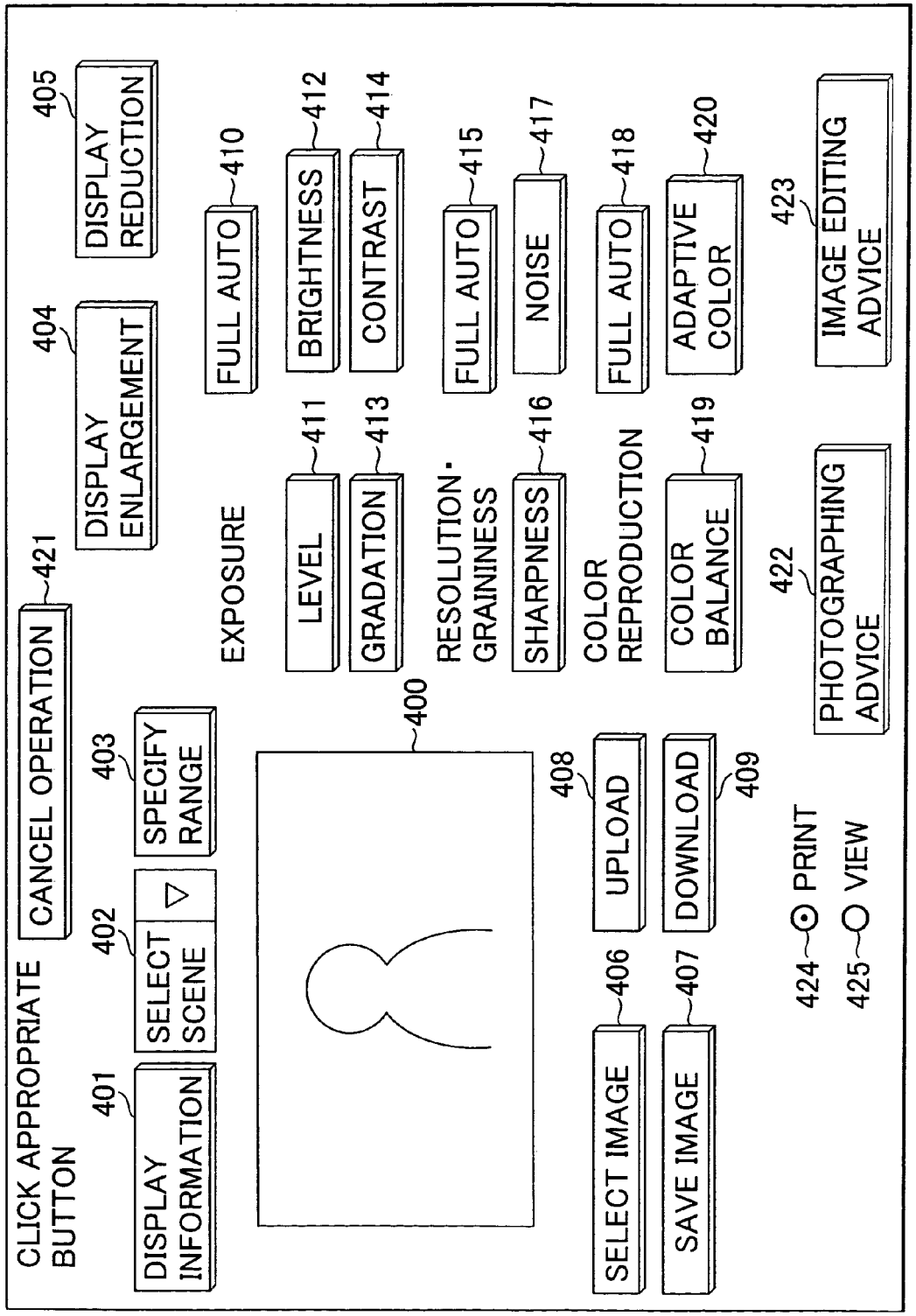
FIG. 31 presents an example of a page that may be brought up on display after the user logs into the advice service.

As the log-in is completed through an operation similar to that executed in the first embodiment, a page such as that shown in FIG. 31 is brought up on display at the user-side personal computer 1. FIG. 31 presents an example of a page that may be brought up on display when the user has logged into the advice service.

A "display information" button 401 in FIG. 31 is clicked to check appended data related to the image data. When the "display information" button is clicked, the information appended to the image data is brought up on display. The information is mostly information having been automatically appended to the image data during the photographing operation executed in the digital camera.

A "select scene" menu 402 allows the user to set the scene corresponding to the image data selected as the advice object. A specific photographic scene such as a landscape or portrait of a person can be selected by clicking the right hand side of the "select scene" menu 402.

A "specify range" button 403 is clicked to specify an area corresponding to the main subject in the image. The desired range can be specified through a click-and-drag operation within the image area after clicking the "specify range" button 403. A "display enlargement" button 404 is operated to display the image displayed in an image display area 400 in an enlargement. A "reduce display" 405 is operated to display the image displayed in the image display area 400 in a reduced size.

A "select image" button 406 is operated to select image data inside an album saved in the server-side computer 2 as the advice object. The selected image data are then displayed in the image display area 400. A "save image" button 407 is clicked to save the image data having been optimized through the image processing executed under the advising control into the server-side computer 2.

An "upload" button 408 is operated to upload image data saved in the user's personal computer 1 or in a memory in a peripheral device as the advice object. The uploaded image data are then displayed in the image display area 400.

A "download" button 409 is operated to download the image data having been optimized through the image processing executed under the advising control into the user's personal computer 1. In addition, a print radio button 424 and a view radio button 425 are provided under the "download" button 409.

If the print radio button 424 is currently selected, image data are undergone image processing executed so that the image data can be printed out in the optimal manner on the printer owned by the user based upon printer information on the printer owned by the user and the image data thus processed are downloaded. If, on the other hand, the view radio button 425 is currently selected, image data are undergone image processing executed so as to ensure the optical image to be viewed on the monitor at the user-side personal computer 1 based upon monitor information on the user's monitor and the image data thus processed are downloaded. Information stored in the user information database area 212 in the memory 201 at the server-side computer 2 is used as the printer information and the monitor information. Alternatively, the user may be prompted to enter the printer information or the monitor information before the image data download.

A "full auto" button 410, a "level" button 411, a "brightness" button 412, a "gradation" button 413 and a "contrast" button 414 are clicked when executing image processing related to the exposure on the image selected as the advice object. If the "full auto" button 410 is clicked, an image analysis is executed in conformance to a program in the server-side computer 2 and image processing is then executed to achieve the optimal exposure. Then, the image resulting from the image processing is displayed in the image display area 400. If one of the "level button 411, the "brightness" button 412, the "gradation" button 413 and the "contrast" button 414 is clicked, the user is enabled to execute the corresponding image processing manually.

A "full auto" button 415, a "sharpness" button 416 and a "noise" button 417 are clicked to execute image processing related to the resolution and the graininess of the image selected as the advice object. If the "full auto" button 415 is clicked, an image analysis is executed in conformance to a program in the server-side 2 and image processing is executed to achieve the optimal resolution and graininess. The image resulting from the image processing is then displayed in the image display area 400. If ether the "sharpness" button 416 or the "noise" button 417 is clicked, the corresponding image processing can be executed by the user manually.

A "full auto" button 418, a "color balance" button 419 and an "adaptive color" button 420 are clicked to execute image processing related to the color reproduction on the image selected as the advice object. If the "full auto" button 418 is clicked, an image analysis is executed in conformance to a program in the server-side computer 2 and image processing is executed to achieve the optimal color reproduction. The image resulting from the image processing is then displayed in the image display area 400. If ether the "color balance" button 419 or the "adaptive color" button 420 is clicked, the corresponding image processing can be executed by the user manually.

A "cancel operation" button 421 is clicked to cancel a single operation executed in the image processing.

The control implemented on the image analysis and the image optimization processing executed on the image data selected as the advice object is similar to that implemented in the first embodiment. It is to be noted that while the image data having undergone the automatic image processing executed at the server-side computer 2 first are then readjusted through a manual correction in the first embodiment, the second embodiment, too, may adopt this procedure.

Since the information needed to prepare advice is entered in almost a single page, as described above, the information input operation can be completed within a short period of time in the second embodiment without having to navigate through various pages.

As ether a "photographing advice" button 422 or an "image editing advice" button 423 in FIG. 31 is clicked, the corresponding advice processing is executed based upon the information having been entered by the user.

The "photographing advice" button 422 and the "image editing advice" button 423 are clicked much in the same manner as the "photographing advice" button 327 and the "image editing advice" button 328 in the first embodiment for similar purposes. The control executed after the "photographing advice" button 422 or the "image editing advice" button 423 is clicked is identical to the control executed after the "photographing advice" button 327 or the "image editing advice" button 328 is clicked in the first embodiment, and for this reason, its explanation is omitted.

Third Embodiment

In the first and second embodiments, the server-side computer 2 automatically executes the image optimization processing on the image data in conformance to a predetermined program. In addition, the user himself who photographed the image is allowed to execute image processing through a manual operation. Then, advice is offered based upon the image processing having been executed on the image data. In the third embodiment, on the other hand, a third party instead of the user who photographed the image, executes image optimization processing on the image data through a manual operation and then offers the advice based upon the image processing.

Figure 32:
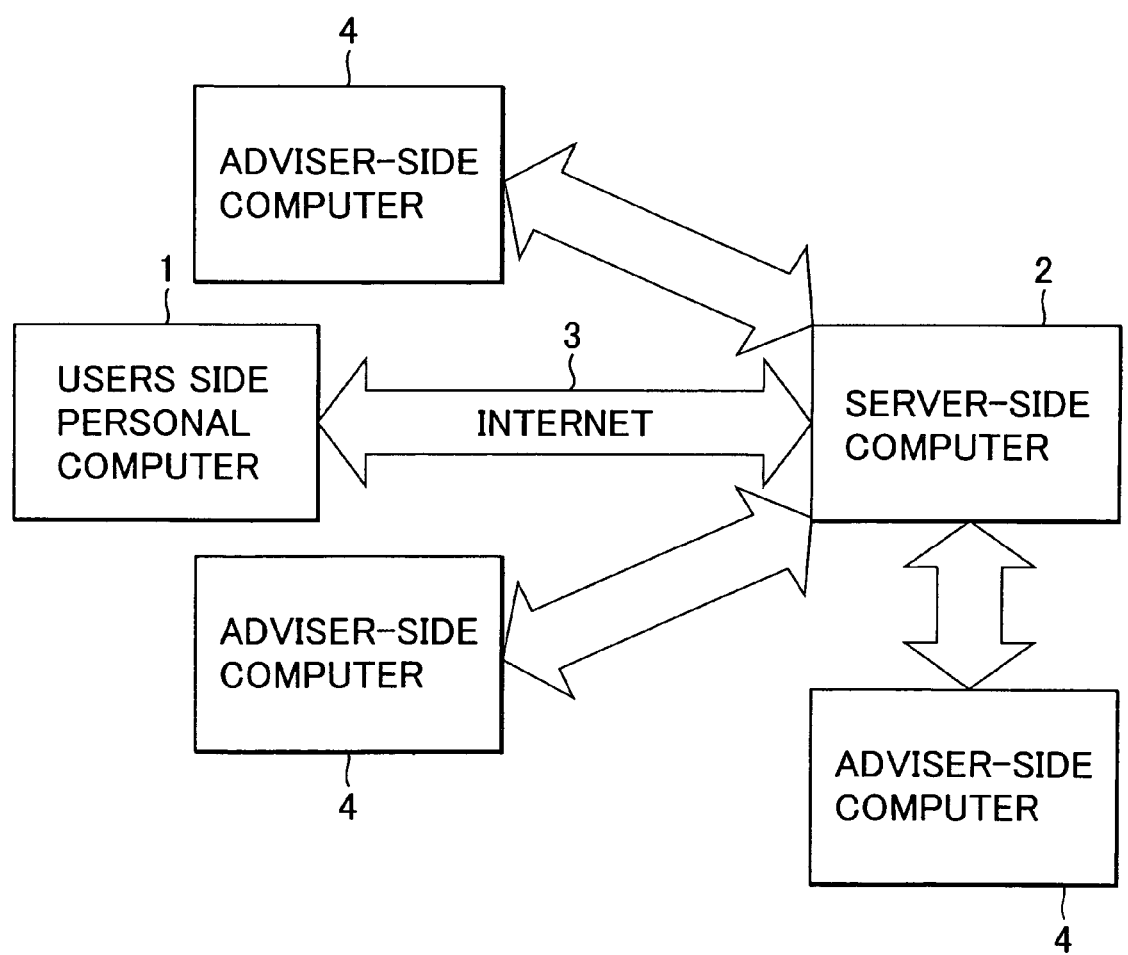
FIG. 32 illustrates the system configuration adopted in the third embodiment of the present invention.

FIG. 32 illustrates the system configuration adopted in the third embodiment of the present invention.

The system achieved in the third embodiment comprises a user-side personal computer 1, a server-side computer 2, adviser-side personal computers 4 and the Internet 3 that connects computers so as to enable them to communicate with one another. While FIG. 32 shows the system achieved by utilizing the Internet 3, the present invention may be also adopted in the system that utilizes a different type of network such as a LAN, an extranet or the like.

The user-side personal computer 1 in FIG. 32 is a personal computer operated by a user requesting advice (hereafter referred to as an advice client). The adviser-side personal computers 4 are personal computers operated by advisers who provide advice clients with advice.

The following is a detailed explanation of the advice services provided in the third embodiment. The advice service is provided in an electronic bulletin board format in the third embodiment. The service operation in the third embodiment is achieved as an advice client requiring advice uploads his comments, the image data and related information onto a bulletin board and a third party adviser having viewed the bulletin board page uploads his advice onto the bulletin board.

Figure 33:
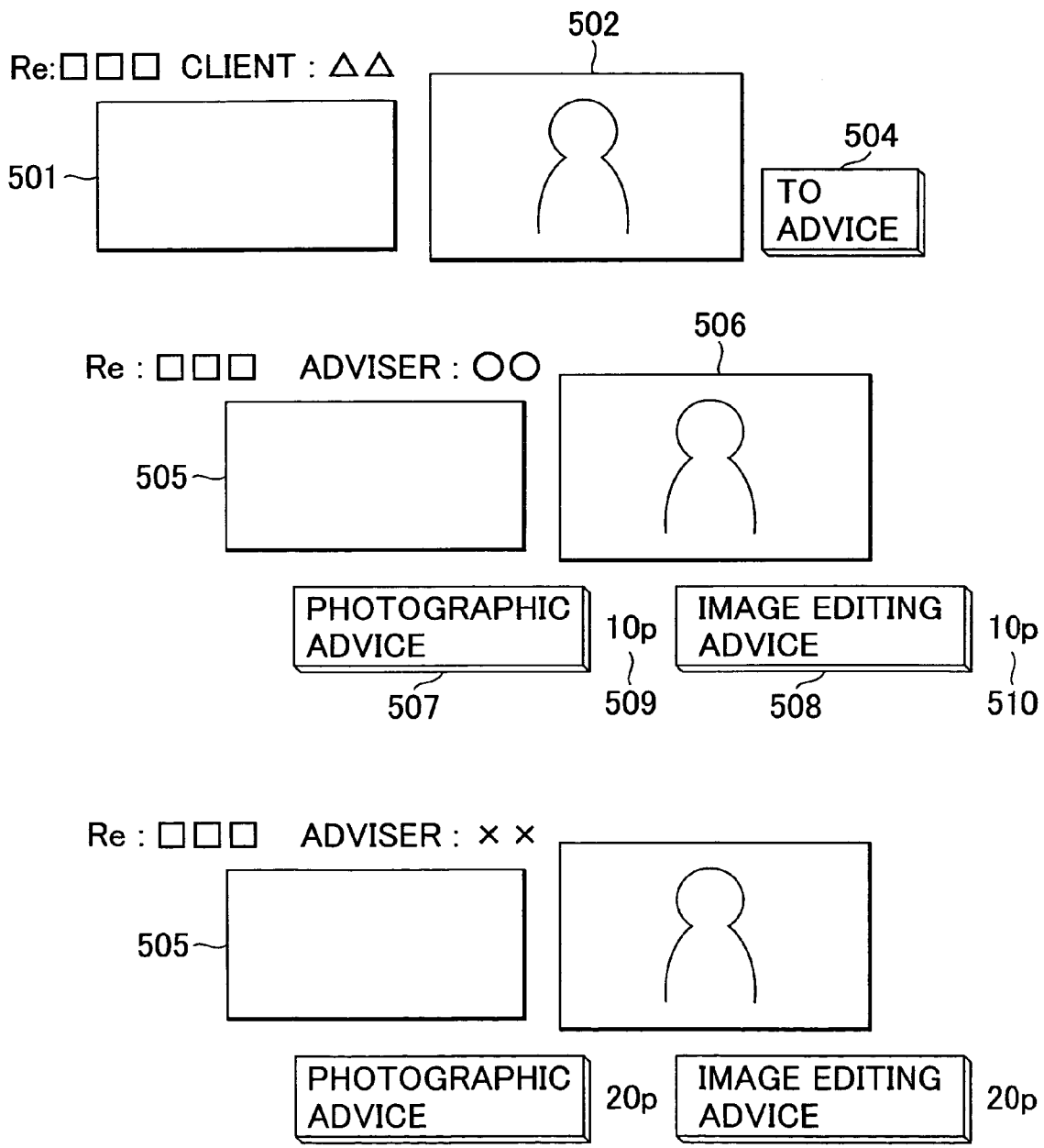
FIG. 33 shows part of the bulletin board page.

FIG. 33 shows part of the bulletin board page set up in the advice services in the third embodiment. FIG. 33 only shows a single advice request placed by a given advice client and advice offered by an adviser in response to the advice request, extracted from the bulletin board page. In FIG. 33, the image and the comments uploaded by the advice client are posted in comments posting area 501 and an image posting area 502. A "to advise" button 504 is clicked by an adviser having viewed the bulletin board to extend advice on the image. The operation executed after the "to advise" button 504 is clicked is to be described in detail later.

After the advice by the adviser is uploaded, the image and the comments uploaded by the adviser are posted in comments posting area 505 and an image posting area 506. A "photographing advice" button 507 is clicked by the advice client wishing to receive advice with regard to the photographing method. The control executed by the server-side computer 2 after the "photographing advice" button 507 is clicked is to be described in detail later. A point indicator 509 to the right of the "photographing advice" button 507 indicates the number of points to be awarded by the advice client to the adviser for the photographing advice. The advising bulletin board achieved in the third embodiment adopts a system in which advice clients pay advisers with points.

An "image editing advice" button 508 is clicked by the advice client wishing to receive advice on the method of editing the image with an image editing software program. The control executed by the server-side computer 2 after the "image editing advice" button 508 is clicked is to be described in detail later. A point indicator 510 to the right of the "image editing advice" button 508 indicates the number of points to be awarded by the advice client to the adviser for the image editing advice.

The following is a specific explanation on how the advice client user uploads an image and comments. It is to be noted that an explanation of features of the third embodiment which are identical to those of the first and second embodiments is omitted.

The advice client enters the user information and the information on the image data in the pages shown in FIG. 3, 5 to 9 transmitted from the server-side computer 2 as explained in reference to the first embodiment. Then, as the advice client clicks the "OK" button 321 in the page shown in FIG. 9, the server-side computer 2 transmits the page shown in FIG. 34.

Figure 34:
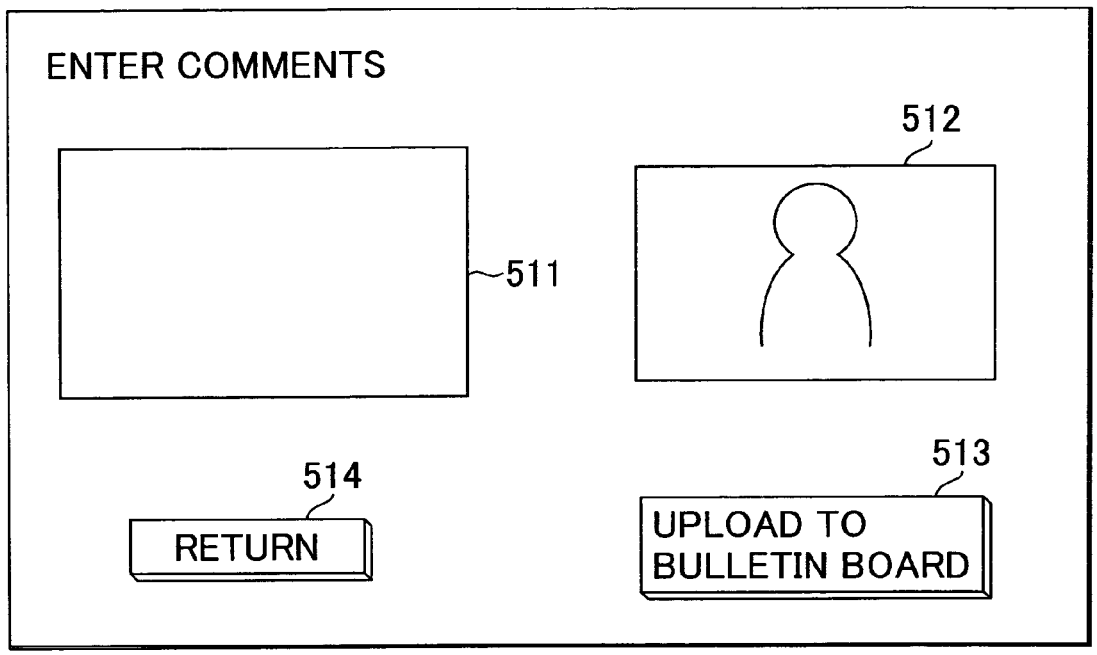
FIG. 34 presents an example of a page that may be brought up to allow the advice service client to upload image data and other information to the bulletin board.

FIG. 34 presents an example of a page that may be used by the advice client to upload information including the image data onto the bulletin board. The advice client can upload the selected image, the comments and the like onto the bulletin board by clicking an "upload to bulletin board" button 513 after entering his comments into a comment field 511 in the page shown in FIG. 34. The selected image is displayed in an image area 512. In addition, the advice client is allowed to go back to the page shown in FIG. 9 by clicking a "return" button 514 to re-enter information or the like.

Next, an explanation is given on how the adviser uploads advice for the advice client onto the bulletin board.

Figure 35:
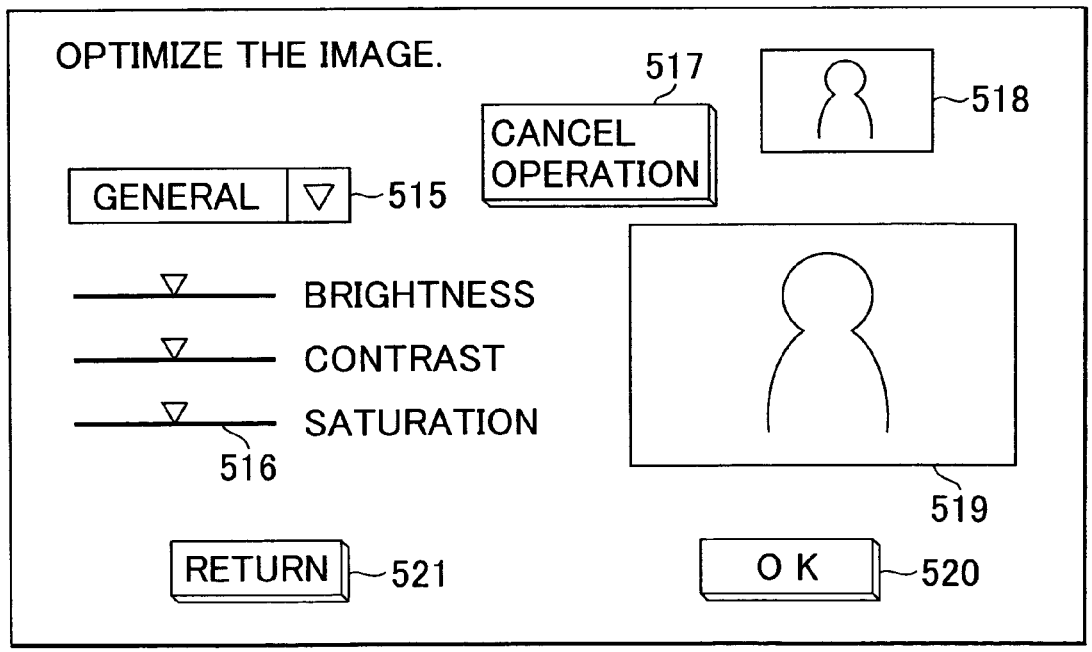
FIG. 35 presents an example of a page that may be brought up to enable the adviser to perform the advising operation.

As the adviser clicks the "to advise" button 504 located to the right of the image uploaded by the advice client in FIG. 33, the server-side computer 2 transmits the page shown in FIG. 35 to the adviser-side personal computers 4. FIG. 35 presents an example of a page that enables the adviser to perform an advising operation. The adviser having received the page shown in FIG. 35 edits the image so as to achieve an image that the adviser considers optimal.

An image area 518 in FIG. 35 is an area where the image corresponding to the image data uploaded by the advice client is displayed. An image area 519 is an area where the image having been edited by the adviser is displayed.

An edit menu 515 is used to select functions that are to be controlled with sliders 516 for editing purposes. In the edit menu 515, different functions can be selected to be controlled with the sliders 516. The items that can be selected in the edit menu 515 include "general", "color balance" and the like. For instance, if "general" is selected in the edit menu 515, the functions that can be controlled with the sliders 516 are "brightness", "contrast" and "saturation", as shown in FIG. 35. If, on the other hand, "color balance" is selected in the edit menu 515, the color balance among red, green and blue can be controlled with the sliders 516 and accordingly, "red", "green" and "blue" are indicated on the right side of the sliders 516. A "cancel" operation" button 517 is operated to cancel the image editing executed through the sliders 516.

The page shown in FIG. 35 is prepared so that itemized information on the image editing performed by the adviser on the image, information on the image editing procedure and the like are temporarily stored as image editing information into the adviser-side personal computers 4. The server-side computer 2 receives the data stored in the adviser-side personal computers 4 and executes advising control based upon the received data.

Figure 36:
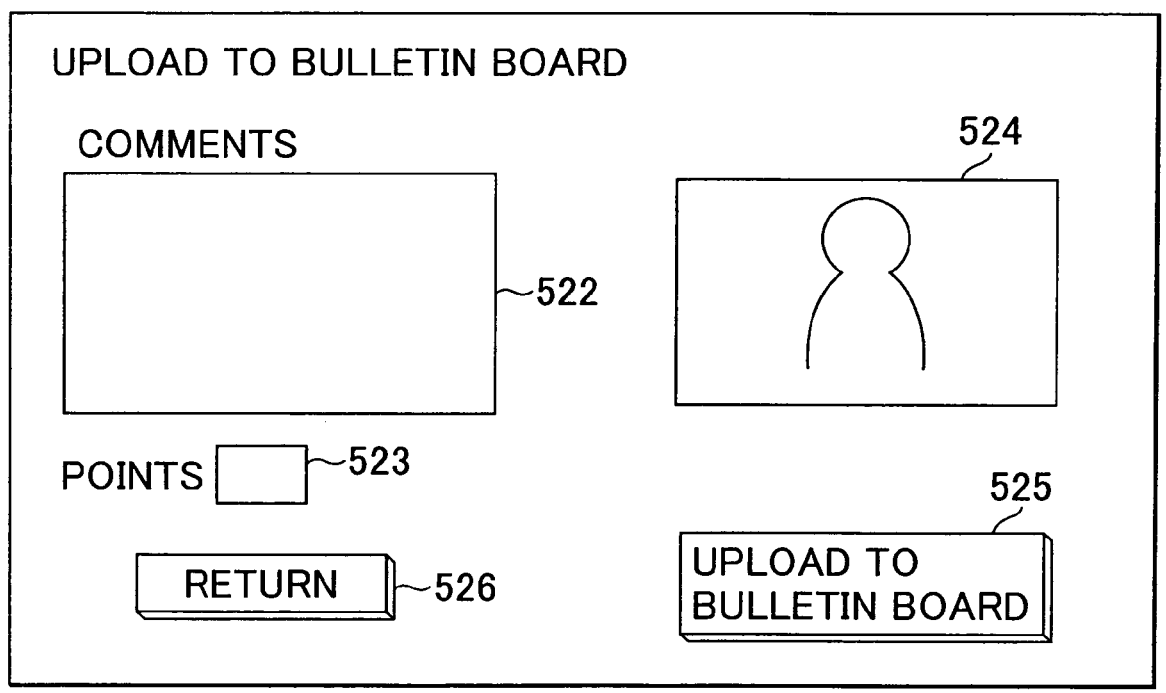
FIG. 36 shows the page used by a the adviser for confirmation before uploading the advice to the bulletin board.

As the adviser having completed the image edit processing clicks an "OK" button 520, the server-side computer 2 transmits the page shown in FIG. 36. If, on the other hand, the adviser clicks a "return" button 521, the advising operation is canceled and the display returns to the page shown in FIG. 33.

FIG. 36 shows a page used by the adviser to check his advice before uploading it to the bulletin board. The adviser performs a final check of the image editing results by viewing the image displayed in an image area 524 in the page shown in FIG. 36. The adviser also enters advisory comments to be posted on the bulletin board into a comments field 522. In addition, he enters the number of points he wishes to receive as the payment for the advice into a point field 523. Then, he clicks an "upload to bulletin board" button 525 to transmit the edited image data, the advisory comments and the like to the server-side computer 2 and thus, his advice is loaded onto the bulletin board. At the same time, the image editing information having been stored in the adviser-side personal computers 4 on a temporary basis is transmitted to the server-side computer 2. As the adviser clicks a "return" button 526, the display returns to the page shown in FIG. 35 so as to allow the adviser to re-edit the image.

The advice service achieved in the third embodiment includes the following functions.

If the advice message automatically prepared by the server-side computer 2 includes any term that is preregistered in the server-side computer 2, a link to a glossary page explaining the term is automatically pasted on that term. A similar function achieved in the first embodiment has been briefly explained in reference to FIGS. 16 and 18. A more detailed explanation is given on the function achieved in the third embodiment. For instance, if the advice message includes a comment "perform a daytime synchro photographing operation" (see FIG. 16), a link for jumping to the page explaining the term "daytime synchro photographing" (see FIG. 18) is pasted onto the term. The advice client who does not understand the term can read the explanation of the term by clicking the term with the link pasted there upon. In addition, similar links maybe pasted on comments prepared by the adviser as well as the advice message prepared by the server-side computer 2.

The following is an explanation of the processing executed by the server-side computer 2 to provide advice to the advice client, including the processing executed to prepare links to glossary pages.

Figure 37:
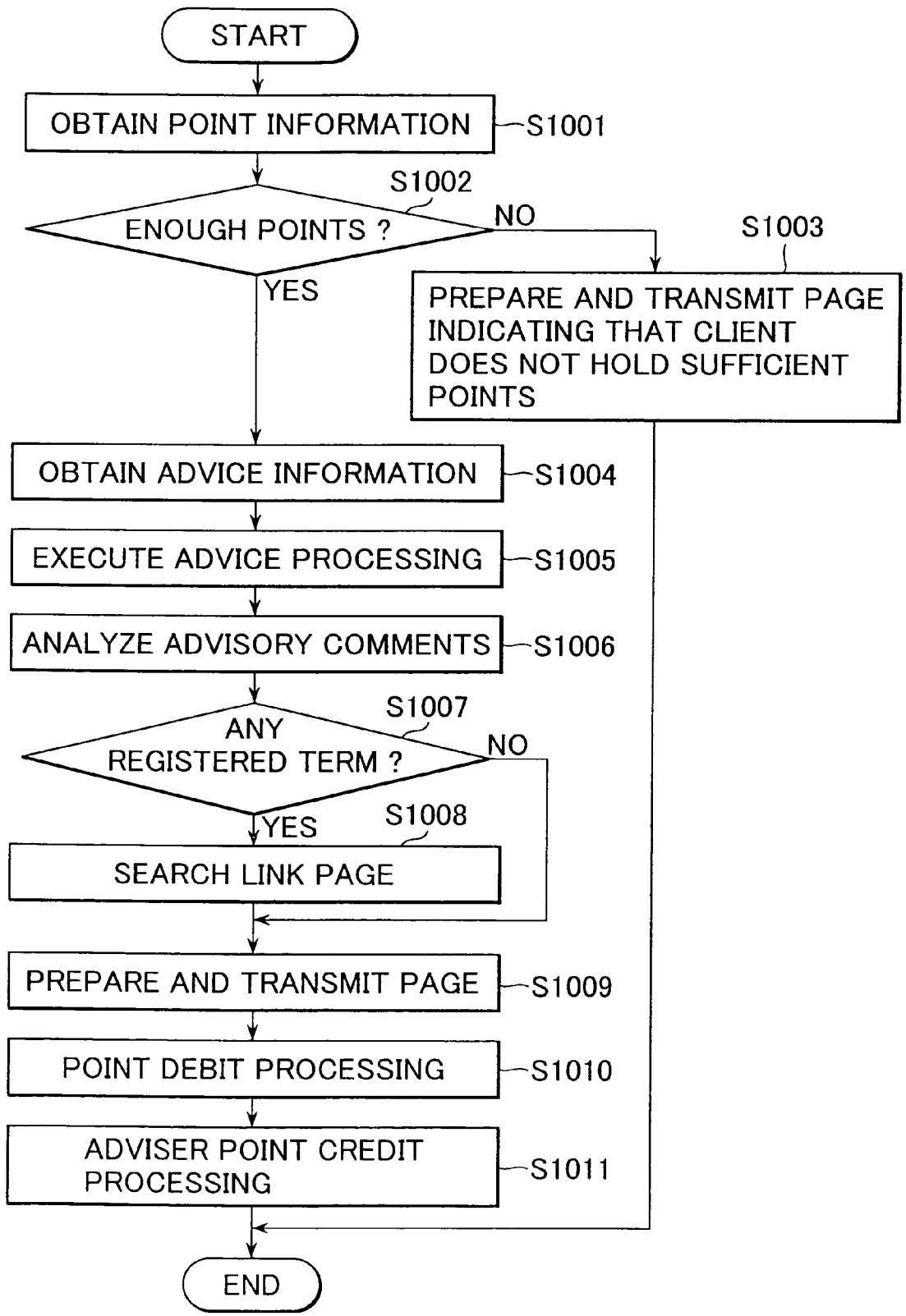
FIG. 37 presents a flowchart of the processing executed when providing the user with advice in the third embodiment.

FIG. 37 presents a flowchart of the processing executed to provide advice in the third embodiment. The flow of this processing starts upon receiving a signal indicating that the "photographing advice" button or the "image editing advice" button 508 in the page shown in FIG. 33 has been clicked.

In step S1001, point information indicating the number of points set by the adviser is obtained. In step S1002, a detection is executed to determine whether or not the number of points currently held by the advice client is at least equal to the number of points set by the adviser. If the number of points held by the advice client is sufficient, the operation proceeds to step S1004, whereas if the number of points is not sufficient, the operation proceeds to step S1003. In step S1003, a page informing the advice client that he cannot receive any advice due to an insufficient number of points and the page thus prepared is transmitted to the user-side personal computer operated by the advice client. In step S1004, the advice information having been received from bought adviser is obtained.

In step S1005, advice processing similar to that explained in reference to the first embodiment is executed based upon the user information provided by the advice client and the advice information. In step S1006, the advice message having been prepared through the advice processing in step S1005 is analyzed. In step S1007, a detection is executed to determine whether or not the advice message analyzed in step S1006 includes any registered terms. The operation proceeds to step S1008 if the advice message includes a registered term, whereas the operation proceeds to step S1009 if it does not include any registered terms. In step S1008, the address of the glossary page explaining each registered term in the advice message is detected. In step S1009, an advice page such as that shown in FIG. 16 is prepared and the advice page is transmitted to the user-side personal computer 1 operated by the advice client. In step S1010, points are taken off the points held by the advice client and those points are awarded to the adviser in step S1011.

As described above, the advice service is provided in an electronic bulletin board format in the third embodiment. As a result, advice can be extended by a plurality of advisers and thus, the advice client can expect to receive advice within a relatively short period of time.

Appropriate advice cannot be provided to the advice client without knowing the client's experience as a photographer, the model of the camera the client uses and the like which are considered to be personal information on the advice client. However, if such personal information is made available to third party advisers who are complete strangers, there is a risk of the personal information of the advice client becoming abused. Since the final advice is provided by the server-side computer 2, accurate and appropriate advice can be extended to the advice client without allowing any advisers to obtain various types of personal information related to the client in the third embodiment. In addition, since no adviser is allowed to view the advice that is ultimately provided to the advice client, third parties cannot access the personal information such as the name of the camera model and the types of accessories the client owns even by guessing. Thus, an advice service that assures privacy protection for advice clients can be achieved in the third embodiment.

In addition, since an adviser edits the image while viewing the image which is the advice object, the process of selecting the main subject area which needs to be executed in the first and second embodiments can be omitted as well.

Furthermore, if the advice client receives advice from a plurality of advisers, the advice client only needs to click ether the "photographing advice" button 507 or the "image editing advice" button 508 in correspondence to the image he prefers after he views the comments and the edited images uploaded by the advisers. In this case, no points are awarded to an adviser whose advice has not been clicked. Alternatively, the advice client may request advice from a given adviser by specifying the adviser in advance. Also, the number of points to be awarded to the adviser may be determined by the advice client instead of the adviser when the client requests advice.

Unlike in the first and second embodiments, there is a time lag that ensues between the time point at which the advice request is placed and the time point at which the client is provided with the advice from an adviser in the third embodiment. For this reason, a notice may be sent to the advice client by electronic mail when the advising operation by the adviser is completed. Alternatively, information indicating the advice is ready maybe transmitted to the advice client by electronic mail and then the advice client may view a specific page.

It is to be noted that advance permission should be obtained from the adviser to ensure that the image data prepared by the adviser can be freely used by the advice client for printing, copying and the like.

Fourth Embodiment

In the fourth embodiment, a third party adviser provides the final advice on the correct photographing method and the like based upon the image and the various types of information uploaded by the advice client. In the first through third embodiments, the final advice is provided by the server-side computer 2. In the fourth embodiment, on the other hand, the advice is given by the human adviser instead of the computer and, as a result, accurate advice on the composition and the like can be provided.

The system configuration adopted in the fourth embodiment is similar to the system configuration of the third embodiment shown in FIG. 32.

The advice service achieved in the fourth embodiment is now briefly explained. First, a user requesting advice (hereafter referred to as an advice client) issues a request for advice to the server-side computer 2 by using the user-side personal computer 1. Upon receiving the advice request, the server-side computer 2 notifies a specific adviser via electronic mail that an advice request has been received. The adviser having received the notice performs an advising operation on the adviser-side personal computer 4 and transmits the advising results to the server-side computer 2. Upon receiving the advising results, the server-side computer 2 notifies the advice client via electronic mail that the advising results are now available. The advice client having received the notice views the advising results by using the user-side personal computer 1.

Now, the advice service offered in the fourth embodiment is explained in more specific terms.

The advice client wishing to use the advice service uploads the image data and the various types of information to the server-side computer 2. Since the image data and the various types of information are uploaded by the advice client in the fourth embodiment in a manner similar to that explained in reference to the first embodiment, the uploading method is not explained.

Figure 38:
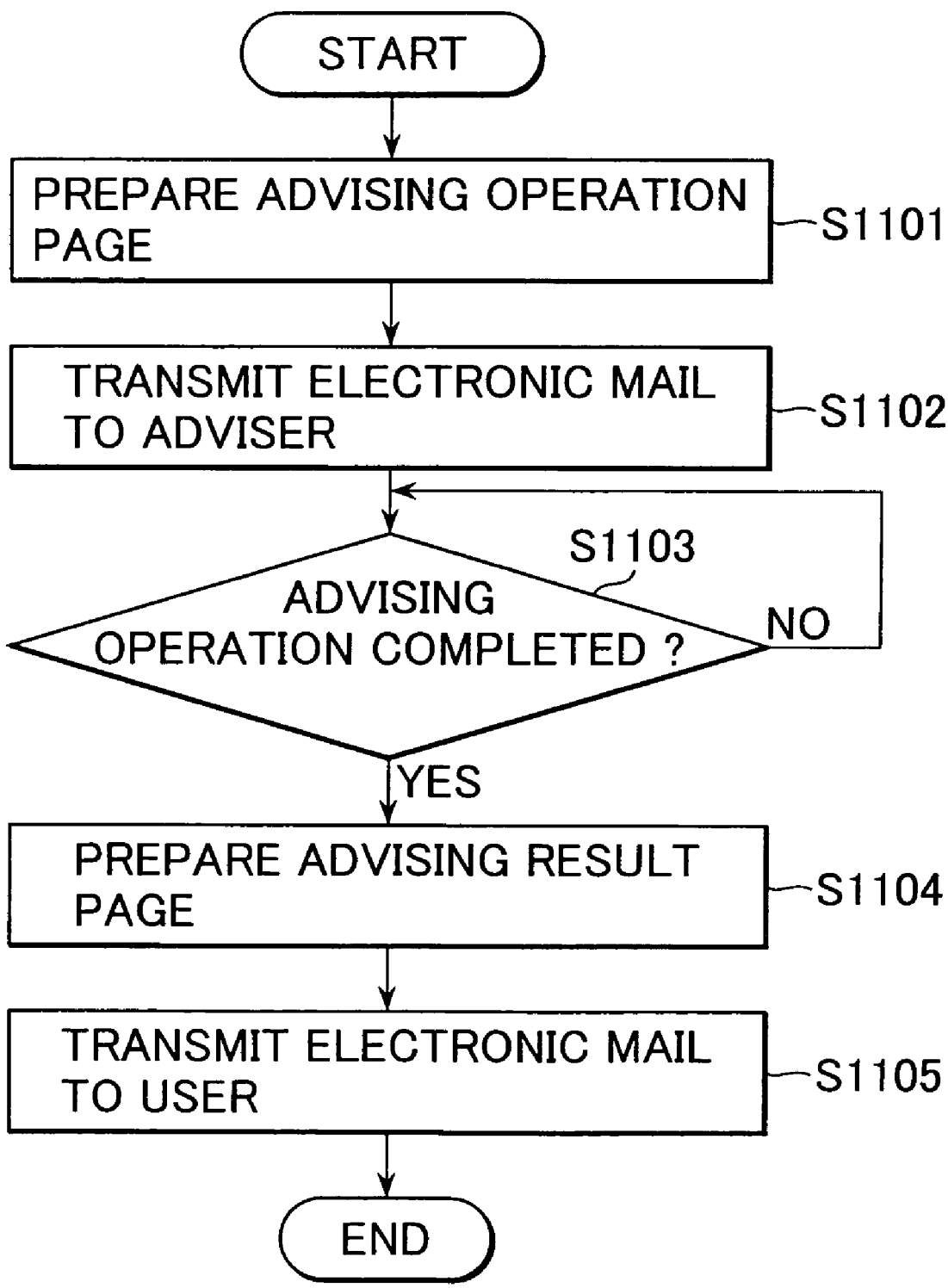
FIG. 38 presents a flowchart of the control executed to provide the advice service in the forth embodiment.

FIG. 38 presents a flowchart of the control executed during the advice service operation in the fourth embodiment. The control in the processing flow presented in FIG. 38, which is executed by the server-side computer 2, starts as the advice client uploads the image data and the various types of information.

Figure 39:
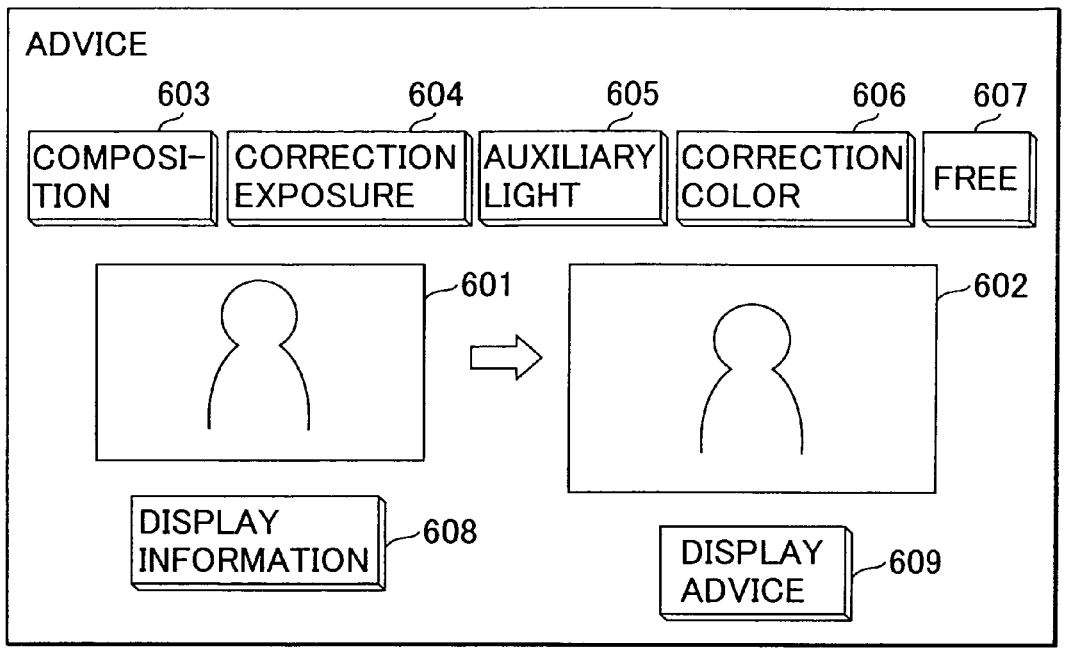
FIG. 39 presents an example of a page that may be brought up to enable an adviser to perform the advising operation.

In step S1101, a page that will enable a third party adviser to execute an advising operation is prepared. An example of a page that may be prepared in this step is shown in FIG. 39. The page shown in FIG. 39 is to be explained in detail later. In step S1102, an electronic mail message indicating that an advice request has been received is transmitted to the adviser. The electronic mail should include the address at which the page shown in FIG. 39 can be viewed.

Figure 47:
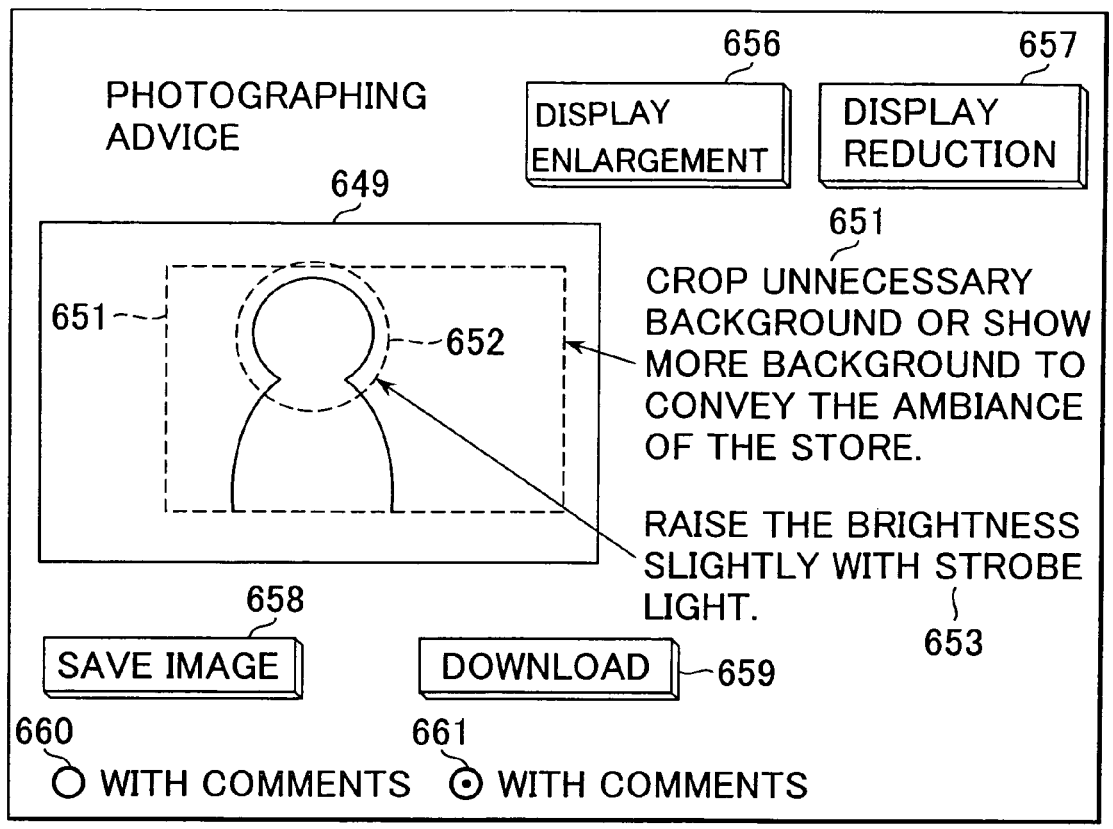
FIG. 47 presents an example of a page that may be brought up to allow the advice service client to view the advising results.

In step S1103, a detection is executed to determine whether or not the advising operation has been completed. The advising operation is judged to have been completed if the advising results have been received from the adviser. The operation proceeds to step S1104 if the advising operation has been completed, whereas the detection is continuously executed to monitor for the completion of the advising operation if the advising operation has not been completed. In step S1104, a page that is to be viewed by the advice client is prepared based upon the advice provided by the adviser. FIG. 47 presents an example of the advice page. The page shown in FIG. 47 is to be explained in further detail later.

In the following step S1105, an electronic mail indicating that the advising operation has been completed is transmitted to the advice client. The electronic mail should include an address at which the client can view the page carrying the advising results.

Next, the operation performed by the adviser to prepare the advice is explained in specific terms.

The adviser prepares the advice in the pages to which the display jumps as the various buttons in the page prepared in step S1101 as shown in FIG. 39 are clicked.

FIG. 39 presents an example of a page that enables the adviser to perform the advising operation. The page in FIG. 39 includes an image area 601, an image area 602, a "composition" button 603, a "correct exposure" button 604, an "auxiliary light" button 605, a "correct color" button 606, a "free" button 607, a "display information" button 608 and an "display advice" button 609. The image selected by the advice client as the advice object is displayed in the image area 601. An image reflecting the results of the advising operation performed by the adviser is displayed in the image area 602. The various buttons in the page are explained below.

Figure 40:
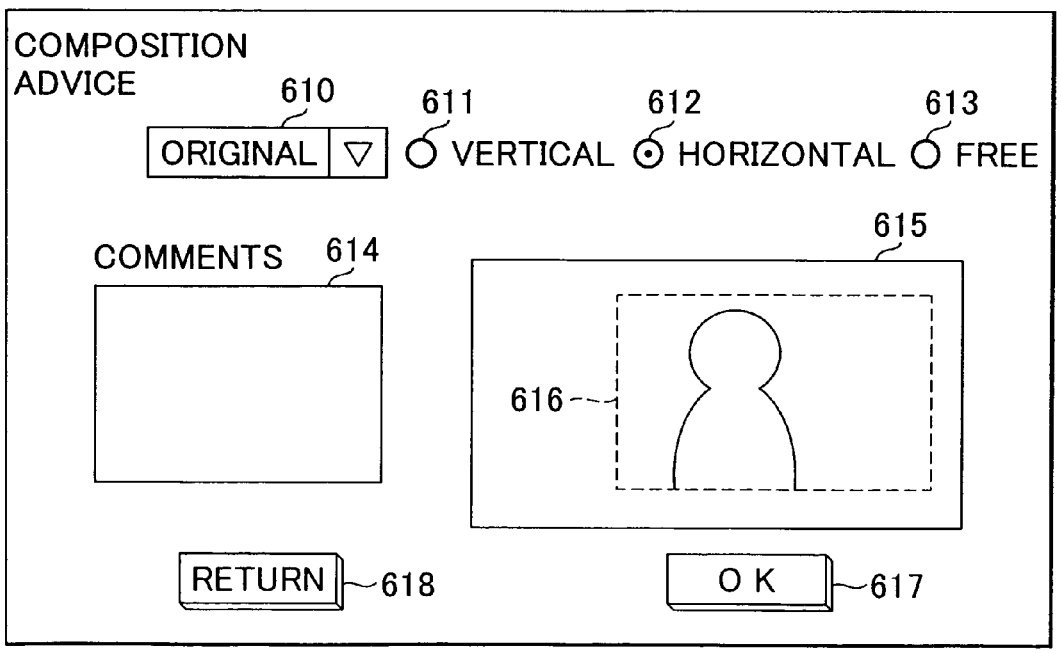
FIG. 40 presents an example of a page that maybe brought up to enable the adviser to execute an advising operation with regard to the composition.

The "composition" button 603 in the page shown in FIG. 39 is clicked by the adviser wishing to advise on the composition. As the "composition" button 603 is clicked, the displayed jumps to the page shown in FIG. 40 in which the adviser can advise on the composition. FIG. 40 presents an example of a page that enables the adviser to perform an advising operation with regard to the composition.

The operation performed to advice on the composition is explained in reference to FIG. 40. The image with regard to which the advice is offered is displayed in an image area 615 in the page shown in FIG. 40. The adviser specifies a rectangular range 616 through a click-and-drag operation of the mouse or the like within the image displayed in the image area 615 so as to achieve an optimal composition.

A "vertical" radio button 611 or a "horizontal" radio button 612 is operated to select ether a vertically elongated rectangular range 616 or a horizontally elongated rectangular range 616 for the composition. In a pulldown menu 610 located to the left of the "vertical" radio button 611, an aspect ratio can be selected for the rectangular range 616 from a plurality of aspect ratios that can be selected for the composition. The aspect ratios from which the selection can be made in the pulldown menu 610 include "original", "3:4" "5:8" and the like. "original" is selected as the default setting and the aspect ratio of the original image data undergoing the advising operation is selected at this setting.

The adviser selects ether the "vertical" radio button 611 or the "horizontal" radio button 612 to change the size of the rectangular range 616 while maintaining the aspect ratio selected in the pull down menu 610 by clicking and dragging an end of the rectangular range 616.

A "free" radio button 613 is clicked to set a composition range at a free aspect ratio within the image displayed in the image area 615. Advisory comments on the composition are entered in a comments field 614. As the adviser completes the operation and clicks an "OK" button 617 in this page, the display shifts to the page shown in FIG. 39 to display an image reflecting the advising operation having been performed in this page. If, on the other hand, the adviser clicks a "return" button 618, the display shifts to the page shown in FIG. 39 which does not reflect the results of the advising operation having been performed in the page.

The "correct exposure" button 604 in the page shown in FIG. 39 is clicked by the adviser wishing to advise on the exposure correction. As the "correct exposure" button 604 is clicked, the display jumps to the page shown in FIG. 41 in which the adviser can advise on the exposure correction.

Figure 41:
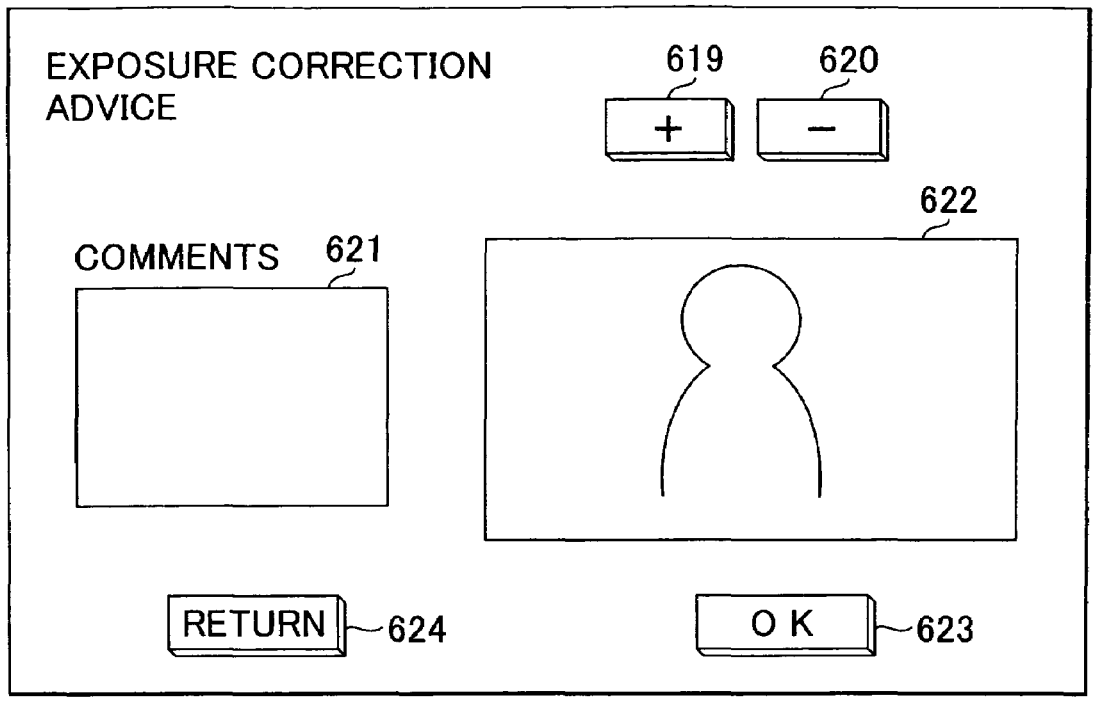
FIG. 41 presents an example of a page that maybe brought up to enable the adviser to execute an advising operation with regard to the exposure correction.

FIG. 41 presents an example of a page that enables the adviser to perform an advising operation with regard to the exposure correction. The operation performed to advice on the exposure correction is explained in reference to FIG. 41.

The image with regard to which the advice is offered is displayed in an image area 622 in the page shown in FIG. 41. A "+" button 619 and a "−" button 620 are buttons operated to adjust the brightness of the image displayed in the image area 622. When the "+" button 619 is clicked, the brightness level of the image displayed in the image area 622 increases. When the "−" button 620 is clicked, the image displayed in the image area 622 is darkened.

Advisory comments on the exposure correction can be entered in a comments field 621. As the adviser completes the operation and clicks an "OK" button 623 in this page, the display shifts to the page shown in FIG. 39 to display an image reflecting the advising operation having been performed in this page. If, on the other hand, the adviser clicks a "return" button 624, the display shifts to the page shown in FIG. 39 which does not reflect the results of the advising operation having been performed in the page.

The "auxiliary light" button 605 in the page shown in FIG. 39 is clicked by the adviser wishing to advise on the use of auxiliary light. As the "auxiliary light" button 605 is clicked, the display jumps to the page shown in FIG. 42 in which the adviser can advise on the use of auxiliary light.

Figure 42:
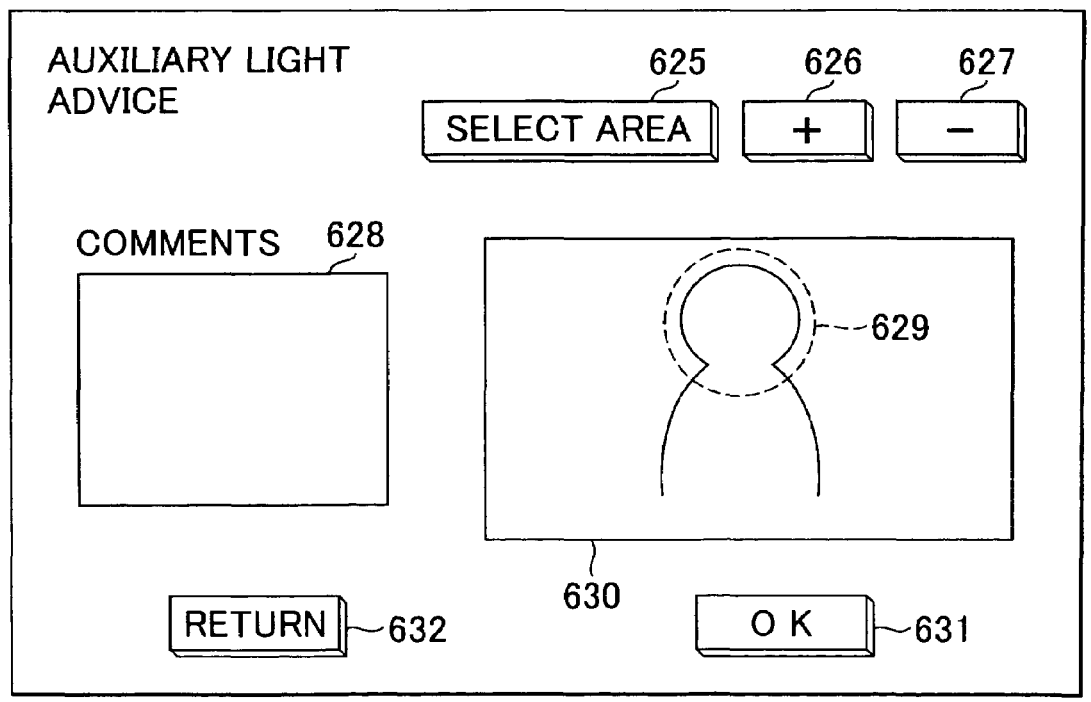
FIG. 42 presents an example of a page that may be brought up to enable the adviser to execute an advising operation with regard to auxiliary light.

FIG. 42 presents an example of a page that enables the adviser to perform an advising operation with regard to the use of auxiliary light. The image with regard to which the advice is offered is displayed in an image area 630 in the page shown in FIG. 42. A "select area" button 625 is clicked to select a range to be illuminated with auxiliary light. After the "select area" button 625 is clicked, the range to be illuminated with the auxiliary light within the image area 630 can be selected as a selected area 629. If a "+" button 626 is clicked, image processing for increasing the brightness level inside the selected area 629 is executed, whereas if a "−" button 627 is clicked, image processing for lowering the brightness level inside the selected area 629 is executed.

Advisory comments on auxiliary light can be entered in a comments field 628. As the adviser completes the operation and clicks an "OK" button 631 in this page, the display shifts to the page shown in FIG. 39 to display an image reflecting the advising operation having been performed in the page. If, on the other hand, the adviser clicks a "return" button 632, the display shifts to the page shown in FIG. 39 which does not reflect the results of the advising operation having been performed in the page.

The "correct color" button 606 in the page shown in FIG. 39 is clicked by the adviser wishing to advise on the color correction. As the "correct color" button 606 is clicked, the display jumps to the page shown in FIG. 43 in which the adviser can advise on the color correction.

Figure 43:
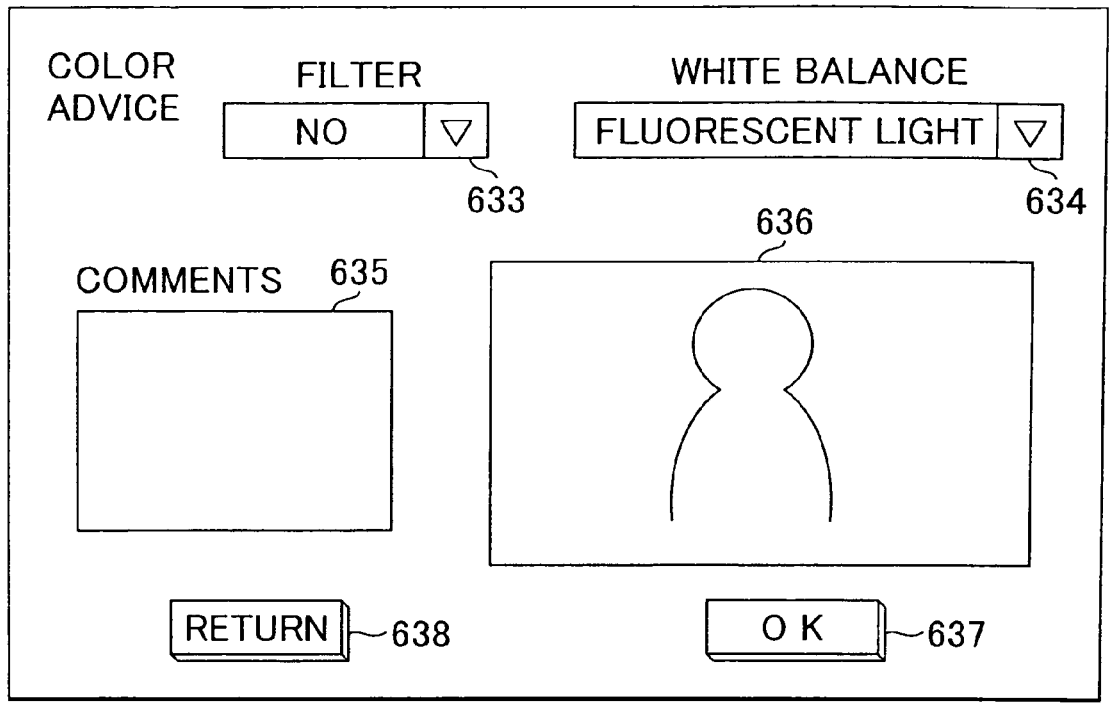
FIG. 43 presents an example of a page that may be brought up to enable the adviser to execute an advising operation with regard to the color correction.

FIG. 43 presents an example of a page that enables the adviser to perform an advising operation with regard to the color correction. The image with regard to which the advice is offered is displayed in an image area 636 in the page shown in FIG. 43. A pull down menu 633 is used to select the name of the optical filter that should be mounted at the photographic lens of the camera. As the filter name is selected by clicking the right hand side of the pull down menu 633, the effect of mounting the selected filter at the camera on the image displayed in the image area 636 is achieved through image processing.

A pull down menu 634 is used to make a selection from sunlight, fluorescent light, incandescent light and the like that constitute white balance adjustment settings which can be selected in the camera. As a white balance setting is selected by clicking the right hand side of the pull down menu 634, the effect of the selected white balance setting on the image displayed in the image area 636 is achieved through image processing.

Advisory comments on the filtering or white balance can be entered in a comments field 635. As the adviser completes the operation and clicks an "OK" button 637 in this page, the display shifts to the page shown in FIG. 39 to display an image reflecting the advising operation having been performed in the page. If, on the other hand, the adviser clicks a "return" button 638, the display shifts to the page shown in FIG. 39 which does not reflect the results of the advising operation having been performed in the page.

The "free" button 607 in FIG. 39 is clicked by the adviser wishing to provide free-form advice. As the adviser clicks the "free" button 607, the display jumps to the page shown in FIG. 44 which allows the adviser to give free-form advice on various points.

Figure 44:
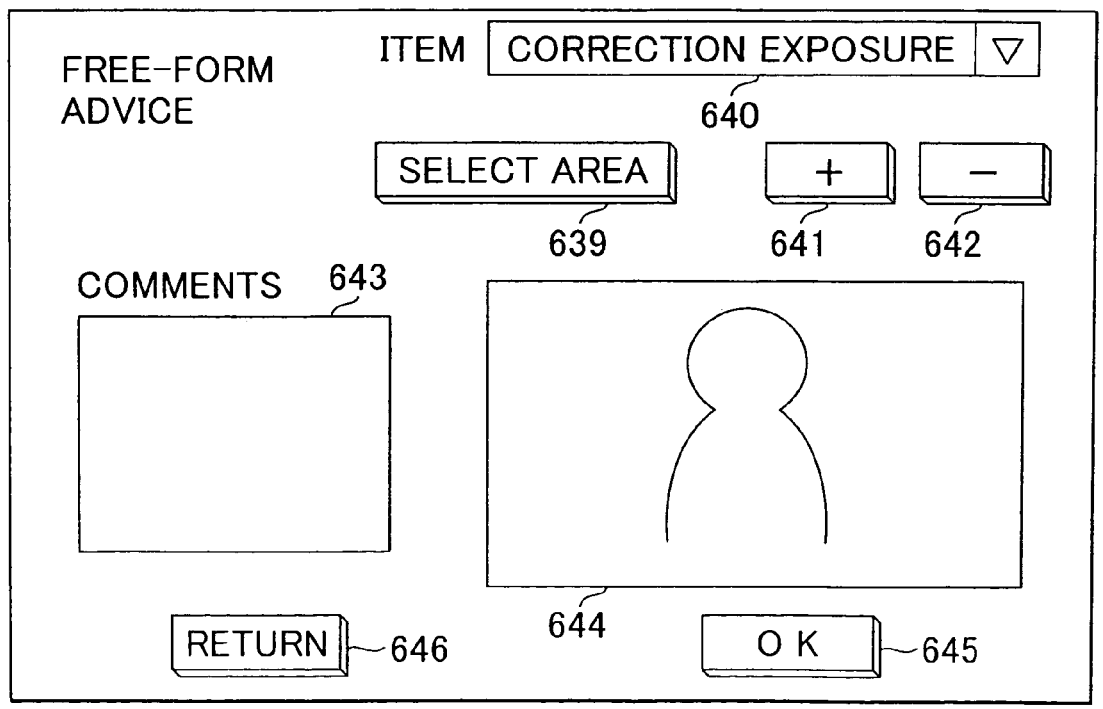
FIG. 44 presents an example of a page that maybe brought up to enable the adviser to execute an advising operation to provide the user with general advice.

FIG. 44 presents an example of a page that enables the adviser to perform various types of free-form advising operations. In the page shown in FIG. 44, the adviser can perform various types of advising operations by using a pull down menu 640, a "+" button 641 and a "−" button 642. The pull down menu 640 is used to select an item which the adviser wishes to advise on and includes items such as "color balance red", "color balance blue" and the like in addition to the advising items such as the exposure correction and the auxiliary light explained earlier.

The page shown in FIG. 44 allows the adviser to prepare more detailed advice. A "select area" button 639 has a function equivalent to that of the "select area" button 625 in FIG. 42. Advisory comments with regard to the overall advice can be entered in a comments field 643. As the adviser completes the operation and clicks an "OK" button 645 in this page, the display shifts to the page shown in FIG. 39 to display an image reflecting the advising operation having been performed in this page. If, on the other hand, the adviser clicks a "return" button 646, the display shifts to the page shown in FIG. 39 which does not reflect the results of the advising operation having been performed in the page.

The "display information" button 608 in FIG. 39 is clicked by the adviser wishing to view the information related to the uploaded image data and the user information. The adviser having clicked the "display information" button 608 receives the page shown in FIG. 45.

Figure 45:
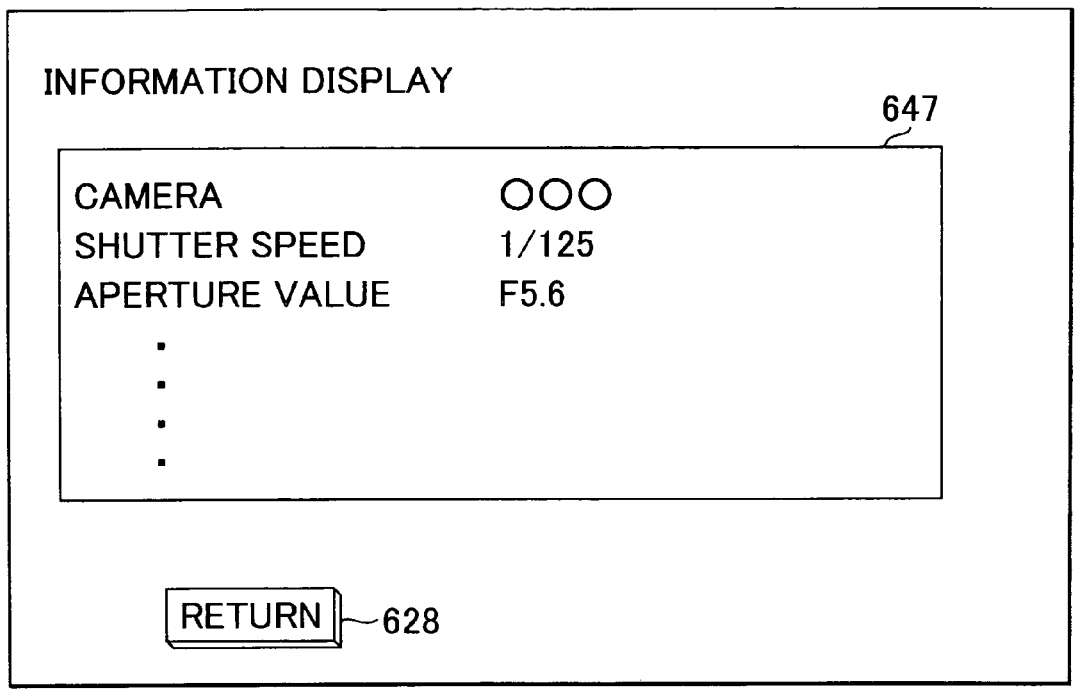
FIG. 45 presents an example of a page that may be brought up to enable a confirmation of various types of information including information related to the uploaded it image data and user information.

FIG. 45 presents an example of a page that allows the adviser to check the various types of information including the information related to the uploaded image data and the user information. The adviser see the various types of information displayed in an information display area 647 in this page to be enabled to provide more accurate advice based upon the photographing data, the type of camera used for the photographing operation, the user's accessories and the like. The adviser can return to the page shown in FIG. 39 by clicking a "return" button 648.

The "display advice" button 609 in FIG. 39 is clicked by the adviser wishing to check the results of the advising operation. Upon clicking the "display advice" button 609, the adviser receives the page shown in FIG. 46.

Figure 46:
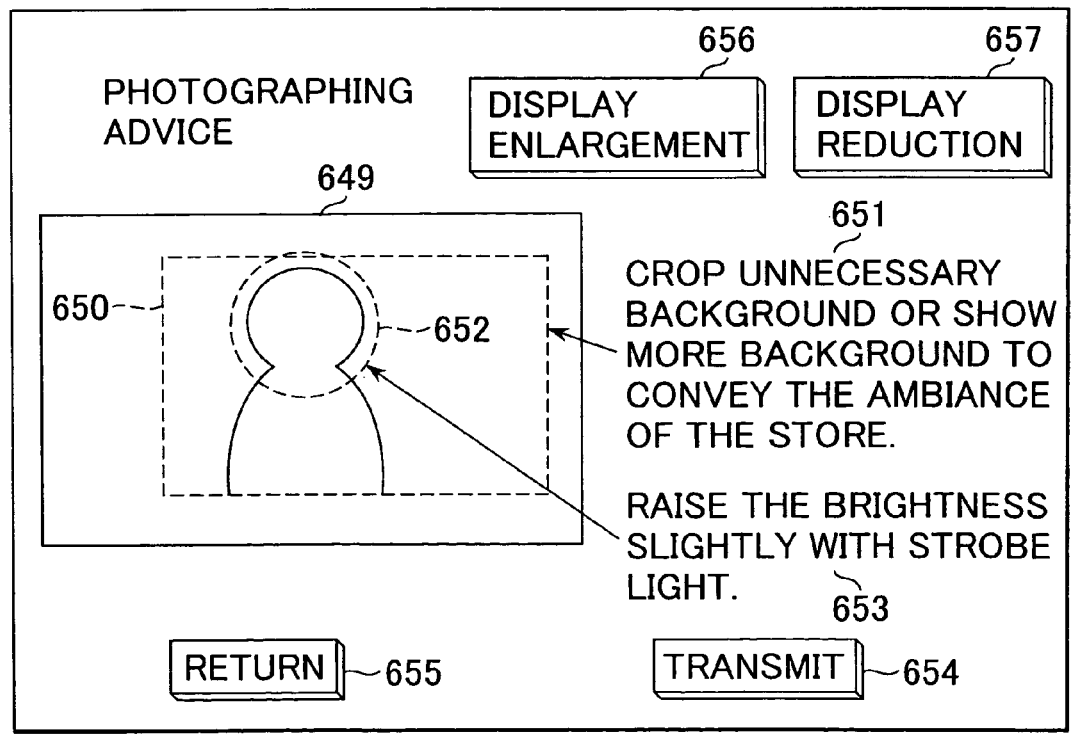
FIG. 46 presents an example of a page that may be brought up to enable the adviser to perform a final check on the advising results.

FIG. 46 presents an example of a page which allows the adviser to perform a final check on the advising results. The page shown in FIG. 46, representing an example of a page showing the advising results, is substantially identical to the page viewed by the advice client. Lines 650 and 652 in the page shown in FIG. 46 indicate the specific positions in the image to which the advice relates and ensure that the client understands the advice easily. Comments entered by the adviser are carried in comments fields 651 and 653.

In the page in the example presented in FIG. 46, the line 650 indicates a desired composition area specified by the adviser. The line 652 indicates an area specified by the adviser to be illuminated with auxiliary light. In addition, in the page shown in FIG. 46, comments entered by the adviser on the composition are displayed in the comments field 651 in relation to the line 650 indicating the optimal composition area. Comments entered by the adviser on the auxiliary light are displayed in the comments field 653 in relation to the line 652. The server-side computer 2 automatically lays out the comments by the adviser, the corresponding lines and the like so as to facilitate intuitive understanding of the advice.

A "display enlargement" button 656 is clicked to enlarge the image displayed in an image area 649. In addition, a "display reduction" button 657 is clicked to reduce the image displayed in the image area 649.

After confirming the advising results in the page shown in FIG. 46, the adviser clicks a "send" button 654 to upload the advice information to the server-side computer 2. The adviser can also return to the page shown in FIG. 39 by clicking a "return" button 655 to continue with the advising operation.

A page that may be prepared for advice client viewing is shown in FIG. 47. FIG. 47 presents an example of a page that allows the advice client to view the advising results. As shown in FIG. 47, this viewing page includes a "download" button 659 and a "save image" button 658 in place of the "send" button 654 and the "return" button 655 in the page shown in FIG. 46.

The "download" button 659 is clicked to download the image data having undergone the image processing during the advising operation performed by the adviser into the user-side personal computer 1. The "save image" button 658 is clicked to save the image data having undergone the image processing during the advising operation performed by the adviser into an area allocated for the users at the server-side computer 2.

Radio buttons 660 and 661 are provided respectively in the vicinity of the "save image" button 658 and the "download" button 659. The radio buttons 660 and 661 are operated to select whether or not the advice information overlaid on the image data is to be saved or downloaded together with the image data. If the advice client clicks the "download" button 659 after checking the radio button 660, only the image data having been optimized by the adviser are downloaded. If, on the other hand, the advice client clicks the "download" button 659 after checking the radio button 661, data that will allow the advice information super imposed on the image data to be displayed are downloaded.

As described above, since the line indicating the optimal composition area, the detailed advice on how a specific portion of the image should be changed and the like are overlaid in the display, the advice client is able to understand the advice more accurately than simple text advice. In addition, since such an advice page is laid out automatically, the onus on the adviser is minimized.

Furthermore, the advice client is promptly notified that the advice is ready via electronic mail or the like.

Fifth Embodiment

In the fifth embodiment, the advice client uses the advice service through direct communication by using a digital camera having a communication function instead of a personal computer installed at the client's home or the like.

The digital camera that can be used in this embodiment may be equipped with an internal communication function or it may be a digital camera connected to a communication terminal (portable telephone) or the like.

Figure 48:
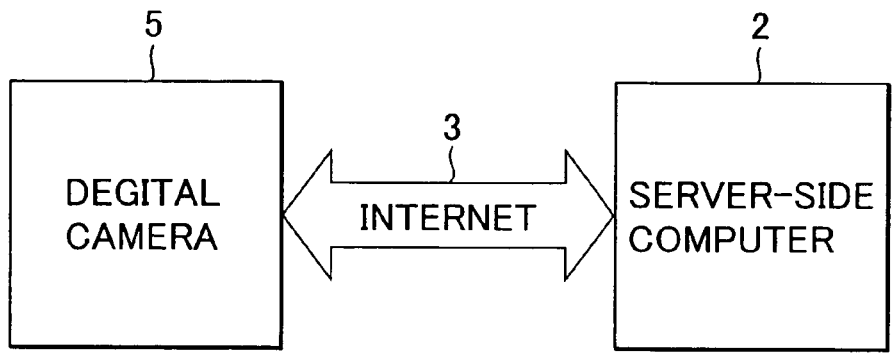
FIG. 48 illustrates the system configuration adopted in the fifth embodiment of the present invention.

FIG. 48 illustrates the system configuration adopted in the fifth embodiment of the present invention.

As shown in FIG. 48, the system comprises a digital camera 5, a server-side computer 2 and the Internet 3 connecting the digital camera 5 and the server-side computer 2 so as to enable communication between them.

In the advice service provided in the first through fourth embodiments, the advice client receives advice by uploading image data photographed on a digital camera or the like to the server-side computer 2 by using a terminal such as a personal computer. However, if, for instance, the client receives advice on the correct photographing method with regard to image data photographed on a trip, he may not have another opportunity to take pictures at the same location. In addition, even if he has a chance to take pictures at the same location, he may not be able to obtain an optimal image by performing a photographing operation with the advised photographing method depending upon the season, the time of day and the weather, which may be different from the previous occasion.

In the advice services in the fifth embodiment, communication between the digital camera 5 and the server-side computer 2 is controlled to allow the client to obtain real time advice while taking pictures with the digital camera 5.

The advice service provided in the fifth embodiment is briefly explained below.

First, a user wishing to receive advice sets the digital camera 5 in an advice mode and performs a preliminary photographing operation prior to a main photographing operation. The digital camera automatically transfers the image data obtained through the preliminary photographing operation to the server-side computer 2. The server-side computer 2 executes advising control based upon the image data and various types of information. The digital camera 5 then receives the advising results from the server-side computer 2 and adjusts the camera settings in conformance to the advising results. The user then performs the main photographing operation at the camera settings reflecting the advising results to obtain optimal image data.

The client may instead receive advice based upon image data resulting from a previous photographing operation and the various types of information without performing a preliminary photographing operation prior to the main photographing operation. In such a case, the image data having been obtained through the immediately preceding photographing operation are selected as the default image data. The image data used for these purposes are not limited to those saved in the internal memory in the camera or in a memory inserted at the camera. For instance, if a system configuration that allows photographed image data to be transferred to another location to be saved, an image at the transfer location can be selected.

Figure 49:
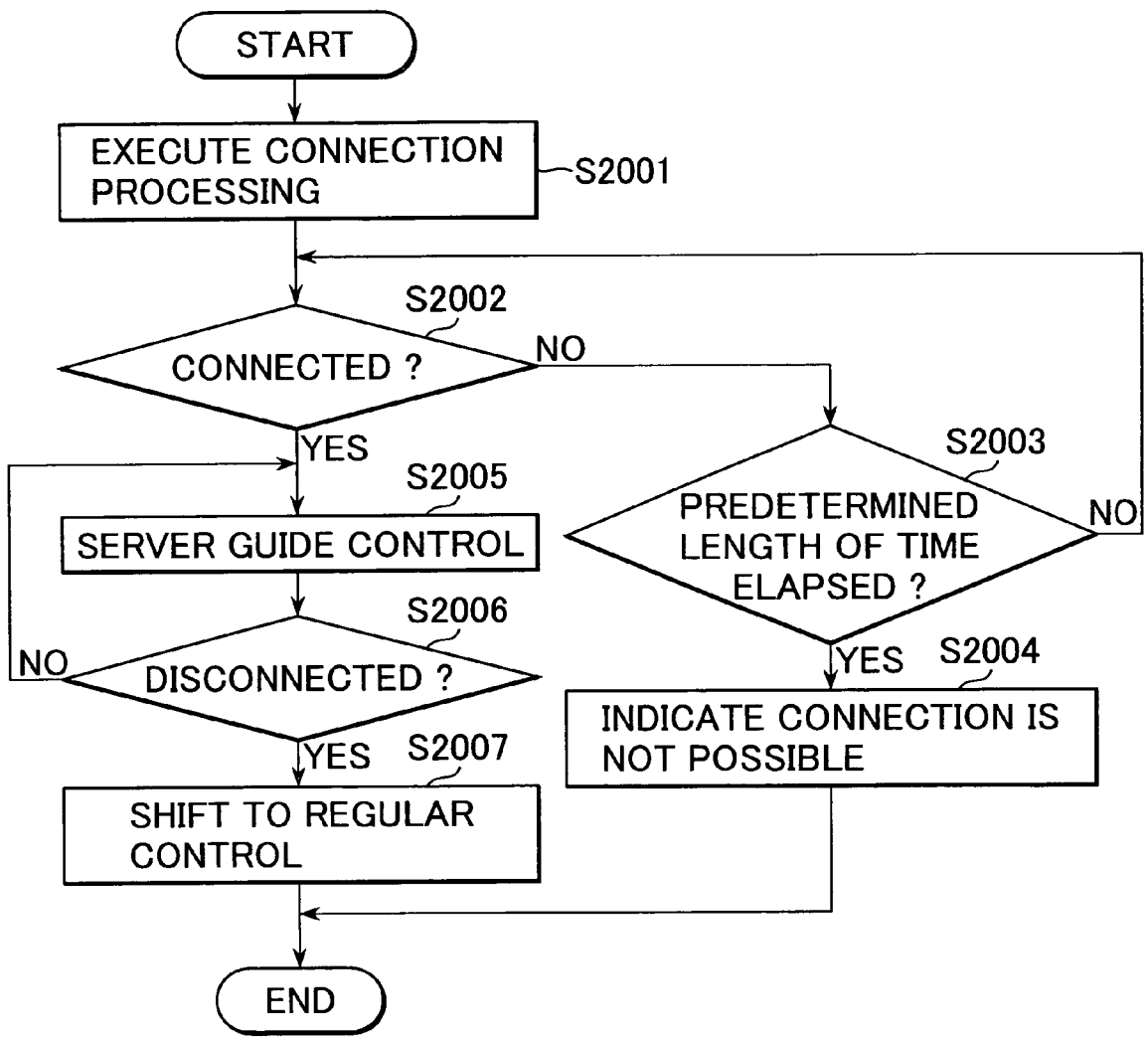
FIG. 49 presents a flowchart of the control executed in the digital camera 5.
Figure 50:
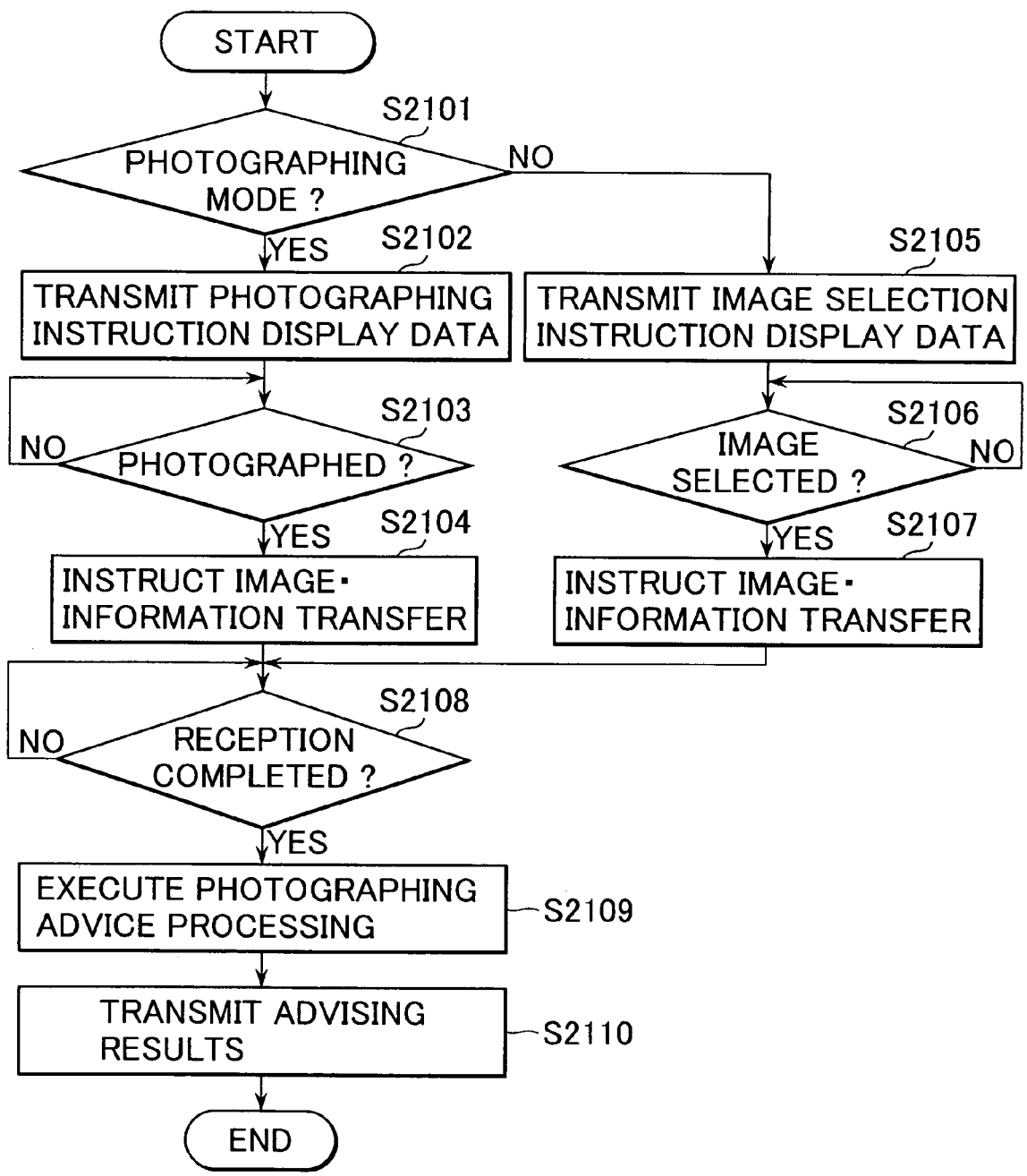
FIG. 50 presents a flowchart of the control executed in the server-side computer 2.

The following is an explanation of the control executed by the digital camera 5 and the server-side computer 2, given in reference to the flowcharts presented in FIGS. 49 and 50.

FIG. 49 presents a flowchart of the control executed in the digital camera 5. The flow of this control starts in response to an operation of an advice button (not shown) provided at the digital camera 5.

In step S2001, the digital camera 5 attempts to connect with the server-side computer 2. In step S2002, a detection is executed to determine whether or not a connection with the server-side computer 2 has been achieved. The operation proceeds to step S2005 if a connection has been achieved, whereas the operation proceeds to step S2003 if no connection has been achieved. In step S2003, a detection is executed to determine whether or not a predetermined length of time has elapsed since the start of the connection processing. The operation proceeds to step S2004 if a predetermined length of time has elapsed, whereas the operation returns to step S2002 if the predetermined length of time has not elapsed.

In step S2004, to which the operation proceeds after failing to connect with the server-side computer 2, a message indicating that a connection with the server-side computer 2 cannot be achieved is displayed at the camera monitor. In step S2005, to which the operation proceeds after successfully connecting with the server-side computer 2, control based upon signals transmitted from the server-side computer 2 is enabled. The control implemented under the guidance of the server-side computer 2 in the step is to be described in detail later in reference to FIG. 50.

In step S2006, a detection is executed to determine whether or not the connection with the server-side computer 2 has been cut off upon completing the reception of the advising results. Upon receiving the advising results, the digital camera 5 automatically cuts off the connection with the server-side computer 2. If the connection with the server-side computer 2 has been cut off, the operation proceeds to step S2007 to implement the advising control. The advising control executed in step S2007 is to be described in detail later in reference to FIG. 53. If the connection with the server-side computer 2 is still sustained, the control is continuously executed under the guidance of the server-side computer 2 in step S2005.

FIG. 50 presents a flowchart of the control executed in the server-side computer 2. The flow of this control starts as the digital camera 5 becomes connected with the server-side computer 2.

In step S2101, a detection is executed to determine whether or not the camera with which the connection has been achieved is set in a photographing mode. The operation proceeds to step S2102 if the camera is set in the photographing mode, whereas the operation proceeds to step S2105 if the camera is not set in the photographing mode. If the camera is set in the photographing mode, it is judged that the client wishes to receive photographing advice on a subject image to be photographed with the camera. If the camera is not set in the photographing mode, it is judged that the client wishes to receive photographing advice on image data of an image having already been photographed.

Figure 51:
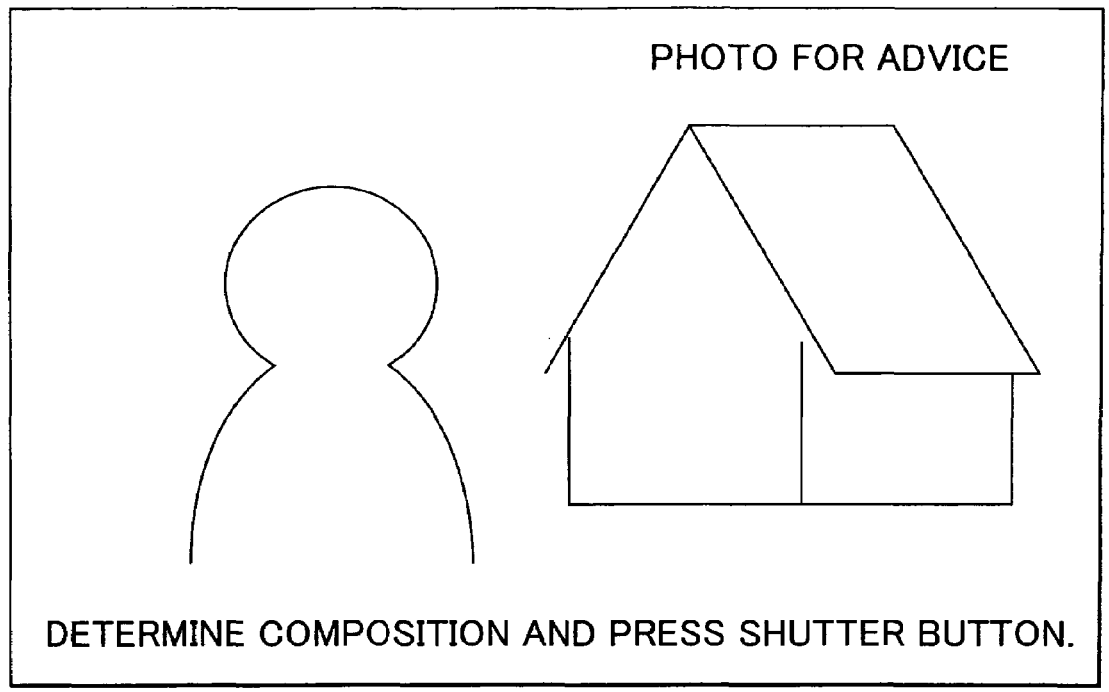
FIG. 51 presents an example of a display that may be brought up at the camera monitor.

In step S2102, data constituting a message "press the shutter button" are transmitted so that the message is superimposed on the viewfinder display of the camera monitor. FIG. 51 presents an example of a display that may be brought up at the camera monitor. The message "press the shutter button" is superimposed in addition to the superimposed note indicating that an advice is to be provided on the image to be photographed.

In step S2103, a detection is executed to determine whether or not the shutter button has been operated and the photographing operation has been executed. The operation proceeds to step S2104 if the photographing operation has been executed, whereas the processing in step S2103 is repeatedly executed if no photographing operation has been performed.

In step S2104, an instruction is issued to transfer the photographed image data and photographic setting data. Since the resolution and the size of the image data to be transferred only need to be set high enough to enable an image analysis to prepare advice, it is not necessary to transfer image data at the resolution and in the size selected in the camera or at the maximum resolution and the maximum size that can be set for the digital camera 5. For instance, the image data should be transferred at an intermediate resolution and in an intermediate size so as to reduce the length of time required for the transfer. The resolution and the size of the image data being transferred may be selected in conformance to the speed of the communication between the camera and the server-side computer 2, instead.

While the image data have been obtained through the photographing operation for advice, the image data are still saved into the camera internal memory. The resolution, the size and the like of the image data saved into the memory match the settings selected in the camera, since the image data having been photographed at this time may turn out to be the only image data of the particular photographic scene.

Figure 52:
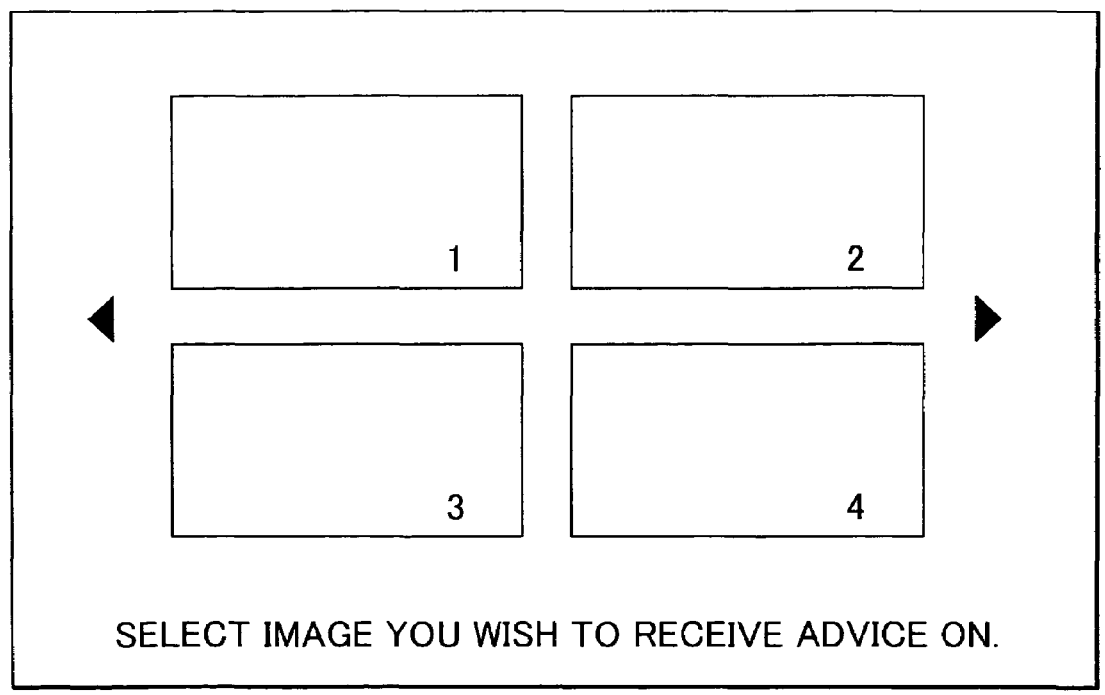
FIG. 52 presents an example of a display that may be brought up at the camera monitor to enable an image selection.

In step S2105, data are transmitted to the camera so as to display a message "select image" at the camera monitor. FIG. 52 presents an example of a display that may be brought up on the camera monitor to allow the client to select an image. As mentioned earlier, the image data from the immediately proceeding photographing operation are selected as the default setting. In step S2106, a detection is executed to determine whether or not specific image data have been selected. The operation proceeds to step S2107 if the image data selection has been executed, whereas the processing in step S2106 is repeatedly executed if no image data have been selected yet.

In step S2107, an instruction is issued to transfer the image data stored in the internal memory of the camera and the photographic setting information. In step S2108, a detection is executed to determine whether or not the data reception has been completed. The operation proceeds to step S2109 if the data reception has been completed, whereas the processing in step S2108 is repeatedly executed if the data reception has not been completed yet. In step S2109, photographing advice processing is executed. In step S2110, the results of the advice processing are transmitted.

It is to be noted that the text superimposed on the viewfinder display at the monitor of the digital camera 5 may be saved in the internal memory of the camera and an instruction may be issued to display the text data instead of downloading the text data from the server-side computer 2 each time.

Figure 53:
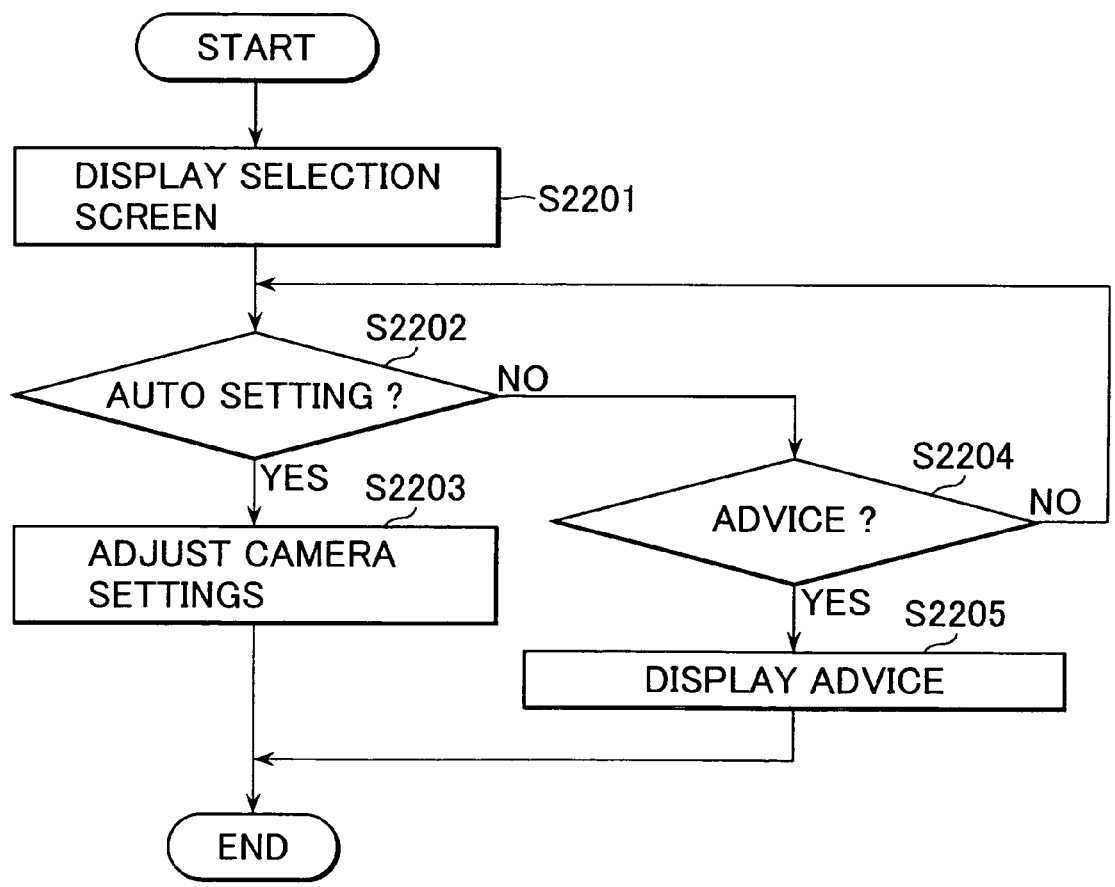
FIG. 53 presents a flowchart of the advising control.

Next, an explanation is given on how the digital camera 5 executes the advising control by using the advice results received from the server-side computer 2 in reference to FIG. 53. FIG. 53 presents a flowchart of the advising control.

Figure 54:
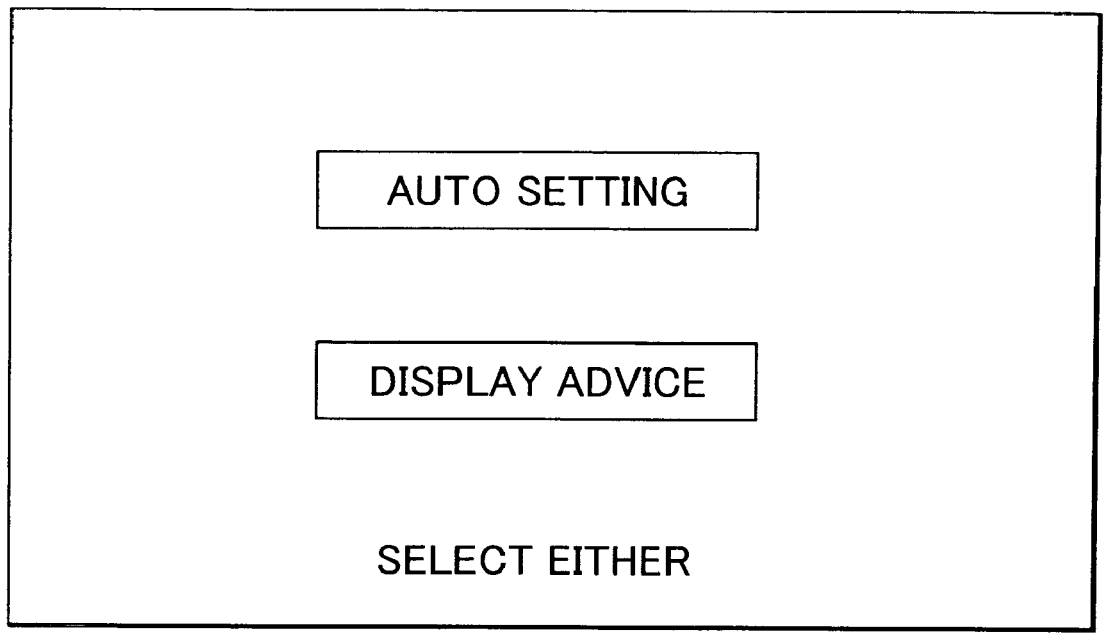
FIG. 54 presents an example of a selection menu screen that may be brought up at the camera monitor.

In step S2201, the selection menu screen shown in FIG. 54 is brought up on display at the camera monitor. FIG. 54 presents an example of a selection menu screen that may be brought up on display at the camera monitor. If "auto set" in FIG. 54 is selected, the camera settings at the digital camera 5 are automatically adjusted in conformance to the advising results. If "display advice" is selected, the method for setting the digital camera 5 in conformance to the advising results is displayed at the camera monitor. Accordingly, the user is able to start the next photographing operation instantly with the camera at the optimal settings by selecting "auto set", whereas the user can learn how to select the optimal settings by selecting "display advice"

Next, in step S2202, a detection is executed to determine whether or not "auto set" has been selected. The operation proceeds to step S2203 if "auto set" has been selected, whereas the operation proceeds to step S2204 if "auto set" has not been selected. In step S2203, the camera settings are automatically adjusted in conformance to the advising results received from the server-side computer 2. It is to be noted that if the camera is not capable of automatically adjusting the settings and therefore and the user needs to perform a manual setting operation, the proper setting procedure is displayed at the monitor.

In step S2204, a detection is executed to determine whether or not "display advice" has been selected. The operation proceeds to step S2205 if "display advice" has been selected, whereas the operation returns to step S2202 if "display advice" has not been selected. In step S2205, advice such as that shown in FIG. 55 is brought up on display at the camera monitor.

Figure 55:
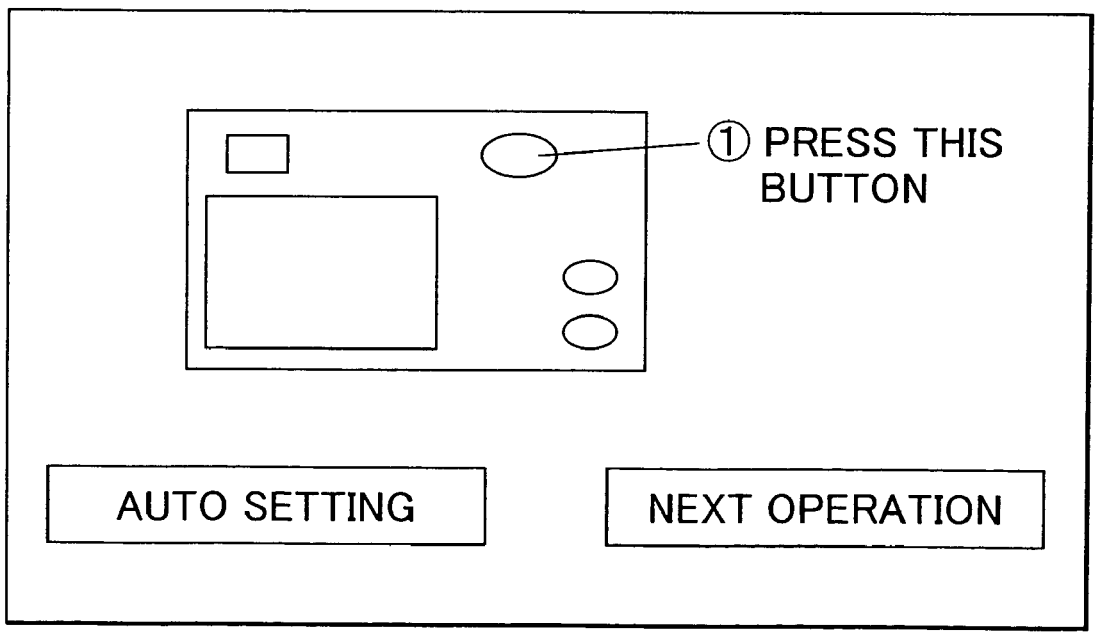
FIG. 55 presents an example of an advice screen that may be brought up at the camera monitor.

FIG. 55 presents an example of an advice screen that may be brought up on display at the camera monitor. In the advice display shown in FIG. 55, advice on a specific operation that needs to be performed on the digital camera 5 to select camera settings that will result in optimal image data is provided.

As described above, an advice service that is provided by the server-side computer 2 to the digital camera 5 is realized in the fifth embodiment.

It is to be noted that while an explanation is given above in reference to the fifth embodiment on an example in which only photographing advice is offered since the advice is received at the digital camera 5, image editing advice may also be offered. In addition, a failure diagnosis may be executed as in the first embodiment. In such a case, if a failure has occurred due to a software problem, the software inside the camera may be automatically replaced.

It is extremely effective to execute the photographing advice processing at the server-side computer 2 in order to reduce the processing load of the processing executed in the digital camera 5 as in the advice service achieved in the fifth embodiment. In addition, the server-side computer 2, which can be equipped with a large-capacity memory for storing user data, is capable of providing accurate advice.

Furthermore, while an explanation is given above in reference to the fifth embodiment on an example in which the advice service is provided by the server-side computer 2 to the digital camera 5 via the Internet 3, a photographing advice program may be stored in memory in the camera to provide the user with photographing advice prepared within the camera.

Sixth Embodiment

In the fifth embodiment, a preliminary photographing operation is executed prior to the main photographing operation and the client receives advice based upon the image data obtained through the preliminary photographing operation which are transmitted to the server-side computer 2 simply for purposes of enabling the advice service.

In the sixth embodiment, and advice service is provided as part of an image data storage service through which image data are transferred to the server-side computer 2 after finishing a photographing operation and the transferred image data are stored into the image data area 214 of the memory 201 in the server-side computer 2. This system makes it possible for the user to receive the advice service and the failure diagnosis service simply by performing a normal photographing operation and then uploading the image.

Figure 56:
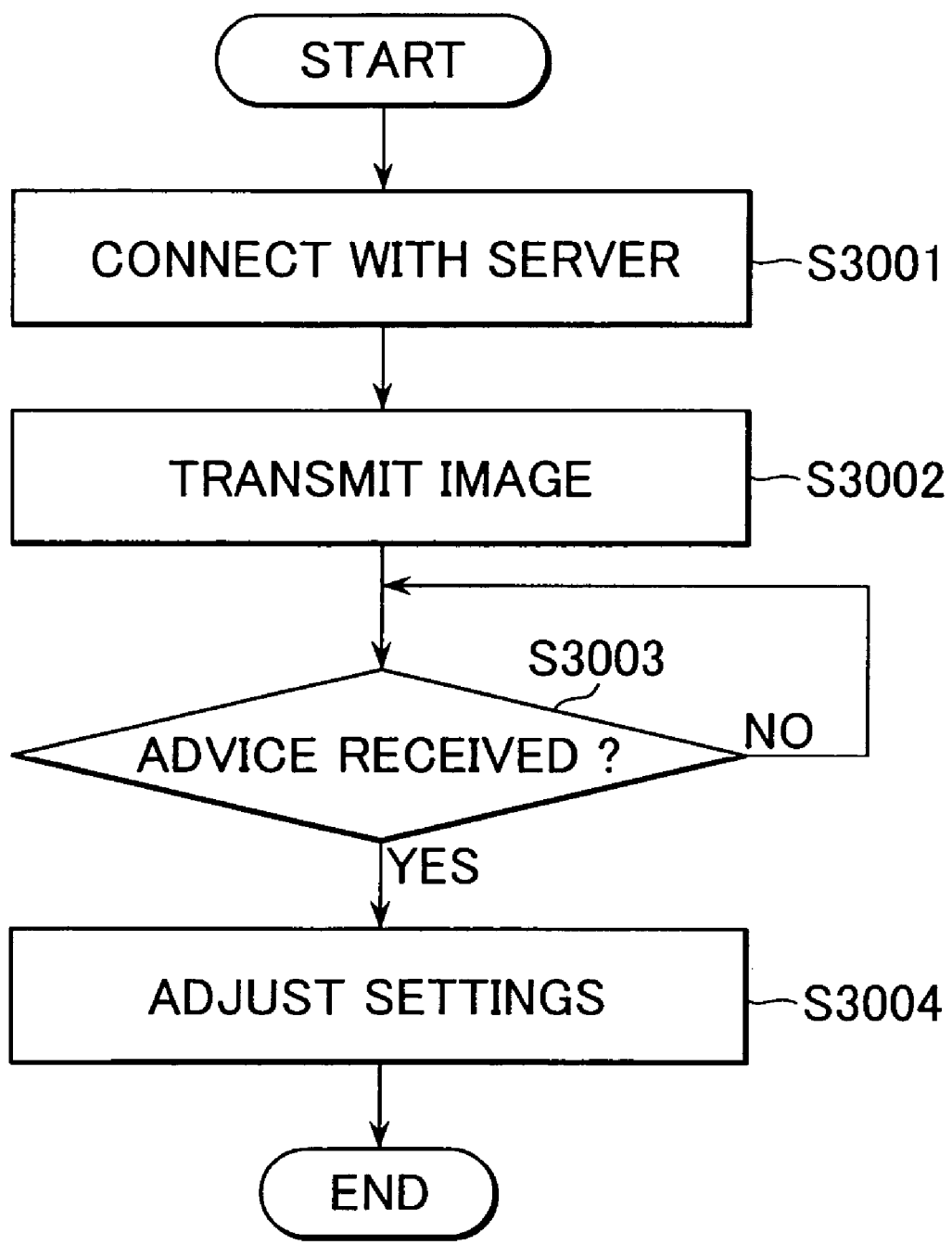
FIG. 56 presents a flowchart of the control executed in the digital camera 5.
Figure 57:
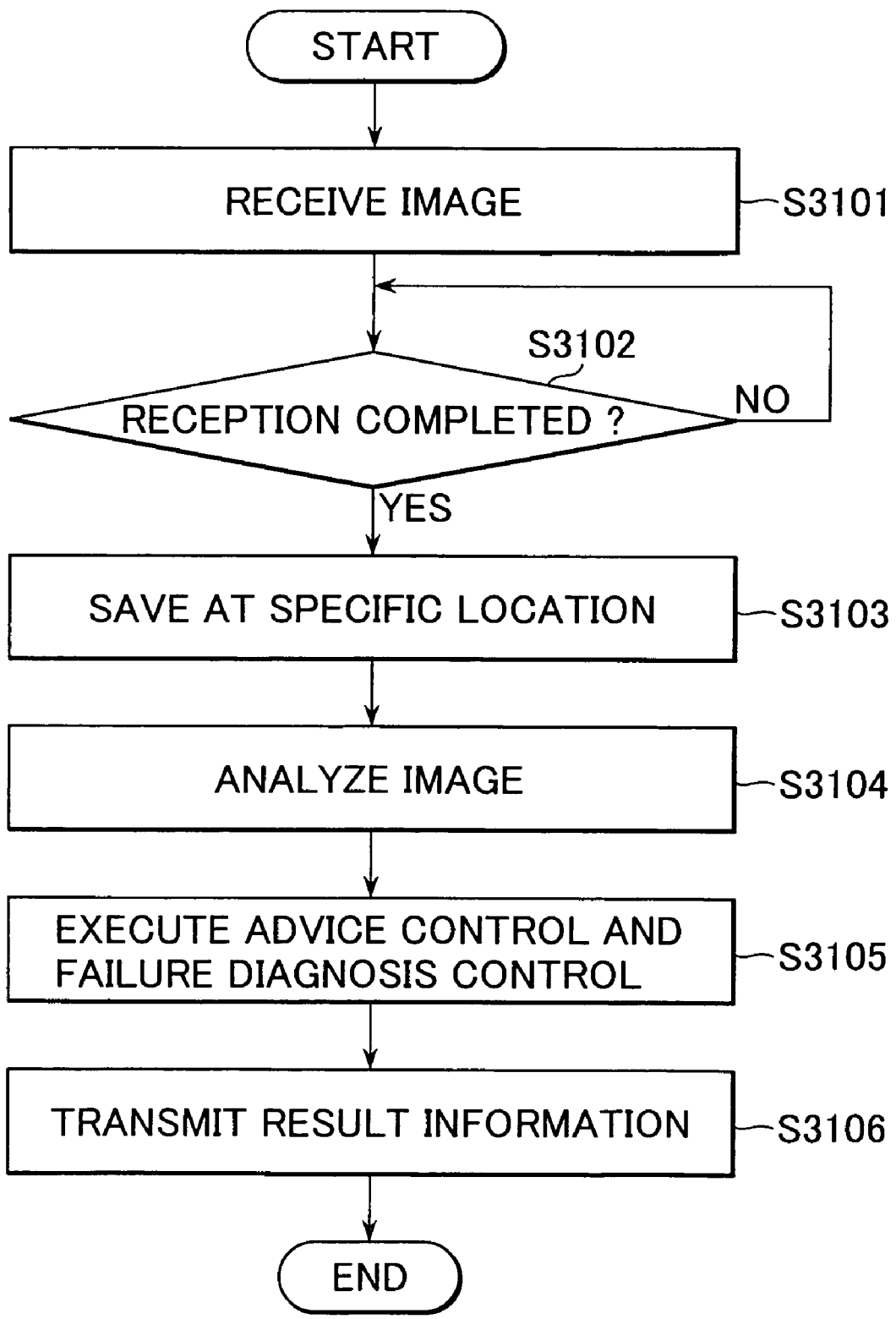
FIG. 57 presents a flowchart of the control executed in the server-side computer 2.

The control executed in the sixth embodiment is now explained in reference to the flowcharts presented in FIGS. 56 and 57. FIG. 56 presents a flowchart of the control executed in the digital camera 5. The flow of this control starts as a photographing operation is performed with the digital camera 5.

In step S3001, a connection with the server-side computer 2 is achieved. In step S3002, the image data resulting from the photographing operation are transmitted to the server-side computer 2. In step S3003, a detection is executed to determine whether or not data containing advice information or failure diagnosis information have been received. The operation proceeds to step S3004 if such data have been received, whereas the detection for the data reception is repeatedly executed if the data have not been received yet. In step S3004, the photographic settings in the digital camera 5 are automatically adjusted in conformance to the advice information having been received. If the failure diagnosis information has been received, a message indicating that a failure has occurred is displayed at the monitor. In addition, if the failure has occurred due to a software problem, the latest version of the software program is downloaded for an update.

FIG. 57 presents a flowchart of the control executed at the server-side computer 2. The flow of this control starts as the server-side computer 2 becomes connected with the digital camera 5 and the image data reception starts.

In step S3101, the image data are received from the digital camera 5. In step S3102, a detection is executed to determine whether or not the image data reception has been completed. The operation proceeds to step S3103 if the data reception has been completed, whereas the data reception is continuously executed in step S3101 if the reception has not been completed yet. Instep S3103, the image data are stored into the storage area allocated to the user having sent the image data in the image data area 214 at the memory 201. In step S3104, the received image data undergo an image analysis. Instep S3105, advising control and failure diagnosis control are executed. Since the image analysis, the advising control and the failure diagnosis control are executed in a manner identical to that with which they are executed in the first embodiment, they are not explained in detail here. In step S3106, the advice information or the failure diagnosis information is transmitted to the digital camera 5.

It is to be noted that while an explanation is given in reference to the sixth embodiment on an example in which the image data are transferred to the server-side computer 2 immediately after the photographing operation executed on the digital camera 5, the image data may be transferred with any arbitrary timing.

The advice service described above may be offered as part of image data storage service provided in a system in which photographed image data are transferred to the server-side computer 2 by using a personal computer as in the first embodiment instead of in a system in which image data are directly transferred to the server-side computer 2 from the digital camera 5.

While an explanation is given above on various embodiments of the present invention, this advice service may be offered as charged services by collecting advice fees from users. Since a system for collecting fees for charged advice service can be achieved by adopting the related art, an explanation of such a system is omitted.

What is claimed is:

1. A photographing advice system comprising:
   a receiving unit that receives image data of an image photographed by a user transmitted from a user terminal;
   an analyzing unit that executes an analysis of the image data received by the receiving unit;
   an advising unit that prepares advice on a photographing method based upon results of the analysis executed by the analyzing unit; and
   a providing unit that provides the advice prepared by the advising unit to the user terminal via a network, wherein:
   the analyzing unit executes an analysis of the image data to determine an optimal photographing method based upon an image processing which has been executed to optimize the image data.

2. A photographing advice system according to claim 1, wherein:
   the advising unit provides advice on a photographing method appropriate to a camera used by the user.

3. A photographing advice system according to claim 2, wherein:
   the advising unit prepares the advice by taking into consideration camera accessories owned by the user.

4. A photographing advice system according to claim 1, further comprising:
   an obtaining unit that obtains related information related to the image data, wherein:
   the advising unit prepares the advice based upon the results of the analysis executed by the analyzing unit and the related information.

5. A photographing advice system according to claim 1, wherein:
the advising unit provides optimized image data.

6. A photographing advice system according to claim 1, wherein:
the advising unit prepares advisory comments explaining a photographing method.

7. A photographing advice system according to claim 6, wherein:
if the advisory comment prepared by the advising unit includes a predetermined term prepared in advance, an explanation of the term can be viewed through a single operation.

8. A photographing advice system comprising:
a receiving unit that receives image data of an image photographed by a user transmitted from a user terminal;
an analyzing unit that executes an analysis of the image data received by the receiving unit;
an advising unit that prepares advice on a photographing method based upon results of the analysis executed by the analyzing unit;
a providing unit that provides the advice prepared by the advising unit to the user terminal via a network;
an obtaining unit that obtains related information related to the image data, wherein:
the advising unit prepares the advice based upon the results of the analysis executed by the analyzing unit and the related information; and
the related information is photographing environment data attached to the image data.

9. A photographing advice system comprising:
a receiving unit that receives image data of an image photographed by a user transmitted from a user terminal;
an analyzing unit that executes an analysis of the image data received by the receiving unit;
an advising unit that prepares advice on a photographing method based upon results of the analysis executed by the analyzing unit;
a providing unit that provides the advice prepared by the advising unit to the user terminal via a network;
an obtaining unit that obtains related information related to the image data, wherein:
the advising unit prepares the advice based upon the results of the analysis executed by the analyzing unit and the related information; and
the related information is user information collected at the time of user registration.

10. A photographing advice system comprising:
a receiving unit that receives image data of an image photographed by a user transmitted from a user terminal;
an analyzing unit that executes an analysis of the image data received by the receiving unit;
an advising unit that prepares advice on a photographing method based upon results of the analysis executed by the analyzing unit;
a providing unit that provides the advice prepared by the advising unit to the user terminal via a network;
an obtaining unit that obtains related information related to the image data, wherein:
the advising unit prepares the advice based upon the results of the analysis executed by the analyzing unit and the related information; and
the related information is information collected from the user at the time of an advice service operation.

11. A photographing advice system comprising:
an analyzing unit that executes an analysis of image data of an image photographed by a user;
an advising unit that prepares advice on a photographing method based upon results of the analysis executed by the analyzing unit;
a providing unit that provides the advice prepared by the advising unit to the user; and
a server computer that receives image data transmitted from a user terminal operated by the user who transmits the image data of an image photographed by the user, wherein:
the advising unit and the providing unit are located at the server computer;
the analyzing unit executes an analysis to determine an optimal photographing method based upon image processing which has been executed on the image data to optimize the image data by one of the server computer, the user and a third party communicating with the server computer through a terminal of the third party.

12. A photographing advice system according to claim 11, wherein:
the server computer includes a database in which data that correlate the image processing which has been executed on the image data to the advice are stored.

13. A photographing advice system according to claim 11, wherein:
the user terminal and the server computer are connected via a network to communicate with each other and the user terminal receives the advice information from the providing unit via the network.

14. A photographing advice system according to claim 11, wherein:
the server computer includes a memory in which image data are accumulated.

* * * * *